(12) United States Patent
Kapur et al.

(10) Patent No.: US 9,175,111 B2
(45) Date of Patent: Nov. 3, 2015

(54) ETHYLENE-BASED POLYMER COMPOSITIONS, METHODS OF MAKING THE SAME, AND ARTICLES PREPARED FROM THE SAME

(75) Inventors: Mridula (Babli) Kapur, Lake Jackson, TX (US); Robert J. Jorgensen, Scott Depot, WV (US); Burkhard E. Wagner, Highland Park, NJ (US); William J. Michie, Jr., Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/811,015

(22) PCT Filed: Dec. 18, 2008

(86) PCT No.: PCT/US2008/087378
§ 371 (c)(1),
(2), (4) Date: Sep. 27, 2010

(87) PCT Pub. No.: WO2009/085922
PCT Pub. Date: Jul. 9, 2009

(65) Prior Publication Data
US 2011/0034635 A1 Feb. 10, 2011

Related U.S. Application Data

(60) Provisional application No. 61/017,947, filed on Dec. 31, 2007.

(51) Int. Cl.
*C08F 8/00* (2006.01)
*C08L 23/04* (2006.01)
*C08F 210/16* (2006.01)
*C08L 23/08* (2006.01)
*C08F 10/00* (2006.01)
*C08F 110/02* (2006.01)

(52) U.S. Cl.
CPC ............. *C08F 10/00* (2013.01); *C08F 210/16* (2013.01); *C08L 23/04* (2013.01); *C08L 23/0807* (2013.01); *C08F 110/02* (2013.01); *C08L 2205/02* (2013.01)

(58) Field of Classification Search
USPC .................................................. 525/191, 240
See application file for complete search history.

(56) References Cited

U.S. PATENT DOCUMENTS

| | | | |
|---|---|---|---|
| 4,461,873 A * | 7/1984 | Bailey et al. ................. | 525/240 |
| 4,482,687 A | 11/1984 | Noshay et al. | |
| 4,621,652 A | 11/1986 | Ozawa | |
| 4,621,952 A | 11/1986 | Aronson | |
| 4,798,081 A | 1/1989 | Hazlitt et al. | |
| 5,290,745 A | 3/1994 | Jorgensen et al. | |
| 5,453,471 A | 9/1995 | Bernier et al. | |
| 5,527,752 A | 6/1996 | Reichle et al. | |
| 5,589,539 A | 12/1996 | Wagner et al. | |
| 5,663,236 A | 9/1997 | Takahashi et al. | |
| 5,767,773 A | 6/1998 | Fujiuchi et al. | |
| 6,187,866 B1 | 2/2001 | Jorgensen et al. | |
| 6,194,520 B1 | 2/2001 | Cheruvu et al. | |
| 6,248,831 B1 | 6/2001 | Maheshwari et al. | |
| 6,787,608 B2 | 9/2004 | VanDun et al. | |
| 6,946,521 B2 * | 9/2005 | Miserque et al. ............. | 525/191 |
| 6,982,237 B2 | 1/2006 | Wagner et al. | |
| 7,432,328 B2 * | 10/2008 | Jaker ............................ | 525/191 |
| 7,767,613 B2 | 8/2010 | Mihan | |
| 7,879,946 B2 | 2/2011 | Goldberg et al. | |
| 8,101,687 B2 | 1/2012 | Schramm et al. | |
| 8,153,243 B2 | 4/2012 | Patel et al. | |
| 2007/0043177 A1 * | 2/2007 | Michie et al. .................. | 526/65 |
| 2009/0283939 A1 * | 11/2009 | Turner et al. .................. | 264/500 |
| 2010/0292418 A1 | 11/2010 | Jorgensen et al. | |

FOREIGN PATENT DOCUMENTS

| | | |
|---|---|---|
| EP | 0757076 A1 | 2/1997 |
| EP | 1319685 A1 | 6/2003 |
| EP | 0 783 022 B1 | 9/2004 |
| WO | WO-0018814 A1 | 4/2000 |
| WO | WO-2000/035970 A1 | 6/2000 |
| WO | WO-0071615 A1 | 11/2000 |
| WO | WO-0123446 A1 | 4/2001 |
| WO | WO-03/102075 A1 | 12/2003 |
| WO | WO-2004/007610 A1 | 1/2004 |
| WO | WO-2004/050722 A1 | 6/2004 |
| WO | WO-2004101674 A1 | 11/2004 |
| WO | WO-2005/052010 A1 | 6/2005 |
| WO | WO-2006/020623 A1 | 2/2006 |
| WO | 2006/138084 A1 | 12/2006 |
| WO | WO-2007024746 A1 | 3/2007 |
| WO | WO-2007117520 A2 | 10/2007 |
| WO | 2007/130515 A2 | 11/2007 |

OTHER PUBLICATIONS

PCT/US08/87378, International Search Report, Feb. 20, 2009.

\* cited by examiner

*Primary Examiner* — Nathan M Nutter

(57) ABSTRACT

The invention provides a composition comprising a blend, which comprises a high molecular weight ethylene-based polymer, and a low molecular weight ethylene-based polymer, and wherein the high molecular weight ethylene-based polymer has a density less than, or equal to, 0.955 g/cm$^3$, and wherein the blend has a high load melt index ($I_{21}$) greater than, or equal to, 15 g/10 min, and wherein the blend has a molecular weight distribution ($M_w/M_n$) greater than, or equal to, 15. The invention also provides a composition comprising a blend, which comprises a high molecular weight ethylene-based polymer and a low molecular weight ethylene-based polymer, and wherein the high molecular weight ethylene-based polymer component has a density less than, or equal to, 0.945 g/cm$^3$, and a melt index ($I_2$) less than, or equal to, 0.1 g/10 min, and wherein the blend has a high load melt index ($I_{21}$) less than, or equal to, 15 g/10 min, and a melt index ($I_5$) less than, or equal to 1 g/10 min, and a molecular weight distribution ($M_w/M_n$) greater than, or equal to, 15. Additional compositions are disclosed.

20 Claims, 7 Drawing Sheets

ETHYLENE-BASED POLYMER COMPOSITIONS, METHODS OF MAKING THE SAME, AND ARTICLES PREPARED FROM THE SAME

REFERENCE TO RELATED APPLICATIONS

The present application claims the benefit of U.S. Provisional Application No. 61/017,947, filed on Dec. 31, 2007, and fully incorporated herein.

The present invention provides ethylene-based polymer compositions and articles prepared from the same, and methods of making the same. The compositions of the invention are particularly suitable for use in blow molded articles, films, pipes and other applications.

Chromium (Cr) catalyzed high density polyethylene (HDPE) resins, produced by slurry polymerization, have good processing properties, as characterized by suitable swell and melt strength, for blow molded rigid packaging applications. However, they lack an optimum balance of environmental stress crack resistance (ESCR) and stiffness required to package aggressive materials, or required to fabricate light weight packaging. In Cr-catalyzed resins, ESCR is maximized at the expense of stiffness or vice versa. Multi reactor gas phase process technology in combination with Ziegler-Natta (Z—N) catalysts, provide a means to improve the physical property balance of HDPE resins, however, this improvement is accompanied by poor resin processing. Gas phase, Z—N catalyzed resins typically have lower swell and lower melt strength compared to Cr-catalyzed resins.

Production of a bimodal resin with "Cr like" swell, in combination with "bimodal like" ESCR-stiffness balance has been sought after for more than 20 years, since the first introduction of Z—N-based high ESCR, bimodal products to the rigid packaging market for household and industrial chemicals.

U.S. Pat. No. 6,194,520 discloses a class of relatively high molecular weight, high density ethylene polymer blends. The blends are disclosed as being capable of being blow molded with excellent processability into articles, for examples, bottles, of superior mechanical and other properties. The blends have a density of at least about 0.930 g/cm³, a flow index ($I_{21}$) of at least about 2 g/10 min, a melt flow ratio (MFR) $I_{21}/I_2$ of at least about 60, and a polydispersity index (PDI) of at least about 8. The polymers of the blend consist essentially of at least about 0.3 weight fraction of a relatively high molecular weight (HMW) component, having a density of at least about 0.900 g/cm³, a high load melt index (HLMI, $I_{21}$) of at least about 0.2 g/10 min, and a flow ratio (FR) at least about 10; and a relatively low molecular weight (LMW) component, having a density of at least about 0.930 g/cm³, and a melt index ($I_2$) no greater than about 1000 g/10 min.

U.S. Pat. No. 6,248,831 discloses a process for production of a polyethylene blend, in-situ, comprising contacting ethylene, and at least one alpha-olefin with a magnesium/titanium based catalyst system, including a partially activated precursor and a cocatalyst, in each of two fluidized bed reactors, connected in series. The precursor is formed by contacting an alkylaluminum halide with a solid reaction product, prepared from a magnesium alkoxide, a titanium tetraalkoxide, and a solubility enhancing agent. A relatively low flow index ($I_{21}$) polymer is produced in one reactor ($I_{21}$ from about 0.20 to about 5.0 g/10 min, density from 0.890 to 0.940 g/cm³, $I_{21}/I_2$ from about 20 to about 65). A relatively high melt index ($I_2$) copolymer is produced in another reactor ($I_2$ from about 80 to about 1000 g/10 min, density from 0.925 to 0.970 g/cm³, $I_{21}/I_2$ from about 20 to about 65). The blend has an $I_5$ from about 0.01 to about 2.0 g/10 min, and $I_{21}/I_5$ from about 20 to about 45, density from 0.915 to 0.958 g/cm³, and MWD (molecular weight distribution) from about 18 to about 32.

U.S. Pat. No. 6,787,608 discloses a polyethylene composition with a bimodal molecular weight distribution, and articles made there from, such as high top load, blow molded articles, and transmission and distribution pipes. The composition comprises a low-molecular-weight ethylene homopolymer component, and a homogeneous, high-molecular-weight ethylene interpolymer component. The low molecular weight component is characterized as having a molecular weight distribution, $MWD^L$, of less than about 8. The composition is characterized as having a bimodal molecular weight distribution, and a ductile-brittle transition temperature, $T_{db}$, of less than −20° C. In some embodiments, the high molecular weight component is characterized by a reverse comonomer distribution.

International Publication No. WO 00/18814 (see also EP1117709B1) discloses a process for the preparation of polyethylene resins having a multimodal molecular weight distribution, which comprises: (i) contacting ethylene monomer and a comonomer, comprising an alpha-olefin having from 3 to 10 carbon atoms, with a first catalyst system, in a first reactor, under first polymerization conditions to produce a first polyethylene, having a first molecular weight, a HLMI of not more than 0.5 g/10 min, and a first density of not more than 0.925 g/cm³; (ii) providing a second polyethylene having a second lower molecular weight and higher density, and (iii) mixing together the first and second polyethylenes to form a polyethylene resin having a multimodal molecular weight distribution. The first catalyst system comprises: (a) a metallocene catalyst comprising a bis tetrahydroindenyl compound of the general formula: (IndH4)2R"MQ2, in which each Ind is the same or different, and is indenyl or substituted indenyl; R" is a bridge, which comprises a C1-C20 alkylene radical, a dialkyl germanium or silicon or siloxane, or an alkyl phosphine or amine radical, and which bridge is substituted or unsubstituted; M is a Group IVB transition metal or vanadium; and each Q is hydrocarbyl having 1 to 20 carbon atoms or halogen; and (b) a cocatalyst which activates the catalyst component. The second polyethylene having been produced using a catalyst other than the bis tetrahydroindenyl compound.

International Publication No. WO 2005/052010 discloses a Ziegler-Natta catalyst composition comprising a solid mixture formed by halogenation of: A1) a spray-dried catalyst precursor, comprising the reaction product of a magnesium compound, a non-metallocene titanium compound, and at least one non-metallocene compound of a transition metal other than titanium, with A2) an organoaluminium halide halogenating agent. This reference also discloses polymerization processes using, and polymers formed from, the same.

U.S. Publication 2004/0034169 (see also WO 03/102075) discloses a polymer composition comprising a LMW ethylene polymer component and a HMW ethylene polymer component. Preferably, the LMW polyethylene component and the HMW polyethylene component co-crystallize in the composition, such that the composition exhibits a single or substantially single peak in a lamella thickness distribution ("LTD") curve. The ethylene polymer for the LMW and the HMW polyethylene components can be either homopolyethylene or ethylene copolymer.

U.S. Pat. No. 5,663,236 discloses an ethylene copolymer composition comprising an ethylene/α-olefin copolymer, obtained by using a catalyst containing an organoaluminum oxy-compound, and at least two kinds of specific metallocene compounds, and a low-density polyethylene obtained by high-pressure radical polymerization. The ethylene/α-olefin copolymer compositions can be used in molding applications and film applications.

European Patent No. EP 1 141 045 B1 discloses a process for the preparation of an olefin polymer, said process comprising polymerizing at least one olefin, in the presence of an olefin polymerization multi site catalyst, in two reaction stages, and in which hydrogen is present at a higher concentration in one reaction stage, and a lower concentration in the other reaction stage. The multi site catalyst has the following properties: (I) a metallocene catalytic site A, capable of producing a polymer component of different molecular weight at said higher and lower hydrogen concentrations, the MFR2 of the polymer produced during the higher hydrogen concentration reaction stage being 100 to 2000; and (II) a catalytic site B capable of producing a polymer component of a certain molecular weight at said higher and lower hydrogen concentrations; such that the ratio of the MFR2 of the polymer components produced by catalytic site A, in the two reaction stages, at the two different hydrogen concentrations, is at least 50, and the ratio of the MFR2 of the polymer components produced by catalytic site B is less than 10.

International Publication No. WO 2006/020623 discloses a Ziegler-Natta procatalyst composition in the form of solid particles, and comprising magnesium, halide and transition metal moieties. The particles have an average size (D50) from 10 to 70 μm, and are characterized by a D95/D5 particle size ratio of less than, or equal to, 10.

International Publication No. WO 2004/050722 discloses a catalyst system for the polymerization of ethylene with C3-C10 olefins, and a polymerization process using said catalyst system for producing ethylene polymers having a broad molecular weight distribution, as well as to the polymers obtained by such process.

International Publication No. WO 2004/007610 discloses melt blended HDPE compositions, and blending methods applicable to the fabrication of HDPE products, such as single and dual wall corrugated HDPE pipe, fabricated and molded fittings and accessories. This reference claims a blended polyethylene composition having a principal component comprising a HMW HDPE copolymer, blended with at least one LMW HDPE homopolymer and/or at least one LMW HDPE copolymer, to produce a blended polyethylene composition having a melt index (MI) and density, such that the environmental stress crack resistance of the blended composition is greater than 70 hours.

European Patent Application No. EP 1 319 685 A1 discloses a process for the preparation of polyethylene resins having a multimodal molecular weight distribution, which comprises the steps of: (i) providing a first high molecular weight, metallocene-produced, linear low density polyethylene (mLLDPE) resin having a density from 0.920 to 0.940 g/cm$^3$, and a HLMI from 0.05 to 2 g/10 min; (ii) providing a second high density polyethylene, prepared either with a Ziegler-Natta or with a chromium based catalyst, said polyethylene having a density ranging from 0.950 to 0.970 g/cm$^3$, and a HLMI from 5 to 100 g/10 min; (iii) physically blending together the first and second polyethylenes to form a polyethylene resin having a semi-high molecular weight, a broad or multimodal molecular weight distribution, a density ranging from 0.948 to 0.958 g/cm$^3$, and a HLMI of from 2 to 20 g/10 min.

European Patent No. EP 0 783 022 B1 claims an ethylene type polymer composition comprising 20 to 90 percent by weight of an ethylene type polymer (A) and 80 to 10 percent by weight of an ethylene type polymer (B). The ethylene type polymer (A) is an ethylene polymer, or a copolymer of ethylene and an α-olefin of 3 to 20 carbon atoms, and has a density (dA) of 0.96 to 0.980 g/cm$^3$, and an intrinsic viscosity (η) of 0.5 to 3.0 dl/g. The ethylene type polymer (B) is an ethylene polymer, or a copolymer of ethylene and an α-olefin of 3 to 20 carbon atoms, and has a density (dB) of 0.91 to 0.965 g/cm$^3$, and an intrinsic viscosity (ii) of 1.0 to 10 dl/g. At least one of the ethylene type polymers (A) and (B) is prepared using a metallocene catalyst. The ethylene type polymer composition has the following properties: dA/dB is larger than 1; the density is 0.940 to 0.970 g/cm$^3$; the MFR is of 0.005 to 20 g/10 min; the MFR and the melt tension (MT) satisfy the relation log(MT)≥−0.4 log(MFR)+0.7; and the diametrical swell ratio exceeds 1.35.

International Publication No. WO 97/27225 discloses a process for the polymerization of ethylene, and optionally α-olefins, to ethylene homopolymers or copolymers having a broad molecular weight distribution, and comprising the polymerization of 100-80 weight percent ethylene, and 0-20 weight percent comonomer, in the presence of two independent, simultaneously present catalysts A and B. Catalyst A, deposited on an inorganic support, comprises chromium in a predominantly oxidation state of 2. Catalyst B comprises a bis-cyclopentadienyl chromium compound reacted with an inorganic support. The produced polyethylene composition comprises 40-80 percent by weight of a first polyethylene, and 60-20 percent by weight of a second polyethylene. The first polyethylene is characterized by having a melt index $MI_{21}$<5, and a polydispersity of Mw/Mn>15. The second polyethylene is characterized by $MI_2$>300, and it contains alkyl branches in a number of up to 20 percent of the corresponding number of side branches in said first polyethylene.

International Publication No. WO 01/23446 A1 discloses a polyethylene molding compound with multimodal molar weight distribution. The molding compound has a total density≥0.940 g/cm$^3$, and an MFI190/5 in the range of 0.01 to 10 g/10 min. The inventive molding compound contains 30 to 60 weight percent of low-molecular ethylene homopolymer A, which is provided with a viscosity number, $VZ_A$, in the range of 40 to 150 cm$^3$/g. The molding compound also comprises 30 to 65 weight percent of a high-molecular copolymer B, consisting of ethylene and an additional olefin, with 4 to 10 carbon atoms, and having a viscosity number, $VZ_B$, in the range of 150 to 800 cm$^3$/g. The molding compound further comprises 1 to 30 weight percent of ultrahigh-molecular ethylene homopolymer C, which is provided with a viscosity number, $VZ_C$, in the range of 900 to 3000 cm$^3$/g.

International Publication No. WO 00/71615 discloses the use in injection molding or extrusion coating of liquids containers, closures and caps, of a HDPE, comprising at least two polyethylene components having different molecular weight distributions, and wherein at least one of said components is an ethylene copolymer.

European Application No. EP 0 757 076 discloses a process for extrusion comprising: (i) blending one or more polyethylene(s), each polyethylene being made by a low pressure process, and having a density equal to, or greater than, about 0.918 g/cm$^3$, with one or more saturated alicyclic hydrocarbon(s), which are liquid at process temperature, non-polar, essentially amorphous, and containing less than about 15 percent by weight paraffin wax. The components are blended in an amount from about 0.5 to about 15 parts by weight of hydrocarbon(s) per 190 parts by weight of polyethylene(s); and (ii) extruding the blend.

Additional compositions are disclosed in WO 2007/117520 and WO 2007/024746.

There remains a need for ethylene-based resins having "Cr like" swell and "bimodal like" ESCR/stiffness combination.

There is a further need for such resins that can be extruded on existing blow molding equipment, without the need for major tooling or parison programming changes. These needs and others have been met by the following invention.

SUMMARY OF THE INVENTION

The invention provides a composition comprising a blend, which blend comprises a high molecular weight ethylene-based polymer, and a low molecular weight ethylene-based polymer, and
wherein the high molecular weight ethylene-based polymer has a density less than, or equal to, 0.955 g/cm$^3$, and
wherein the blend has a high load melt index ($I_{21}$) greater than, or equal to, 15 g/10 min, and
wherein the blend has a molecular weight distribution ($M_w/M_n$) greater than, or equal to, 15.

The invention also provides a composition comprising a blend, which blend comprises a high molecular weight ethylene-based polymer and a low molecular weight ethylene-based polymer, and wherein
the high molecular weight ethylene-based polymer component has a density less than, or equal to, 0.945 g/cm$^3$, and a melt index ($I_2$) less than, or equal to, 0.1 g/10 min, and
wherein the blend has a high load melt index ($I_{21}$) less than, or equal to, 15 g/10 min, and a melt index ($I_5$) less than, or equal to, 1 g/10 min, and a molecular weight distribution ($M_w/M_n$) greater than, or equal to, 15.

The invention also provides a composition comprising a blend, which blend comprises a high molecular weight ethylene-based polymer, and a low molecular weight ethylene-based polymer, and wherein
the high molecular weight ethylene-based interpolymer has a density less than, or equal to, 0.945 g/cm$^3$, and a melt index ($I_2$) less than, or equal to, 0.1 g/10 min, and wherein the blend has a high load melt index ($I_{21}$) greater than, or equal to, 1 g/10 min, and a molecular weight distribution ($M_w/M_n$) greater than, or equal to, 15.

The invention also provides a composition comprising a blend, which blend comprises a high molecular weight ethylene-based polymer, and a low molecular weight ethylene-based polymer, and
wherein the high molecular weight ethylene-based polymer has the following properties: (i) a density less than, or equal to, 0.955 g/cm$^3$, (ii) a high load melt index ($I_{21}$) greater than, or equal to, 0.05 g/10 min, and
wherein the blend has a weight fraction greater than, or equal to, 4 weight percent, based on the weight of the blend, which comprises polymer molecules that have a molecular weight greater than 10$^6$ g/mole, and wherein the blend has a density greater than, or equal to, 0.93 g/cm$^3$.

DETAILED DESCRIPTION OF THE INVENTION

Figure 1:
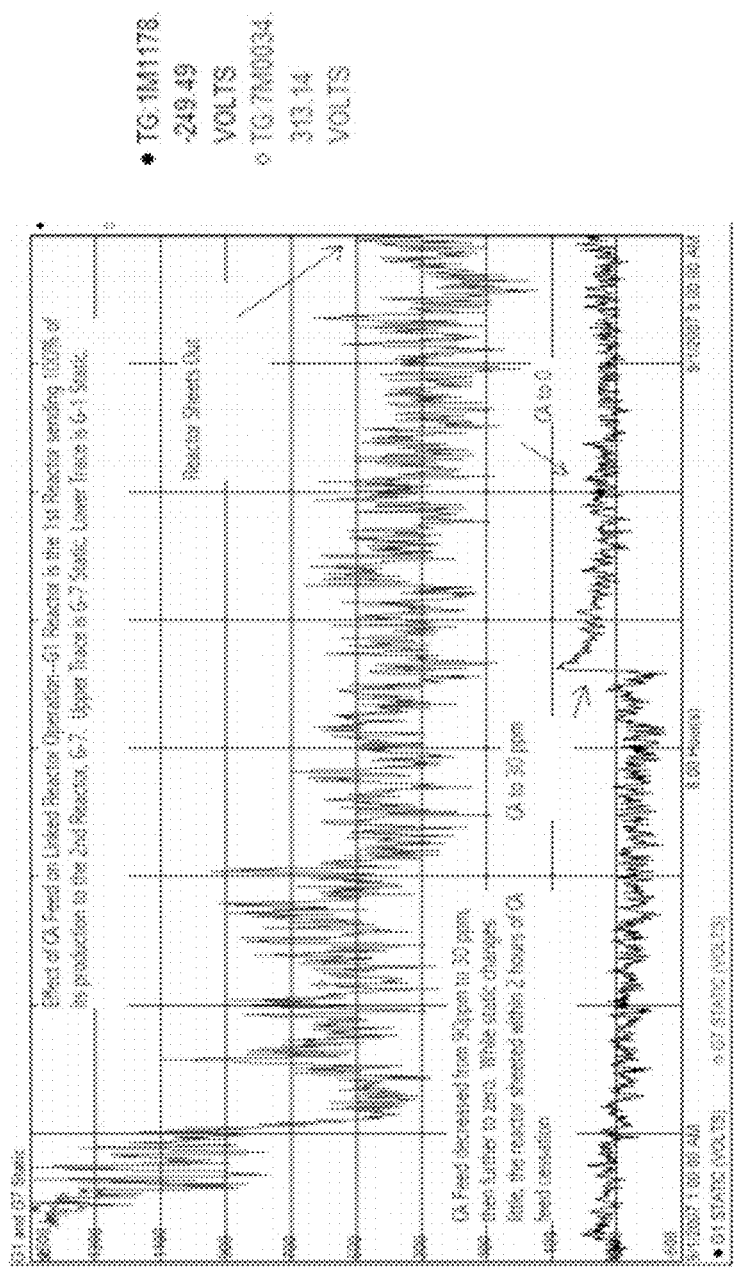
FIG. 1 depicts a static generation profile in a gas phase reactor.

The invention provides compositions with select multimodal molecular weight distributions, such that the distribution is preferentially enhanced on the high molecular weight side by the incorporation of an accentuated high molecular weight tail, in combination with preferential comonomer incorporation in the high molecular weight component of the resin. The inventive compositions have "Cr like swell," and enhanced ESCR and stiffness, compared to standard "Ziegler-Natta catalyzed" bimodal resins for blow molding applications.

More specifically, the invention provides a composition comprising a blend which comprises a high molecular weight ethylene-based polymer, and a low molecular weight ethylene-based polymer, and
wherein the high molecular weight ethylene-based interpolymer has a density less than, or equal to, 0.955 g/cm$^3$, preferably less than, or equal to, 0.950 g/cm$^3$, more preferably less than, or equal to, 0.945 g/cm$^3$, and even more preferably less than, or equal to, 0.940 g/cm$^3$, and
wherein the blend has a high load melt index ($I_{21}$) greater than, or equal to, 15 g/10 min, and
wherein the blend has a molecular weight distribution ($M_w/M_n$) greater than, or equal to, 15.

The molecular weight distribution is determined by either conventional GPC or LS (Light Scattering) GPC. In a further embodiment, the molecular weight distribution is determined by convention GPC. In another embodiment, the molecular weight distribution is determined by LS GPC. In another embodiment, molecular weight distribution is determined by both Conventional and LS GPC (Mw (Abs) is determined by LS GPC and Mn is determined by conventional GPC).

In one embodiment, the blend has a molecular weight distribution ($M_w/M_n$) greater than, or equal to, 18. In another embodiment, the blend has a molecular weight distribution ($M_w/M_n$) greater than, or equal to, 20. The molecular weight distribution is determined by either conventional GPC or LS GPC. In a further embodiment, the molecular weight distribution is determined by convention GPC. In another embodiment, the molecular weight distribution is determined by LS GPC.

In another embodiment, the blend has a molecular weight distribution ($M_w/M_n$) greater than, or equal to, 18. In another embodiment, the blend has a molecular weight distribution ($M_w/M_n$) greater than, or equal to, 20. The molecular weight distribution ($M_w/M_n$) is determined by both conventional and LS GPC. The Mw (Abs) is determined by LS GPC and Mn is determined by conventional GPC.

In one embodiment, the high molecular weight ethylene-based polymer is an ethylene-based interpolymer.

In one embodiment, the low molecular weight ethylene-based polymer is an ethylene-based interpolymer.

In another embodiment, the low molecular weight ethylene-based polymer is a polyethylene homopolymer.

In another embodiment, the high molecular weight ethylene-based polymer is a heterogeneously branched ethylene-based interpolymer. A heterogeneously branched interpolymer(s), as known in the art, is typically produced by Ziegler-Natta type catalysts, and contains a non-homogeneous distribution of comonomer among the molecules of the interpolymer.

In another embodiment, the low molecular weight ethylene-based polymer is a heterogeneously branched ethylene-based interpolymer.

In another embodiment, the high molecular weight ethylene-based polymer component has a melt index, $I_{21}$, greater than, or equal to, 0.05 g/10 min. In another embodiment, the high molecular weight ethylene-based polymer component has a melt index, $I_{21}$, greater than, or equal to, 0.1 g/10 min.

In another embodiment, the high molecular weight ethylene-based polymer component has a melt index, $I_{21}$, less than, or equal to, 2 g/10 min, preferably less than, or equal to, 1.5 g/10 min.

In another embodiment, the low molecular weight ethylene-based polymer component has a melt index, $I_2$, greater than, or equal to, 20 g/10 min.

In another embodiment, the low molecular weight ethylene-based polymer component has a melt index, $I_2$, less than, or equal to, 20 g/10 min.

In another embodiment, the blend has a density less than, or equal to, 0.970 g/cm$^3$.

In yet another embodiment, the blend has a melt index, $I_{21}$, greater than, or equal to, 20 g/10 min.

An inventive composition may comprise a combination of two or more embodiments as described herein.

The components (blend, high molecular weight component, low molecular weight component) of an inventive composition may each comprise a combination of two or more embodiments as described herein.

The invention also provides a composition comprising a blend, which comprises a high molecular weight ethylene-based polymer and a low molecular weight ethylene-based polymer, and wherein the high molecular weight ethylene-based polymer component has a density less than, or equal to, 0.945 g/cm$^3$, preferably less than, or equal to, 0.940 g/cm$^3$, and a melt index ($I_2$) less than, or equal to, 0.1 g/10 min, and wherein the blend has a high load melt index ($I_{21}$) less than, or equal to, 15 g/10 min, and a melt index ($I_5$) less than, or equal to 1 g/10 min, and a molecular weight distribution ($M_w/M_n$) greater than, or equal to, 15.

The molecular weight distribution is determined by either conventional GPC or LS (Light Scattering) GPC. In a further embodiment, the molecular weight distribution is determined by convention GPC. In another embodiment, the molecular weight distribution is determined by LS GPC. In another embodiment, the molecular weight distribution ($M_w/M_n$) is determined by both Conventional and LS GPC (Mw (Abs) is determined by LS GPC and Mn is determined by conventional GPC).

In one embodiment, the blend has a molecular weight distribution ($M_w/M_n$) greater than, or equal to, 18. In another embodiment, the blend has a molecular weight distribution ($M_w/M_n$) greater than, or equal to, 20. The molecular weight distribution is determined by either conventional GPC or LS GPC. In a further embodiment, the molecular weight distribution is determined by convention GPC. In another embodiment, the molecular weight distribution is determined by LS GPC.

In another embodiment, the blend has a molecular weight distribution ($M_w/M_n$) greater than, or equal to, 18. In another embodiment, the blend has a molecular weight distribution ($M_w/M_n$) greater than, or equal to, 20. The molecular weight distribution ($M_w/M_n$) is determined by both Conventional and LS GPC. The Mw (Abs) is determined by LS GPC and Mn is determined by conventional GPC.

In another embodiment, blend has a molecular weight distribution, $M_w/M_n$, greater than, or equal to, 25 as determined by either conventional GPC or LS GPC. In a further embodiment, the molecular weight distribution is determined by convention GPC. In another embodiment, the molecular weight distribution is determined by LS GPC.

In another embodiment, the blend has a molecular weight distribution ($M_w/M_n$) greater than, or equal to, 25. The molecular weight distribution ($M_w/M_n$) is determined by both Conventional and LS GPC. The Mw (Abs) is determined by LS GPC and Mn is determined by conventional GPC.

In one embodiment, the high molecular weight ethylene-based polymer is an ethylene-based interpolymer.

In one embodiment, the low molecular weight ethylene-based polymer is an ethylene-based interpolymer.

In another embodiment, the low molecular weight ethylene-based polymer is a polyethylene homopolymer.

In another embodiment, high molecular weight ethylene-based polymer is a heterogeneously branched ethylene-based interpolymer.

In another embodiment, the low molecular weight ethylene-based polymer is a heterogeneously branched ethylene-based interpolymer.

In another embodiment, the high molecular weight ethylene-based polymer has a melt index, $I_2$, less than, or equal to, 0.1 g/10 min.

In another embodiment, the low molecular weight ethylene-based polymer component has a melt index, $I_2$, greater than, or equal to, 20 g/10 min.

In another embodiment, the blend has a density less than, or equal to, 0.970 g/cm$^3$.

In another embodiment, blend has a melt index, $I_{21}$, less than, or equal to, 10 g/10 min.

In another embodiment, blend has a melt index, $I_{21}$, less than, or equal to, 5 g/10 min. In another embodiment, blend has a melt index, $I_{21}$, less than, or equal to, 1 g/10 min.

An inventive composition may comprise a combination of two or more embodiments as described herein.

The components (blend, high molecular weigh component, low molecular weight component) of an inventive composition may each comprise a combination of two or more embodiments as described herein.

The invention also provides a composition comprising a blend, which comprises a high molecular weight ethylene-based polymer, and a low molecular weight ethylene-based polymer, and wherein the high molecular weight ethylene-based polymer has a density less than, or equal to, 0.945 g/cm³, preferably less than, or equal to, 0.940 g/cm³, and a melt index ($I_2$) less than, or equal to, 0.1 g/10 min, and wherein the blend has a high load melt index ($I_{21}$) greater than, or equal to, 1 g/10 min, and a molecular weight distribution (Mw/Mn) greater than, or equal to, 15.

The molecular weight distribution is determined by either conventional GPC or LS (Light Scattering) GPC. In a further embodiment, the molecular weight distribution is determined by convention GPC. In another embodiment, the molecular weight distribution is determined by LS GPC. In another embodiment, the molecular weight distribution ($M_w/M_n$) is determined by both conventional and LS GPC (Mw (Abs) is determined by LS GPC and Mn is determined by conventional GP).

In one embodiment, the blend has a molecular weight distribution ($M_w/M_n$) greater than, or equal to, 18. In another embodiment, the blend has a molecular weight distribution ($M_w/M_n$) greater than, or equal to, 20. The molecular weight distribution is determined by either conventional GPC or LS GPC. In a further embodiment, the molecular weight distribution is determined by convention GPC. In another embodiment, the molecular weight distribution is determined by LS GPC.

In another embodiment, the blend has a molecular weight distribution ($M_w/M_n$) greater than, or equal to, 18. In another embodiment, the blend has a molecular weight distribution ($M_w/M_n$) greater than, or equal to, 20. The molecular weight distribution ($M_w/M_n$) is determined by both Conventional and LS GPC. The Mw (Abs) is determined by LS GPC and Mn is determined by conventional GPC.

In one embodiment, the high molecular weight ethylene-based polymer is an ethylene-based interpolymer.

In one embodiment, the low molecular weight ethylene-based polymer is an ethylene-based interpolymer.

In another embodiment, the low molecular weight ethylene-based polymer is a polyethylene homopolymer.

In another embodiment, the high molecular weight ethylene-based polymer is a heterogeneously branched ethylene-based interpolymer.

In another embodiment, the low molecular weight ethylene-based polymer is a heterogeneously branched ethylene-based interpolymer.

In another embodiment, the low molecular weight ethylene-based polymer component has a melt index, $I_2$, greater than, or equal to, 20 g/10 min.

In another embodiment, the blend has a density less than, or equal to, 0.970 g/cm³.

In yet another embodiment, blend has a melt index, $I_{21}$, greater than, or equal to, 10 g/10 min.

An inventive composition may comprise a combination of two or more embodiments as described herein.

The components (blend, high molecular weight component, low molecular weight component) of an inventive composition may each comprise a combination of two or more embodiments as described herein.

The invention also provides a composition comprising a blend, which blend comprises a high molecular weight ethylene-based polymer, and a low molecular weight ethylene-based polymer, and wherein the high molecular weight ethylene-based polymer has the following properties: (i) a density less than, or equal to, 0.955 g/cm³, (ii) a high load melt index ($I_{21}$) greater than, or equal to, 0.05 g/10 min, and wherein the blend has a weight fraction greater than, or equal to, 4 weight percent, based on the weight of the blend, which comprises polymer molecules that have a molecular weight greater than 10⁶ g/mole, and wherein the blend has a density greater than, or equal to, 0.93 g/cm³.

The weight fraction greater than, or equal to, 4 weight percent, based on the weight of the blend, which comprises polymer molecules that have a molecular weight greater than 10⁶ g/mole is determined by the respective area fractions of either the conventional or LS GPC profile of the blend. In a further embodiment, the respective area fractions are of the conventional GPC profile. In another embodiment, the respective area fractions are of the LS GPC profile.

In another embodiment, the blend has a weight fraction greater than, or equal to, 4.5, preferably greater than, or equal to, 5, weight percent, based on the weight of the blend, which comprises polymer molecules that have a molecular weight greater than 10⁶ g/mole, as determined by the respective area fractions of either the conventional or LS GPC profile of the blend. In a further embodiment, the respective area fractions are of the conventional GPC profile. In another embodiment, the respective area fractions are of the LS GPC profile.

In one embodiment, the blend has a density less than, or equal to, 0.97 g·cm³. In another embodiment, the blend has a density less than, or equal to, 0.96 g/cm³.

In one embodiment, the blend has a density greater than, or equal to, 0.92 g·cm³. In another embodiment, the blend has a density greater than, or equal to, 0.93 g/cm³.

In another embodiment, the high molecular weight ethylene-based polymer is an ethylene-based interpolymer.

In one embodiment, the low molecular weight ethylene-based polymer is an ethylene-based interpolymer.

In another embodiment, the low molecular weight ethylene-based polymer is a polyethylene homopolymer.

In another embodiment, high molecular weight ethylene-based polymer is a heterogeneously branched ethylene-based interpolymer.

In another embodiment, the low molecular ethylene-based polymer is a heterogeneously ethylene-based interpolymer.

In another embodiment, the high molecular weight ethylene-based polymer has a melt index, $I_{21}$, greater than, or equal to, 0.1 g/10 min.

In another embodiment, the high molecular weight ethylene-based polymer has a melt index, $I_{21}$, less than, or equal to, 2 g/10 min, preferably less than, or equal to, 1.5 g/10 min.

In another embodiment, the high molecular weight ethylene-based polymer has a melt index, $I_2$, less than, or equal to, 0.1 g/10 min.

In another embodiment, low molecular weight ethylene-based polymer has a melt index, $I_2$, greater than, or equal to, 20 g/10 min.

In another embodiment, low molecular weight ethylene-based polymer has a melt index, $I_2$, greater than, or equal to, 1 g/10 min. In another embodiment, low molecular weight ethylene-based polymer has a melt index, $I_2$, greater than, or equal to, 5 g/10 min. In another embodiment, low molecular weight ethylene-based polymer has a melt index, $I_2$, greater than, or equal to, 10 g/10 min.

In another embodiment, the blend has a melt index, $I_{21}$, greater than, or equal to, 20 g/10 min.

In another embodiment, blend has a molecular weight distribution, $M_w/M_n$, greater than, or equal to, 15. In another embodiment, blend has a molecular weight distribution, $M_w/M_n$, greater than, or equal to, 18. In another embodiment, blend has a molecular weight distribution, $M_w/M_n$, greater than, or equal to, 20. The molecular weight distribution is determined by either conventional GPC or LS GPC. In a further embodiment, the molecular weight distribution is determined by convention GPC. In another embodiment, the molecular weight distribution is determined by LS GPC.

In another embodiment, blend has a molecular weight distribution, $M_w/M_n$, greater than, or equal to, 15. In another embodiment, blend has a molecular weight distribution, $M_w/M_n$, greater than, or equal to, 18. In another embodiment, blend has a molecular weight distribution, $M_w/M_n$, greater than, or equal to, 20. The molecular weight distribution ($M_w/M_n$) is determined by both Conventional and LS GPC. The Mw (Abs) is determined by LS GPC and Mn is determined by conventional GPC.

An inventive composition may comprise a combination of two or more embodiments as described herein.

The components (blend, high molecular weight component, low molecular weight component) of an inventive composition may each comprise a combination of two or more embodiments as described herein.

In another embodiment, in an inventive composition as described herein, the high molecular weight ethylene-based polymer, and preferably an ethylene-based interpolymer, is present in an amount from 40 to 70 weight percent, preferably from 50 to 70 weight percent, based on the sum weight of the high molecular weight component and the low molecular weight component.

In another embodiment, in an inventive composition as described herein, the low molecular weight ethylene-based polymer is present in an amount from 30 to 60 weight percent, preferably from 30 to 50 weight percent, based on the sum weight of the high molecular weight component and the low molecular weight component.

In another embodiment, in an inventive composition, the high molecular weight ethylene-based interpolymer is an ethylene/α-olefin interpolymer. In a further embodiment, the α-olefin is selected from the group consisting of C3 to C10 α-olefins. In yet a further embodiment, the α-olefin is selected from the group consisting propylene, 1-butene, 1-pentene, 1-hexene, 1-heptene, 1-octene, 4-methyl-1-pentene, 1-nonene and 1-decene, and is preferably selected from the group consisting propylene, 1-butene, 1-hexene and 1-octene, and more preferably, the α-olefin is 1-hexene.

In another embodiment, in an inventive composition, the low molecular weight ethylene-based polymer is an ethylene/α-olefin interpolymer. In a further embodiment, the α-olefin is selected from the group consisting of C3 to C10 α-olefins. In yet a further embodiment, the α-olefin is selected from the group consisting propylene, 1-butene, 1-pentene, 1-hexene, 1-heptene, 1-octene, 4-methyl-1-pentene, 1-nonene and 1-decene, and is preferably selected from the group consisting propylene, 1-butene, 1-hexene and 1-octene, and more preferably, the α-olefin is 1-hexene.

In another embodiment, the high molecular weight ethylene-based polymer of an inventive composition has a weight average molecular weight ($M_w$) greater than, or equal to, $10^5$ g/mole, as determined by either conventional GPC or LS GPC. In a further embodiment, the weight average molecular weight is determined by convention GPC. In another embodiment, the weight average molecular weight is determined by LS GPC.

In another embodiment, the high molecular weight ethylene-based polymer of an inventive composition has a z-average molecular weight ($M_z$) greater than, or equal to, $10^6$ g/mole, as determined by either conventional GPC or LS GPC. In a further embodiment, z-average molecular weight is determined by convention GPC. In another embodiment, the z-average molecular weight is determined by LS GPC.

In another embodiment, the blend of an inventive composition has a weight fraction greater than, or equal to, 4.5, preferably greater than, or equal to, 5, weight percent, based on the weight of the blend, which comprises polymer molecules that have a molecular weight greater than $10^6$ g/mole, as determined by the respective area fractions of either the conventional or LS GPC profile of the blend. In a further embodiment, the respective area fractions are of the conventional GPC profile. In another embodiment, the respective area fractions are of the LS GPC profile.

In another embodiment, the blend of an inventive composition has a weight fraction greater than, or equal to, 6 weight percent, based on the weight of the blend, which comprises polymer molecules that have a molecular weight greater than $10^6$ g/mole as determined by the respective area fractions of the LS GPC profile of the blend.

In another embodiment, the blend of an inventive composition has a weight fraction greater than, or equal to, 8 weight percent, based on the weight of the blend, which comprises polymer molecules that have a molecular weight greater than $10^6$ g/mole as determined by the respective area fractions of the LS GPC of the blend.

In another embodiment, the blend of an inventive composition has a weight fraction greater than, or equal to, 10 weight percent, based on the weight of the blend, which comprises polymer molecules that have a molecular weight greater than $10^6$ g/mole as determined by the respective area fractions of the LS GPC of the blend.

In another embodiment, the blend of an inventive composition has a weight fraction greater than, or equal to, 0.1, preferably greater than, or equal to, 0.5, more preferably greater than, or equal to, 1 weight percent, based on the weight of the blend, which comprises polymer molecules that have a molecular weight greater than $10^7$ g/mole, as determined by the respective area fractions of the LS GPC profile of the blend.

In another embodiment, an inventive composition has a weight fraction greater than, or equal to, 4.5, preferably greater than, or equal to, 5, weight percent, based on the weight of the composition, which comprises polymer molecules that have a molecular weight greater than $10^6$ g/mole, as determined by the respective area fractions of either the conventional or LS GPC profile of the composition. In a further embodiment, the respective area fractions are of the conventional GPC profile. In another embodiment, the respective area fractions are of the LS GPC profile.

In another embodiment, an inventive composition has a weight fraction greater than, or equal to, 6 weight percent, based on the weight of the composition, which comprises polymer molecules that have a molecular weight greater than $10^6$ g/mole as determined by the respective area fractions of the LS GPC of the composition.

In another embodiment, an inventive composition has a weight fraction greater than, or equal to, 8 weight percent, based on the weight of the composition, which comprises polymer molecules that have a molecular weight greater than $10^6$ g/mole as determined by the respective area fractions of the LS GPC of the composition.

In another embodiment, an inventive composition has a weight fraction greater than, or equal to, 10 weight percent, based on the weight of the composition, which comprises polymer molecules that have a molecular weight greater than $10^6$ g/mole as determined by the respective area fractions of the LS GPC of the composition.

In another embodiment, an inventive composition has a weight fraction greater than, or equal to, 0.1, preferably greater than, or equal to, 0.5, more preferably greater than, or equal to, 1 weight percent, based on the weight of the composition, which comprises polymer molecules that have a molecular weight greater than $10^7$ g/mole, as determined by the respective area fractions of the LS GPC profile of the composition.

In another embodiment, each component of an inventive composition is independently formed in the presence of at least one catalyst which comprises at least two catalytic sites.

An inventive composition may further comprise one or more additives. In a further embodiment, the one or more additives are selected from the group consisting of hindered amines, hindered phenols, metal deactivators, UV absorbers, hydroperoxide decomposers, thiosyngerists, alkyl radical scavengers, hindered amine stabilizers, multifunctional stabilizers, phosphites, phosphonites, acid neutralizers, processing aids, nucleating agents, fatty acid stearates, fluoroelastomers, slip agents, antiblock agents, fillers (nano and regular size), and combinations thereof. In another embodiment, the one or more additives are selected from the group consisting of CYASORB 3529 (Cytec), IRGANOX 1010 (Ciba Specialty Chemicals), IRGANOX 1076 (Ciba Specialty Chemicals), IRGANOX 1330 (Ciba Specialty Chemicals), IRGANOX MD1024 (Ciba Specialty Chemicals), IRGAFOS 168 (Ciba Specialty Chemicals), calcium stearate, DYNAMAR FX 5911X or G (3M Manufacturing and Industry), and combinations thereof. In yet another embodiment, the one or more additives are selected from the group consisting of CYASORB 3529, IRGANOX 1010, IRGANOX 1076, IRGANOX 1330, IRGANOX MD1024, DOVERPHOS 9228 (Dover Chemical Corp.), calcium stearate, DYNAMAR FX 5911X or G, and combination thereof. In another embodiment, the one or more additives are selected from the group consisting of UV N30 (Clariant), IRGANOX 1330, DOVERPHOS 9228, IRGANOX MD1024, HO3, calcium stearate, DYNAMAR FX 5911X or G, and combinations thereof.

In another embodiment, the blend of an inventive composition has a complex viscosity ($\eta^*$) at 0.02 $s^{-1}$, and 190° C., greater than, or equal to, 65 kPa·s.

In another embodiment, an inventive composition has a complex viscosity ($\eta^*$) at 0.02 $s^{-1}$, and 190° C., greater than, or equal to, 65 kPa·s.

In another embodiment, the blend of an inventive composition has an extrudate swell (t300 measured at 300 $s^{-1}$ shear rate and 190° C.) greater than 18 seconds.

In another embodiment, an inventive composition has an extrudate swell (t300 measured at 300 $s^{-1}$ shear rate and 190° C.) greater than 18 seconds.

In another embodiment, the blend of an inventive composition has an ESCR $F_{50}$ value greater than, or equal to, 300 hours, as determined by ASTM D-1693, Method B, in 10% by volume aqueous Igepal CO 630 solution.

In another embodiment, an inventive composition has an ESCR $F_{50}$ value greater than, or equal to, 300 hours, as determined by ASTM D-1693, Method B, in 10% by volume aqueous Igepal CO 630 solution.

In another embodiment the blend of an inventive composition has tan delta (G"/G') value, measured at 0.02 $s^{-1}$ and 190° C., less than or equal to 2.5, and preferably less than, or equal to, 2.1.

In another embodiment an inventive composition has tan delta (G"/G') value, measured at 0.02 $s^{-1}$ and 190° C., less than or equal to 2.5, and preferably less than, or equal to, 2.1.

In another embodiment, the blend of an inventive composition has an amount of trans vinyls per 1000 carbon atoms less than, or equal to, 0.02, preferably less than, or equal to, 0.015, and more preferably less than, or equal to, 0.01.

In another embodiment, the blend of an inventive composition has an amount of vinyls per 1000 carbon atoms less than, or equal to, 0.20, preferably less than, or equal to, 0.17, and more preferably less than, or equal to, 0.15.

In another embodiment, an inventive composition has an amount of trans vinyls per 1000 carbon atoms less than, or equal to, 0.020, preferably less than, or equal to, 0.015, and more preferably less than, or equal to, 0.010.

In another embodiment, an inventive composition has an amount of vinyls per 1000 carbon atoms less than, or equal to, 0.200, preferably less than, or equal to, 0.170, and more preferably less than, or equal to, 0.150.

In another embodiment, the blend of an inventive composition has a viscosity average molecular weight ($M_v$) greater than, or equal to, 70,000 g/mole, as determined by ATREF.

In another embodiment, of an inventive composition has a viscosity average molecular weight ($M_v$) greater than, or equal to, 70,000 g/mole, as determined by ATREF.

In another embodiment, the short chain branching distribution of the blend of an inventive composition shows two peaks or one peak with an extended shoulder or tail at temperatures greater than, or equal to, 80° C., as determined by ATREF. In a further embodiment, blend has a viscosity average molecular weight ($M_v$) greater than, or equal to, 70,000 g/mole, as determined by ATREF.

In another embodiment, the short chain branching distribution of the blend of an inventive composition shows two peaks at temperatures greater than, or equal to, 80° C., as determined by ATREF. In a further embodiment, blend has a viscosity average molecular weight ($M_v$) greater than, or equal to, 70,000 g/mole, as determined by ATREF.

In another embodiment, the short chain branching distribution of the blend of an inventive composition shows one peak with an extended shoulder or tail at temperatures greater than, or equal to, 80° C., as determined by ATREF. In a further embodiment, blend has a viscosity average molecular weight ($M_v$) greater than, or equal to, 70,000 g/mole, as determined by ATREF.

In another embodiment, the short chain branching distribution of an inventive composition shows two peaks or one peak with an extended shoulder or tail at temperatures greater than, or equal to, 80° C., as determined by ATREF. In a further embodiment, the composition has a viscosity average molecular weight ($M_v$) greater than, or equal to, 70,000 g/mole, as determined by ATREF.

In another embodiment, the short chain branching distribution of an inventive composition shows two peaks at temperatures greater than, or equal to, 80° C., as determined by ATREF. In a further embodiment, the composition has a viscosity average molecular weight ($M_v$) greater than, or equal to, 70,000 g/mole, as determined by ATREF.

In another embodiment, the short chain branching distribution of an inventive composition shows one peak with an extended shoulder or tail at temperatures greater than, or equal to, 80° C., as determined by ATREF. In a further embodiment, the composition has a viscosity average molecular weight ($M_v$) greater than, or equal to, 70,000 g/mole, as determined by ATREF.

An inventive composition may comprise a combination of two or more embodiments as described herein.

The components (blend, HMW, LMW) of an inventive composition may comprise a combination of two or more embodiments as described herein.

The invention also provides an article comprising at least one component formed from an inventive composition. In a further embodiment, the article is a pipe. In another embodiment, the pipe is a "domestic-use" pipe. In another embodiment, the pipe is used for plumbing purposes. In another embodiment, the pipe is a natural gas pipe. In another embodiment, the pipe has low sag.

In another embodiment, the article is a blow molded article. In a further embodiment, the article is a hollow container. In a further embodiment, the blow molded article is a bottle or a drum.

In another embodiment, the article is a geomembrane, a drip tape or an agricultural tape.

In another embodiment, the article is a sheet, a heavy duty shipping sack, a stretch tape, or a bi-oriented film.

The invention also provides a pipe comprising at least one component formed from an inventive composition.

The invention also provides a film comprising at least one component formed from an inventive composition. In a further embodiment, the film is a battery separator film. In a further embodiment, the film is a film liner, for example, as is used for tee shirt bags, grocery sacks, institutional can liners, and other liner applications.

An inventive article may comprise a combination of two or more embodiments as described herein.

The invention also provides a method of preparing an inventive composition, said method comprising:
a) polymerizing the high molecular weight ethylene-based polymer or the low molecular weight ethylene-based polymer in a first reactor, in the presence of a mixed metal Ziegler/Natta catalyst system, to form a first polymer product;
b) transferring the first polymer product to a second reactor; and
c) polymerizing, in the second reactor, the ethylene-based polymer not produced in the first reactor to form the blend; and
d) optionally compounding the blend with one or more additives.

In one embodiment, at least one reactor is a gas phase reactor. In a further embodiment, both the first and second reactors are gas phase reactors.

In another embodiment, the polymerization of the high molecular weight ethylene-based polymer component and/or the low molecular weight ethylene-based polymer component takes place by a gas phase polymerization An inventive method may comprise a combination of two or more embodiments as described herein.

Polymer Composition

As discussed above, the inventive compositions comprise a blend containing a high molecular weight ethylene-based polymer and a low molecular weight polyethylene-based polymer. Additional features of these components are described below.

In one embodiment, the composition comprises greater than, or equal to, 90 weight percent, preferably greater than, or equal to, 95 weight percent, and more preferably greater than, or equal to, 98 weight percent of the sum weight of the high molecular weight and low molecular weight components, based on the weight of the composition.

In another embodiment, the composition does not comprise any other polymer, except the high molecular component and the low molecular weight component.

In another embodiment, the composition does not comprise any other polymer present in an amount greater than 5 weight percent, preferably in an amount greater than 2.5 weight percent, based on the weight of the composition, except the high molecular component and the low molecular weight component.

In one embodiment, the composition has a molecular weight distribution ($M_w/M_n$) greater than, or equal to, 18. In another embodiment, the composition has a molecular weight distribution ($M_w/M_n$) greater than, or equal to, 20. The molecular weight distribution is determined by either conventional GPC or LS GPC. In a further embodiment, the molecular weight distribution is determined by convention GPC. In another embodiment, the molecular weight distribution is determined by LS GPC.

In another embodiment, the composition has a molecular weight distribution ($M_w/M_n$) greater than, or equal to, 18. In another embodiment, the composition has a molecular weight distribution ($M_w/M_n$) greater than, or equal to, 20. The molecular weight distribution ($M_w/M_n$) is determined by both conventional and LS GPC. The Mw (Abs) is determined by LS GPC and Mn is determined by conventional GPC.

In another embodiment, the composition has a molecular weight distribution, $M_w/M_n$, greater than, or equal to, 25 as determined by either conventional GPC or LS GPC. In a further embodiment, the molecular weight distribution is determined by convention GPC. In another embodiment, the molecular weight distribution is determined by LS GPC.

In another embodiment, the composition has a molecular weight distribution ($M_w/M_n$) greater than, or equal to, 25. The molecular weight distribution ($M_w/M_n$) is determined by both conventional and LS GPC. The Mw (Abs) is determined by LS GPC and Mn is determined by conventional GPC.

In another embodiment, composition has a molecular weight distribution, $M_w/M_n$, greater than, or equal to, 15. In another embodiment, composition has a molecular weight distribution, $M_w/M_n$, greater than, or equal to, 18. In another embodiment, composition has a molecular weight distribution, $M_w/M_n$, greater than, or equal to, 20. The molecular weight distribution is determined by either conventional GPC or LS GPC. In a further embodiment, the molecular weight distribution is determined by convention GPC. In another embodiment, the molecular weight distribution is determined by LS GPC.

In another embodiment, composition has a molecular weight distribution, $M_w/M_n$, greater than, or equal to, 15. In another embodiment, composition has a molecular weight distribution, $M_w/M_n$, greater than, or equal to, 18. In another embodiment, composition has a molecular weight distribution, $M_w/M_n$, greater than, or equal to, 20. The molecular weight distribution ($M_w/M_n$) is determined by both conventional and LS GPC. The Mw (Abs) is determined by LS GPC and Mn is determined by conventional GPC.

An inventive composition may comprise a combination of two or more embodiments as described herein. The components (blend, high molecular weight component and the low molecular weight component) of an inventive composition may comprise a combination of two or more embodiments as described herein.

The High Molecular Weight (HMW) Component

In one embodiment, the high molecular weight ethylene-based polymer has a density less than, or equal to, 0.955 g/cm$^3$, preferably less than, or equal to, 0.950 g/cm$^3$, more preferably less than, or equal to, 0.945 g/cm$^3$. In another embodiment, the density is less than, or equal to, 0.940 g/cm$^3$. In a further embodiment, the high molecular weight ethylene-based polymer is an ethylene-based interpolymer.

In another embodiment, the high molecular weight ethylene-based polymer has a density greater than, or equal to, 0.900 g/cm$^3$, preferably greater than, or equal to, 0.905 g/cm$^3$, preferably greater than, or equal to, 0.910 g/cm$^3$, and more preferably greater than, or equal to, 0.915 g/cm$^3$, or greater than, or equal to, 0.920 g/cm$^3$. In a further embodiment, the high molecular weight ethylene-based polymer is an ethylene-based interpolymer.

In another embodiment, the density of the high molecular weight ethylene-based polymer is in the range from 0.910 to 0.945 g/cm³, and preferably in the range from 0.915 to 0.940 g/cm³. In a further embodiment, the high molecular weight ethylene-based polymer is an ethylene-based interpolymer.

In another embodiment, the high molecular weight ethylene-based polymer has a melt index ($I_{21}$) less than, or equal to, 2 g/10 min, preferably less than, or equal to, 1.5 g/10 min, and more preferably less than, or equal to, 1 g/10 min. In a further embodiment, the high molecular weight ethylene-based polymer is an ethylene-based interpolymer.

In another embodiment, the high molecular weight ethylene-based polymer has a melt index ($I_{21}$) less than, or equal to, 1 g/10 min, preferably less than, or equal to, 0.8 g/10 min, and more preferably less than, or equal to, 0.6 g/10 min. In a further embodiment, the high molecular weight ethylene-based polymer is an ethylene-based interpolymer.

In another embodiment, the high molecular weight ethylene-based polymer has a melt index ($I_2$) less than, or equal to, 0.1 g/10 min. In a further embodiment, the high molecular weight ethylene-based polymer is an ethylene-based interpolymer.

As understood in the art, the higher molecular weight component has a higher molecular weight than the lower molecular weight component, as determined by the polymerization conditions of each component, melt index, GPC methods (molecular weights and/or average molecular weights), and/or other methods known in the art.

In another embodiment, the high molecular weight ethylene-based polymer has a molecular weight distribution greater than 3, preferably greater than 3.5, and more preferably greater than 3.8, as determined by either conventional GPC or LS GPC. In a further embodiment, the high molecular weight ethylene-based polymer is an ethylene-based interpolymer. In another embodiment, high molecular weight ethylene-based polymer has a molecular weight distribution greater than 4, preferably greater than 4.5, as determined by either conventional or LS GPC. In a further embodiment, the high molecular weight ethylene-based polymer is an ethylene-based interpolymer. In another embodiment, high molecular weight ethylene-based polymer has a molecular weight distribution greater than 6, preferably greater than 7, as determined by either conventional or LS GPC. In a further embodiment, the high molecular weight ethylene-based polymer is an ethylene-based interpolymer. As discussed above, the molecular weight distribution is determined by either conventional GPC or LS GPC. In a further embodiment, the molecular weight distribution is determined by convention GPC. In another embodiment, the molecular weight distribution is determined by LS GPC.

In another embodiment, the high molecular weight ethylene-based polymer has a molecular weight distribution greater than 3, preferably greater than 3.5, and more preferably greater than 3.8, as determined by both conventional GPC and LS GPC. In a further embodiment, the high molecular weight ethylene-based polymer is an ethylene-based interpolymer. In another embodiment, high molecular weight ethylene-based polymer has a molecular weight distribution greater than 4, preferably greater than 4.5, as determined by both conventional and LS GPC. In a further embodiment, the high molecular weight ethylene-based polymer is an ethylene-based interpolymer. In another embodiment, high molecular weight ethylene-based polymer has a molecular weight distribution greater than 6, preferably greater than 7, as determined by both conventional and LS GPC. In a further embodiment, the high molecular weight ethylene-based polymer is an ethylene-based interpolymer. As discussed above, the molecular weight distribution is determined by both conventional GPC and LS GPC. The Mw (Abs) is determined by LS GPC and Mn is determined by conventional GPC.

In another embodiment, the high molecular weight ethylene-based polymer is an ethylene/α-olefin interpolymer. In a preferred embodiment, the α-olefin is a C3-C20 α-olefin, a C4-C20 α-olefin, and more preferably a C4-C12 α-olefin, and even more preferably a C4-C8 α-olefin, and most preferably C6-C8 α-olefin.

The term "interpolymer," as used herein, refers to a polymer having polymerized therein at least two monomers. It includes, for example, copolymers, terpolymers and tetrapolymers. As discussed above, it particularly includes a polymer prepared by polymerizing ethylene with at least one comonomer, typically an alpha olefin (α-olefin) of 3 to 20 carbon atoms (C3-C20), preferably 4 to 20 carbon atoms (C4-C20), more preferably 4 to 12 carbon atoms (C4-C12) and even more preferably 4 to 8 carbon atoms (C4-C8) and most preferably C6-C8. The α-olefins include, but are not limited to, propylene 1-butene, 1-pentene, 1-hexene, 4-methyl-1-pentene, 1-heptene, and 1-octene. Preferred α-olefins include propylene, 1-butene, 1-pentene, 1-hexene, 4-methyl-1-pentene, 1-heptene, and 1-octene. Especially preferred α-olefins include 1-hexene and 1-octene, and more preferably 1-hexene. The α-olefin is desirably a C3-C8 α-olefin, and more desirably a C3-C8 α-olefin, and most desirably C6-C8 α-olefin.

Interpolymers include ethylene/butene (EB) copolymers, ethylene/hexene-1 (EH), ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EB, EH and EO copolymers, and most preferably EH and EO copolymers.

In a preferred embodiment, the high molecular weight ethylene-based interpolymer is an ethylene/1-hexene interpolymer The high molecular weight polymer may comprise a combination of two or more embodiments as described herein.

The Low Molecular Weight (LMW) Component

In one embodiment, the low molecular weight ethylene-based polymer has a density greater than, or equal to, 0.930 g/cm³, preferably greater than, or equal to, 0.935 g/cm³, and more preferably greater than, or equal to, 0.940 g/cm³. In a further embodiment, the low molecular weight ethylene-based polymer is an ethylene-based interpolymer. In another embodiment, the low molecular weight ethylene-based polymer is a polyethylene homopolymer.

In one embodiment, the low molecular weight ethylene-based polymer has a density greater than, or equal to, 0.945 g/cm³, preferably greater than, or equal to, 0.950 g/cm³, and more preferably greater than, or equal to, 0.955 g/cm³. In a further embodiment, the low molecular weight ethylene-based polymer is an ethylene-based interpolymer. In another embodiment, the low molecular weight ethylene-based polymer is a polyethylene homopolymer.

In one embodiment, the low molecular weight ethylene-based polymer has a density less than, or equal to, 0.965 g/cm³, preferably less than, or equal to, 0.960 g/cm³. In another embodiment, the density ranges from 0.940 to 0.965 g/cm³, and preferably from 0.945 to 0.960 g/cm³. In a further embodiment, the low molecular weight ethylene-based polymer is an ethylene-based interpolymer. In another embodiment, the low molecular weight ethylene-based polymer is a polyethylene homopolymer.

In one embodiment, the low molecular weight ethylene-based polymer has a density less than, or equal to, 0.980 g/cm³, preferably less than, or equal to, 0.975 g/cm³. In another embodiment, the density ranges from 0.940 to 0.980 g/cm³, and preferably from 0.945 to 0.975 g/cm³. In a further embodiment, the low molecular weight ethylene-based polymer is an ethylene-based interpolymer. In another embodiment, the low molecular weight ethylene-based polymer is a polyethylene homopolymer.

In one embodiment, the low molecular weight ethylene-based polymer has a melt index, $I_2$, (190° C., 2.16 kg weight, ASTM 1238-03) greater than, or equal to, 20 g/10 min, preferably greater than, or equal to, 50 g/10 min, and more preferably greater than, or equal to, 80 g/10 min. In a further embodiment, the low molecular weight ethylene-based polymer is an ethylene-based interpolymer. In another embodiment, the low molecular weight ethylene-based polymer is a polyethylene homopolymer.

In another embodiment, the low molecular weight ethylene-based interpolymer has a melt index, $I_2$, less than, or equal to, 3000 g/10 min, preferably less than, or equal to, 2000 g/10 min, and more preferably less than, or equal to, 1000 g/10 min. In a further embodiment, the low molecular weight ethylene-based polymer is an ethylene-based interpolymer. In another embodiment, the low molecular weight ethylene-based polymer is a polyethylene homopolymer.

In another embodiment, the melt index range from 20 to 1000 g/10 min, preferably in the range from 50 to 500 g/10 min, more preferably in the range from 80 to 300 g/10 min. In a further embodiment, the low molecular weight ethylene-based polymer is an ethylene-based interpolymer. In another embodiment, the low molecular weight ethylene-based polymer is a polyethylene homopolymer.

In another embodiment, the low molecular weight ethylene-based polymer is an ethylene/α-olefin interpolymer. In a preferred embodiment, the α-olefin is a C3-C20 α-olefin, a preferably a C4-C20 α-olefin, and more preferably a C4-C12 α-olefin, and even more preferably a C4-C8 α-olefin and most preferably C6-C8 α-olefin. The α-olefins include, but are not limited to, propylene 1-butene, 1-pentene, 1-hexene, 4-methyl-1-pentene, 1-heptene, and 1-octene. Preferred α-olefins include propylene, 1-butene, 1-pentene, 1-hexene, 4-methyl-1-pentene, 1-heptene, and 1-octene. Especially preferred α-olefins include 1-hexene and 1-octene, and more preferably 1-hexene. The α-olefin is desirably a C3-C8 α-olefin, and more desirably a C4-C8 α-olefin and most desirably a C6-C8 α-olefin.

Interpolymers include ethylene/butene-1 (EB) copolymers, ethylene/hexene-1 (EH), ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EB, EH and EO copolymers, and most preferred copolymers are EH and EO.

In one embodiment, the low molecular weight component is an ethylene/1-hexene copolymer.

In another embodiment, the low molecular weight component is a polyethylene homopolymer.

The low molecular weight component may comprise a combination of two or more embodiments as described herein.

Polyethylene Blend

As discussed above, the polyethylene blend of the invention comprises a high molecular weight ethylene-based polymer and a low molecular weight ethylene-based polymer. An inventive composition may comprise one or more features (density, $I_2$, $I_{21}/I_2$, MWD, etc.) as described in this section.

In one embodiment, the blend has a density greater than, or equal to, 0.910 g/cm³, preferably greater than, or equal to, 0.935 g/cm³, and more preferably greater than, or equal to, 0.940 g/cm³. In another embodiment, the blend has a density less than, or equal to, 0.970 g/cm³, preferably less than, or equal to, 0.965 g/cm³. In another embodiment, blend has a density less than, or equal to, 0.970 g/cm³, preferably less than, or equal to, 0.965 g/cm³. In another embodiment, the blend has a density from 0.930 to 0.970 g/cm³, and preferably from 0.935 to 0.965 g/cm³, and more preferably from 0.940 to 0.960 g/cm³.

In another embodiment, the blend has a density greater than, or equal to, 0.940 g/cm³, preferably greater than, or equal to, 0.945 g/cm³, and more preferably greater than, or equal to, 0.950 g/cm³. In another embodiment, the blend has a density less than, or equal to, 0.970 g/cm³, preferably less than, or equal to, 0.965 g/cm³. In another embodiment, blend has a density less than, or equal to, 0.960 g/cm³, preferably less than, or equal to, 0.955 g/cm³. In another embodiment, the blend has a density from 0.940 to 0.970 g/cm³, and preferably from 0.945 to 0.965 g/cm³, and more preferably from 0.950 to 0.960 g/cm³.

In another embodiment, the blend has a melt index ($I_{21}$) less than, or equal to, 100 g/10 min, preferably less than, or equal to, 75 g/10 min, and more preferably less than, or equal to, 50 g/10 min. In another embodiment, the blend has a melt index ($I_{21}$) greater than, or equal to, 6 g/10 min, or greater than, or equal to, 12 g/10 min, or greater than, or equal to, 15 g/10 min. In another embodiment, the blend has a melt index ($I_{21}$) greater than, or equal to, 18 g/10 min, or greater than, or equal to, 20 g/10 min, or greater than, or equal to, 25 g/10 min. In another embodiment, the blend has a melt index ($I_{21}$) from 2 to 50 g/10 min, preferably from 12 to 40 g/10 min, and more preferably from 15 to 35 g/10 min.

In another embodiment, the blend has a melt index ($I_{21}$) greater than, or equal to, 1 g/10 min, or greater than, or equal to, 2 g/10 min, or greater than, or equal to, 3 g/10 min. In another embodiment, the blend has a melt index ($I_{21}$) greater than, or equal to, 12 g/10 min, or greater than, or equal to, 20 g/10 min, or greater than, or equal to, 25 g/10 min. In another embodiment, the blend has a melt index ($I_{21}$) from 1 to 15 g/10 min, preferably from 2 to 13 g/10 min, and more preferably from 3 to 12 g/10 min.

In another embodiment, the blend has a melt index ($I_2$) less than, or equal to, 0.3 g/10 min, preferably less than, or equal to, 0.2 g/10 min, and more preferably less than, or equal to, 0.15 g/10 min. In another embodiment, the blend has a melt index ($I_2$) greater than, or equal to, 0.05 g/10 min, and preferably greater than, or equal to, 0.1 g/10 min.

In another embodiment, the blend has a melt index ($I_2$) less than, or equal to, 1 g/10 min, preferably less than, or equal to, 0.5 g/10 min, and more preferably less than, or equal to, 0.2 g/10 min. In another embodiment, the blend has a melt index ($I_2$) greater than, or equal to, 0.01 g/10 min, and preferably greater than, or equal to, 0.05 g/10 min.

In another embodiment, the blend has a melt flow ratio ($I_{21}/I_2$) greater than, or equal to, 100, preferably greater than, or equal to, 110, more preferably greater than, or equal to, 120.

In another embodiment, the blend has a melt flow ratio ($I_{21}/I_2$) greater than, or equal to, 130, preferably greater than, or equal to, 140.

In another embodiment, the blend has a molecular weight distribution ($M_w/M_n$) greater than, or equal to, 12, preferably greater than, or equal to, 15, or greater than, or equal to, 18, as determined by either conventional or LS GPC. In another embodiment, the molecular weight distribution is greater than, or equal to, 20, as determined by GPC, as determined by either conventional or LS GPC.

In another embodiment, the blend has a molecular weight distribution ($M_w/M_n$) less than, or equal to, 50, preferably less than, or equal to, 40, and more preferably less than, or equal to, 35, as determined by either conventional or LS GPC.

In another embodiment, the blend has a molecular weight distribution ($M_w/M_n$) greater than, or equal to, 7, preferably greater than, or equal to, 10, or greater than, or equal to, 13, as determined by either conventional or LS GPC.

As discussed above, the molecular weight distribution is determined by either conventional GPC or LS GPC. In a further embodiment, the molecular weight distribution is determined by convention GPC. In another embodiment, the molecular weight distribution is determined by LS GPC.

In another embodiment, the blend has a molecular weight distribution ($M_w/M_n$) greater than, or equal to, 12, preferably greater than, or equal to, 15, or greater than, or equal to, 18, as determined by both conventional and LS GPC. In another embodiment, the molecular weight distribution is greater than, or equal to, 20, as by both conventional and LS GPC.

In another embodiment, the blend has a molecular weight distribution ($M_w/M_n$) less than, or equal to, 50, preferably less than, or equal to, 40, and more preferably less than, or equal to, 35, as determined by both conventional and LS GPC. In another embodiment, the blend has a molecular weight distribution ($M_w/M_n$) greater than, or equal to, 7, preferably greater than, or equal to, 10, or greater than, or equal to, 13, as determined by both conventional and LS GPC.

As discussed above, the molecular weight distribution is determined by both conventional GPC and LS GPC. The Mw (Abs) is determined by LS GPC and Mn is determined by conventional GPC.

In another embodiment, the high molecular weight ethylene-based interpolymer is present in an amount greater than, or equal to 50 weight percent, or greater than, or equal to 55 weight percent, or greater than, or equal to 60 weight percent, based on the sum weight of the high molecular weight ethylene-based polymer and the low molecular weight ethylene-based polymer. In another embodiment, the low molecular weight ethylene-based polymer is present in an amount less than, or equal to 50 weight percent, or less than, or equal to 45 weight percent, and or less than, or equal to 40 weight percent, based on the sum weight of the high molecular weight ethylene-based interpolymer and the low molecular weight ethylene-based polymer. In another embodiment, the weight ratio of the high molecular weight component to the low molecular weight component (HMW/LMW) is from 50/50 to 70/30, more preferably from 51/49 to 67/33, and more preferably from 52/48 to 65/35.

In another embodiment, the high molecular weight ethylene-based polymer is present in an amount greater than, or equal to 40 weight percent, or greater than, or equal to 45 weight percent, or greater than, or equal to 50 weight percent, based on the sum weight of the high molecular weight ethylene-based polymer and the low molecular weight ethylene-based polymer. In another embodiment, the low molecular weight ethylene-based polymer is present in an amount less than, or equal to 60 weight percent, or less than, or equal to 55 weight percent, and or less than, or equal to 50 weight percent, based on the sum weight of the high molecular weight ethylene-based interpolymer and the low molecular weight ethylene-based polymer. In another embodiment, the weight ratio of the high molecular weight component to the low molecular weight component (HMW/LMW) is from 40/60 to 70/30, more preferably from 51/49 to 67/33, and more preferably from 52/48 to 65/35.

The blend may comprise a combination of two or more embodiments as described herein.

Catalysts

Typical transition metal catalyst systems, which can be used to prepare the high molecular weight and low molecular weight components of the inventive blend, are Ziegler-Natta catalyst systems, such as the mixed metal magnesium/titanium based catalyst systems, as described in International Publication No. WO 2005/052010, fully incorporated herein by reference.

More specifically, the present catalyst compositions comprise magnesium dichloride having supported thereon a mixture of Group 4 metal halides, especially a mixture of titanium chlorides, zirconium chlorides, and/or hafnium chlorides, and more preferably a mixture of titanium chlorides and hafnium chlorides. In a further embodiment, the catalyst composition is suitably prepared by spray drying, and preferably prepared by spray drying a solution comprising a magnesium compound, especially magnesium dichloride, and the mixture of Group 4 metal compounds, especially halide containing compounds in a primary diluent, especially a diluent comprising one or more C2 to C6 alcohols, and subsequently halogenating, preferably chlorinating the resulting solid particles. Preferred transition metal halides are a mixture of titanium bichloride (which may be complexed with $AlCl_3$ if desired) and hafnium tetrachloride. Preferred halogenating agents are organoaluminum halides, especially alkylaluminum chlorides, such as ethylaluminum sesquichloride ($Al_2(C_2H_5)_3Cl_3$). The relative quantities of magnesium compound, transition metal compounds, and halogenating agent employed, as well as the identity of the halogenating agent, all affect the relative performance of the resulting catalyst composition.

The molar ratio of magnesium compound to transition metal compounds used preferably lies in the range from 0.5/1 to 20/1, and more preferably is from 10/1 to 3/1. The molar ratio of titanium compound to hafnium or zirconium compound in the preferred catalyst precursor compositions preferably lies in the range from 100/1 to 1/20, and more preferably is from 10/1 to 1/10. Most highly preferred catalyst precursors comprise magnesium, titanium, zirconium and hafnium metals, wherein the molar ratio, Mg/Ti/Hf/Zr, is x/y/z/z1, where x is a number from 2 to 20, and y is a number from greater than 0 to 10, and z and z1 are numbers from 0 to 10, and the sum of z and z1 is greater than zero. Depending on the desired polymer properties, the range of x and y and z and z1 may be varied to produce different polymer properties for particular end uses. Preferred ratios of (z+z1)/y are 0.5 to 2.

Suitable primary diluents, used in the spray drying process, include organic compounds that are capable of dissolving the magnesium compound and transition metal compounds used in forming the catalyst composition. Especially suited are alcohols, ethers, (poly)alkyleneglycols, (poly)alkyleneglycol ethers, and mixtures thereof. Preferred primary diluents are C2 to C6 aliphatic alcohols, C2 to C4 dialkylethers, C4 to C6 cyclic ethers, and mixtures thereof. Most preferred primary diluents are ethanol, n-propanol, isopropanol and n-butanol and mixtures thereof. Additional optional components of the composition used to form the spray-dried catalyst precursors include: A) one or more fillers or bulking agents; B) one or more internal electron donors; and/or C) one or more secondary diluent compounds selected from the group consisting of siloxanes, polyalkylene glycols, alkyl or phenyl mono- or diether derivatives of polyalkylene glycols, and crown ethers.

Any solid, finely dispersed material that is inert to the other components of the catalyst system and subsequent polymerization, can be employed as filler or bulking agent for the present compositions. Desirably, the filler provides bulk and strength to the resulting solid, spray-dried particles, to prevent particle disintegration upon particle formation and drying. Suitable fillers can be organic or inorganic. Examples include silica, (especially fumed silica), boron nitride, titanium dioxide, zinc oxide, and calcium carbonate. Fumed hydrophobic, surface modified, silica is preferred because it imparts high viscosity to the slurry and good strength to the spray-dried particles. The filler should be free of absorbed water, and is desirably surface modified as well. Surface modification, such as silane treatment may be used to remove reactive hydroxyl or other functional groups from the filler, although this is not a critical feature of the invention. The filler is not utilized to provide an inert support for deposition of catalyst composition. Other bulking agents/fillers that are soluble in the spray drying mixture may also be used. Polystyrene allyl alcohol interpolymers that are soluble in alkanol solvents may be used.

Accordingly, materials having high internal porosity are not essential for use. Suitable fillers should have an average particle size (D50) no greater than 50 μm, preferably no greater than 5 μm. Preferred fillers are aggregates of smaller primary particles having a D50 particle size of 0.1-1.0 μm. Examples include fumed silica, such as Cabosil available from Cabot Corporation, and Aerosil available from Degussa. A number of different types of fumed silicas may be used as fillers; however the surface modified types, Cab-O-Sil TS-610 and Aerosil R-972 are especially preferred. Fillers that possess some porosity may also be used, as long as the average particle size is sufficiently small, for example, $D_{50}$<10 μm, and especially ≤5 μm. Sufficient filler is employed to produce a slurry suitable for spray-drying, that is, a mixture including a primary diluent that is liquid at normal atmospheric conditions, but readily volatilized under reduced pressure or elevated temperature, the filler and the desired quantities of the above described transition metal compounds and magnesium dichloride. Desirably the slurry contains such filler in an amount from 0 percent by weight to 15 percent by weight, preferably from 2.5 percent by weight to 10 percent by weight. Upon spray-drying, the resulting droplets produce discrete catalyst particles after evaporation of the primary diluent. Desirably, the amount of filler or bulking agent present in the resulting catalyst particles is an amount from 0 to 50 percent, preferably from 10 to 30 percent based on total composition weight. The spray-dried catalyst particles produced in this manner typically have D50 particle size of from 5 to 200 μm, preferably from 10 to 30 μm.

Secondary diluent compounds may be employed to prepare spray-dried products exhibiting particular properties such as uniform particle size, particle sphericity, improved catalyst activity, and reduced fines. Preferred polyalkylene glycol secondary diluents include polyethylene glycol, containing from 2 to 5 alkyleneoxide repeat units. Siloxanes and crown ethers are particularly preferred secondary diluents because they can provide improvements in particle morphology as well as increased activity in comparison to polymerization reactions conducted without the presence of such siloxane or crown ether compounds. Preferred siloxanes include hexamethyldisiloxane, hexaethyldisiloxane and hexaphenyldisiloxane. Preferred crown ethers include 18-crown-6-ether and 15-crown-5-ether. The secondary diluent is preferably present in the catalyst composition in an amount in the range of from 0.5 to 10 percent, based on total catalyst composition weight.

Additional, optional ingredients in the composition to be spray dried include antistatic agents, emulsifiers, and processing aids, which are known to be useful in the art of spray drying to prevent particle agglomeration or fractionation.

Spray-drying may be affected by any spray-drying method known in the art. One example of a suitable spray-drying method comprises atomizing the catalyst composition, optionally with heating, and drying the resulting droplets. Atomization is accomplished by means of any suitable atomizing device to form discrete droplets that, upon drying, form spherical or nearly spherical shaped particles. Atomization is preferably effected by passing a slurry of the catalyst composition through the atomizing device together with an inert drying gas, that is, a gas which is non reactive under the conditions employed during atomization and aids in removal of volatile components. An atomizing nozzle or a centrifugal high speed disc can be employed to effect atomization, whereby a spray or dispersion of droplets of the mixture is formed. The volumetric flow of drying gas, if used, preferably, considerably exceeds the volumetric flow of the slurry to effect atomization of the slurry and/or evaporation of the liquid medium. Ordinarily the drying gas may be heated to temperatures, as high as 200° C., to facilitate atomization and drying of the slurry; however, if the volumetric flow of drying gas is maintained at a very high level, it is possible to employ lower temperatures. The specific choice of drying gas inlet temperature will depend on the design of the spray drying equipment and the inherent thermal stability of the material being dried.

Atomization pressures of from 1-200 psig (100-1.4 MPa) are suitable. Alternately, reduced pressure in the spray recovery section of the dryer can be employed to effect solid particle formation. Some examples of spray-drying methods suitable for use with the present catalyst composition include those disclosed in U.S. Pat. No. 5,290,745, U.S. Pat. No. 5,652,314, U.S. Pat. No. 4,376,062, U.S. Pat. No. 4,728,705, U.S. Pat. No. 5,604,172, U.S. Pat. No. 5,306,350, U.S. Pat. No. 4,638,029, and U.S. Pat. No. 5,716,558; each incorporated herein by reference.

By adjusting the size of the orifices of the atomizer or the speed of rotation of the atomizer disk employed during spray-drying, it is possible to obtain particles having desired average particle size, for example, from 5-200 μm. Typically, a rotary atomizer, such as a Niro FS-10 or FS-15, is used to provide the preferred narrow particle size distribution in the final dried solids.

The spray dried solid precursor is recovered and halogenated with an organoaluminum halide, in order to form an active complex of the magnesium and transition metal halides. The identity and quantity of the halogenating agent employed is selected to result in a catalyst composition having the desired performance properties. A particularly preferred halogenating agent is ethylaluminum sesquichloride. The halogenation agent is employed in molar quantities, based on the measured molar amount of residual alkanol diluent compounds measured in the spray dried solid precursor composition, using standard analytical techniques that require dissolution of the solid precursor sample in aqueous media. One skilled in the art will note that the then measured alkanol content will include both free alcohol and any alkoxides that may have formed via reaction of diluent compound with the zirconium, titanium or hafnium compounds. The halogenation agent is applied at a ratio of Cl to measured alkanol residue from 1/1 to 10/1, preferably from 1.5/1 to 2.5/1. At lower ratios of halogenating agent, catalyst productivity is adversely affected. At higher ratios of halogenating agent polymer molecular weight distribution ($M_w/M_n$) is too narrow.

Halogenation is conducted according to conventional techniques. Preferably the solid precursor particles are suspended or slurried in an inert liquid medium, usually an aliphatic or aromatic hydrocarbon liquid, most preferably one or more C6-50 hydrocarbons. Typical materials are hexane, mixed solvents such as Isopar, or mineral oils, such as the Kaydol and Hydrobrite mineral oils available from Chemtura. The halogenation agent is then added to the mixture, and allowed to react with the precursor for a time, from one minute to one day. Thereafter the solid particles are optionally rinsed free from unreacted halogenated agent, and dried or maintained in a liquid medium until use.

In one particular embodiment, the halogenation step may be conducted in-line, with the polymerization reactor, that is conducting the halogenation reaction in a plug-flow manner, in which the catalyst precursor is activated through halogenation, and the reaction mixture is pumped directly into the polymerization reactor. Apparatus, as described in U.S. Pat. No. 6,617,405 (incorporated herein by reference), is particularly preferred for "in-line" halogenation step.

Formation of olefin polymers is achieved by contacting one or more addition polymerizable olefin monomers with the catalyst composition and an activating cocatalyst, especially an organoaluminum compound, especially a trialkylaluminum compound. Preferred cocatalysts include trimethyl aluminum, triethyl aluminum, triisobutyl aluminum and tri-n-hexyl aluminum. The activating cocatalyst is generally employed in a range based on moles of cocatalyst:moles of transition metal compound of from 2:1 to 100,000:1, preferably in the range of from 5:1 to 10,000:1, and most preferably in the range of from 5:1 to 100:1.

In formulating the catalyst composition, it is preferred that the co-catalyst be separately added to the reactor contents, to the recycle stream of the reactor, or to the monomer or monomers charged to the reactor, and not incorporated into the catalyst particles per se.

The catalyst composition may be used for any reaction for which Ziegler-Natta type polymerization catalysts are normally useful, especially suspension, solution, slurry, gas phase polymerizations, and combinations thereof. Such reactions can be carried out using known equipment and reaction conditions, and are not limited to any specific type of reaction system. Such polymerization can be conducted in a batch wise mode, a continuous mode, or any combination thereof. Generally, suitable olefin polymerization temperatures are in the range of from 0 to 200° C., at atmospheric, subatmospheric, or superatmospheric pressures up to 10 MPa. It is generally preferred to use the catalyst compositions, in polymerizations, at concentrations sufficient to provide at least 0.000001, preferably 0.00001 percent, by weight, of transition metal based on the weight of the monomers to be polymerized. The upper limit of the percentages is determined by a combination of catalyst activity and process economics.

Preferably, gas phase polymerization is employed, at superatmospheric pressure in the range of from 1 to 1000 psi (7 kPa to 7 MPa), at temperatures in the range of from 30-130° C. Stirred or fluidized bed gas phase reaction systems are particularly useful. Generally, a conventional gas phase, fluidized bed process is conducted by passing a stream containing one or more olefin monomers continuously through a fluidized bed reactor, under reaction conditions sufficient to polymerize the monomer(s), and in the presence of an effective amount of catalyst composition and an activating cocatalyst, at a velocity sufficient to maintain a bed of solid particles in a suspended condition. A stream containing unreacted monomer is withdrawn from the reactor continuously, compressed, cooled, optionally fully or partially condensed as disclosed in U.S. Pat. No. 4,543,399, U.S. Pat. No. 4,588,790, U.S. Pat. No. 5,352,749 and US-A-5,462,999 (each incorporated herein by reference), and recycled to the reactor. Product is withdrawn from the reactor, and make-up monomer is added to the recycle stream. In addition, a fluidization aid such as carbon black, silica, clay, or talc may be used, as disclosed in U.S. Pat. No. 4,994,534 (incorporated herein by reference). Suitable gas phase reaction systems are also described in U.S. Pat. No. 5,527,752 (incorporated herein by reference).

Slurry or solution polymerization processes may utilize subatmospheric or superatmospheric pressures, and temperatures in the range of from 40-110° C. Useful liquid phase polymerization reaction systems are known in the art, for example, as described in U.S. Pat. No. 3,324,095, U.S. Pat. No. 5,453,471, U.S. Pat. No. 5,527,752, U.S. Pat. No. 5,834,571, WO 96/04322 and WO 96/04323 (each incorporated herein by reference). Liquid phase reaction systems generally comprise a reactor vessel to which olefin monomer, catalyst composition and cocatalyst are added, and which contains a liquid reaction medium for dissolving or suspending the polyolefin. The liquid reaction medium may consist of the bulk liquid monomer or an inert liquid hydrocarbon that is nonreactive under the polymerization conditions employed.

Although such an inert liquid hydrocarbon need not function as a solvent for the catalyst composition or the polymer obtained by the process, it usually serves as solvent for the monomers employed in the polymerization. Among the inert liquid hydrocarbons typically used for this purpose are alkanes, such as propane, butane, iso-butane, isopentane, hexane, cyclohexane, heptane; benzene and toluene. Reactive contact between the olefin monomer and the catalyst composition should be maintained by constant stirring or agitation. Preferably, reaction medium containing the olefin polymer product and unreacted olefin monomer is withdrawn continuously from the reactor. Olefin polymer product is separated, and unreacted olefin monomer is recycled into the reactor.

The catalysts of the current invention are capable of producing olefin polymers over a wide range of molecular weights. The high molecular weight component is uniformly blended at the molecular level with the lower molecular weight component. Such resins are difficult, if not impossible, to obtain by means of a post-reactor melt blending process. The additional high molecular weight polymer tail resulting from use of the catalyst compositions of the invention desirably increases the melt strength of the resin among other benefits.

These catalysts are also especially useful when employed in two-stage polymerizations such as those disclosed in U.S. Pat. Nos. 5,589,539, 5,405,901 and 6,248,831; each incorporated herein by reference. The catalyst compositions, in conjunction with the specified processing conditions, can be used to obtain ethylene/alpha-olefin resins of broadened or multimodal molecular weight distribution, wherein the amount of comonomer incorporated into the polymer in each reactor is independently controllable.

Such processes require a catalyst composition capable of producing a very high molecular weight polymer in one reactor, and a low molecular weight polymer in a second reactor. The catalyst thus must be able to produce resin at very high propagation/chain termination ratios in one reactor, and much lower propagation/chain termination ratios in the second reactor. The resulting polymers having extremely high melt strength, are useful for manufacture of cast sheet, large size blow molded articles and pipe products.

The catalyst compositions result in polymers that are characterized by a general lack of undesirable small (1 to 5 μm micron) particulate residues that normally result from the fragmentation of catalyst compositions impregnated on porous silica supports during the polymerization process. The presence of these residues in the resulting polymer interferes with certain applications such as filament spinning. Such residues are difficult to economically remove from the polymer via melt screening or similar post reactor technique.

It is understood that the present invention is operable in the absence of any component, which has not been specifically disclosed. Unless otherwise stated, implicit from the context or conventional in the art, all parts and percentages herein are based on weight.

These spray dried catalysts yield polymers with narrow particle size distribution and high granular bulk density, highly suitable for gas phase polymerization reactions.

Polymerization

The novel composition can be made by a variety of methods. For example, it may be made by blending or mixing the high molecular weight interpolymer and the low molecular weight interpolymer, or by melt-blending the individually melted components. Alternatively, it may be made in situ, in one or more polymerization reactors, including, but not limited to, a dual reactor configuration.

If the polymer composition is prepared in situ, in a dual reactor configuration, the polymer made in the first reactor can be either the HMW polymer or the LMW polymer as defined above. The polymer in the second reactor has a density and melt flow rate such that the overall density and melt flow rate of the composition are met. Typically if in the first reactor a HMW polymer is made, in the second reactor relatively little or no comonomer is used, and relatively high hydrogen concentration is used to obtain the overall melt flow rate and density of the final composition. Similar polymerization processes are described in WO2004101674A, incorporated herein by reference.

A high density polyethylene-based resin is made by insertion of ethylene into a growing metal-alkyl chain. The molecular weight of the material is controlled by breaking of the growing metal-alkyl chain. In contrast to other catalyst systems, the dominant chain breaking mechanism is the reaction of the growing metal-alkyl chain with dihydrogen to give a metal-hydride bond and a free alkane (i.e., the free polymer).

In Ziegler catalysts, such as the current one, pendant alkane groups (CH3, CH2) are exceedingly rare unless comonomer is added to the reactor, and thus can be neglected as contributors in the current case. The resin composition thus is essentially a linear—[CH2-CH2-] chain. The resin density is that expected by the folding of a solid, comonomer-free alkane chain within the formed polymer matrix.

The low molecular weight component features a molecular weight distribution that is typical for a high melt index Ziegler resin. The catalyst has been run in batch mode for three hours in the lab reactor without any noticeable change in polymer properties, so that the rate of chain scission by hydrogen has remained essentially constant throughout its residence time in the reactor. The catalyst has also been run in the gas phase in continuous mode, where it made a product that mirrored the lab product.

When the catalyst is run in two-stage mode, as the second stage of a two-stage system (low molecular weight conditions), a high density resin is made, whose molecular weight (and thus melt index) and molecular weight distribution, is seen by gel permeation chromatography to be substantially the same as if the resin had been produced in a single-stage reactor. This is because the polymer formation mechanism in high density Ziegler mode has very limited degrees of freedom as discussed above. The amount of resin produced by the catalyst in the low molecular weight stage is a function of the decay rate of the catalyst, the reaction conditions in the second reactor, and the residence time in the low molecular weight stage. The amount is measured by the ratio of second-reactor material to total material present in the final product.

In a preferred dual reactor configuration, the catalyst precursor and the cocatalyst are introduced in the first reactor, and the polymerizing mixture is transferred to the second reactor for further polymerization. Insofar as the catalyst system is concerned, only cocatalyst, if desired, is added to the second reactor from an outside source. Optionally the catalyst precursor may be partially activated prior to the addition to the reactor (preferably the first reactor), followed by further "in reactor activation" by the cocatalyst.

In the preferred dual reactor configuration, a relatively high molecular weight (low melt flow index) copolymer is prepared in the first reactor. Alternatively, the low molecular weight copolymer can be prepared in the first reactor, and the high molecular weight copolymer can be prepared in the second reactor. For purposes of the present disclosure, the reactor, in which the conditions are conducive to making a high molecular weight polymer, is known as the "high molecular weight reactor". Alternatively, the reactor, in which the conditions are conducive to making a low molecular weight polymer, is known as the "low molecular weight reactor." Irrespective of which component is made first, the mixture of polymer and an active catalyst is preferably transferred from the first reactor to the second reactor, via an interconnecting device, using nitrogen, or second reactor recycle gas, as a transfer medium.

One particular characteristic of polymerization of the inventive polymers is a generally high level of agglomerate formation and "sheet" formation requiring reactor shutdowns for cleaning. This is believed to be caused by the production of very high molecular weight polymer, that is, the inventive polymers, which in turn, appear to generate very high levels of static voltage within the fluidized bed. This then leads to particle segregation to the walls, stagnant zones, and formation of agglomerates or sheets. In order to effectively produce the inventive polymers, an additional aspect of the invention is the introduction of a "continuity additive (CA)" that blocks this tendency for sheet formation.

The exact method of action of these continuity additives is not known. Based on one set of measurements, they appear to minimize static generation, however, it is also clear that the simple minimization of static (i.e. such that static voltage in the fluid bed is near zero) is not sufficient to prevent agglomerate/sheet formation since the mere cessation of continuity additive feed (CA), even with minimal static voltage, results in rapid sheet formation and reactor shutdown. Thus, another embodiment of the invention is the utilization of CA to allow continuous production of the inventive polymers.

Continuity additive is generally a mixture of two components. In one embodiment, each compound is a high molecular weight organic compound containing either hydroxyl functionality, or hydroxyl functionality and amine functionality. The CA compounds are ideally used as solids or waxes. In one embodiment, hydroxyl functionality is introduced as a compound of formula $((RCO_2)_2Al-OH)$, where R is a hydrocarbon radical from 13 to 25 carbons. In one embodiment, the amine functionality is introduced as a compound of the formula $(R')_xN(R"OH)_y$, where R' and R" are each, independently, a hydrocarbon radical (R' having from 14 to 26 carbons, and R" having from 1 to 4 carbons, $x+y=3$, and $x=1$ or 2). More than one CA compound may be used in a polymerization. See U.S. Provisional Application No. 61/017,986, filed on Dec. 31, 2007, and the corresponding PCT application (64183A), each fully incorporated herein. Particularly preferred compounds are aluminum distearate and AS-990 (a commercially available ethoxylated distearyl amine). In practice, the CA should be a 0.5 to 2 to 1 mixture of these two components, and fed directly to the polymerizing reactor bed. The preferred method of feeding these components is as a mineral oil slurry. The preferred location for the CA feed is above the distributor plate, and in the lower ⅓ of the polymerizing bed, that is, the region wherein sheets are most likely to form. An effective amount of this material is fed to the first reactor, in series, to promote good operation and minimize sheet and agglomerate formation.

The polymerization in each reactor is preferably conducted in the gas phase using a continuous fluidized bed process. In a typical fluidized bed reactor, the bed is usually made up of the same granular resin that is to be produced in the reactor. Thus, during the course of the polymerization, the bed comprises formed polymer particles, growing polymer particles, catalyst particles fluidized by polymerization, and modifying gaseous components, introduced at a flow rate or velocity sufficient to cause the particles to separate and act as a fluid. The fluidizing gas is made up of the initial feed, make-up feed, and cycle (recycle) gas, that is, comonomers, and, if desired, modifiers and/or an inert carrier gas.

A typical fluid bed system includes a reaction vessel, a bed, a gas distribution plate, inlet and outlet piping, a compressor, cycle gas cooler, and a product discharge system. In the vessel, above the bed, there is a velocity reduction zone, and, in the bed, a reaction zone. Both are above the gas distribution plate. A typical fluidized bed reactor is further described in U.S. Pat. No. 4,482,687, the entire contents of which are herein incorporated by reference.

The gaseous feed streams of ethylene, other gaseous alpha-olefins, and hydrogen, when used, are preferably fed to the reactor recycle line, as well as liquid or gaseous alpha-olefins and the cocatalyst solution. Optionally, the liquid cocatalyst can be fed directly to the fluidized bed. The partially activated catalyst precursor is preferably injected into the fluidized bed as mineral oil slurry. Activation is generally completed in the reactors by the cocatalyst. The product composition can be varied by changing the molar ratios of the monomers introduced into the fluidized bed. The product is continuously discharged in granular or particulate form from the reactor, as the bed level builds up with polymerization. The production rate is controlled by adjusting the catalyst feed rate and/or the ethylene partial pressures in both reactors.

A preferred mode is to take batch quantities of product from the first reactor, and transfer these to the second reactor using the differential pressure generated by the recycle gas compression system. A system similar to that described in U.S. Pat. No. 4,621,952 (the entire contents of which are herein incorporated by reference) is particularly useful.

The pressure is about the same in both the first and second reactors. Depending on the specific method used to transfer the mixture of polymer and contained catalyst from the first reactor to the second reactor, the second reactor pressure may be either higher than, or somewhat lower than, that of the first. If the second reactor pressure is lower, this pressure differential can be used to facilitate transfer of the polymer catalyst mixture from Reactor 1 to Reactor 2. If the second reactor pressure is higher, the differential pressure across the cycle gas compressor may be used as the motive force to move polymer. The pressure, that is, the total pressure in either reactor, can be in the range of about 100 to about 600 psig (pounds per square inch gauge), and is preferably in the range of about 270 to about 450 psig (1.38, 3.45, 1.86 and 3.10 MPa, respectively). The ethylene partial pressure in the first reactor can be in the range of about 10 to about 150 psia, and is preferably in the range of about 20 to about 100 psia, and more preferably is in the range of about 25 to about 90 psia, (68.9, 1034, 138, 552, 172 and 414 MPa, respectively). The ethylene partial pressure in the second reactor is set according to the amount of copolymer to be produced in this reactor, to achieve the appropriate split. It is noted that increasing the ethylene partial pressure in the first reactor leads to an increase in ethylene partial pressure in the second reactor. The balance of the total pressure is provided by alpha-olefin other than ethylene and an inert gas such as nitrogen. Other inert hydrocarbons, such as an induced condensing agent, for example, isopentane or hexane, also contribute to the overall pressure in the reactor, according to their vapor pressure, under the temperature and pressure experienced in the reactor.

The hydrogen:ethylene mole ratio can be adjusted to control average molecular weights. The alpha-olefins (other than ethylene) can be present in a total amount of up to 15 percent by weight of the copolymer, and, if used, are preferably included in the copolymer in a total amount from about 0.5 to about 10 percent by weight, or more preferably from about 0.8 to about 4 percent by weight, based on the weight of the copolymer.

The residence time of the mixture of reactants including gaseous and liquid reactants, catalyst, and resin, in each fluidized bed can be in the range from about 1 to about 12 hours, and is preferably in the range from about 1.5 to about 5 hours. The reactors can be run in the condensing mode, if desired. The condensing mode is described in U.S. Pat. No. 4,543,399, U.S. Pat. No. 4,588,790 and U.S. Pat. No. 5,352,749, the entire content of each is herein incorporated by reference.

While the polyethylene blends of subject invention are preferably produced in the gas phase by various low pressure processes, the blend can also be produced in the liquid phase in solutions or slurries by conventional techniques, again at low pressures. Low pressure processes are typically run at pressures below 1000 psi, whereas high pressure processes are typically run at pressures above 15,000 psi (6.89 and 103 MPa, respectively).

As discussed above, in a dual reactor system, the high molecular weight component or the low molecular weight component can be prepared in the first reactor or second reactor. Multiple reactor systems include, but are not limited to, two gas phase fluidized bed reactors in series, two stirred tank reactors in series, two loop reactors in series, two solution spheres or loops in series, or a suitable combination of two or more reactors. For the reaction of interest, appropriate comonomer amounts, ethylene partial pressures, and temperatures will be adjusted to produce the desired composition. Such adjustments can be made by those skilled in the art.

High Molecular Weight Reactor Operation Conditions

In an embodiment suitable for pipes, operating temperature can range from about 70° C. to about 113° C. For ethylene-based interpolymers, the mole ratio of alpha-olefin to ethylene in this reactor can be in the range of from about 0.005:1 to about 0.10:1, and is preferably in the range of from about 0.01:1 to about 0.05:1 and most preferably from about 0.010:1 to about 0.035:1. The mole ratio of hydrogen (if used) to ethylene in this reactor can be in the range of from about 0.01:1 to about 0.3:1, preferably of from about 0.02 to about 0.02:1.

In an embodiment suitable for blown films, the high molecular weight reactor operating temperature is generally in the range from about 70° C. to about 113° C. The operating temperature is preferably varied with the desired density to avoid product stickiness in the reactor. The mole ratio of alpha-olefin to ethylene can be in the range from about 0.005 to about 0.1:1, preferably in the range from about 0.01:1 to about 0.05:1. The mole ratio of hydrogen to ethylene can be in the range from about 0.01:1 to about 0.3:1, and is preferably in the range from about 0.05:1 to about 0.25:1.

In an embodiment suitable for blow molding, the high molecular weight reactor operating temperature is generally in the range from about 70° C. to about 113° C. The operating temperature is preferably varied with the desired density to avoid product stickiness in the reactor. The mole ratio of alpha-olefin to ethylene can be in the range from about 0.005:1 to about 0.10:1, preferably in the range from about 0.01:1 to about 0.05:1. The mole ratio of hydrogen to ethylene can be in the range from about 0.01:1 to about 1:1, and is preferably in the range from about 0.02:1 to about 0.03:1.

Low Molecular Weight Reactor Operation Conditions

In an embodiment suitable for pipes, blown films and blow molding, the operating temperature is generally in the range from about 70° C. to about 113° C. For ethylene-based interpolymers, the mole ratio of alpha-olefin to ethylene can be in the range from zero to about 0.065:1, preferably in the range from zero to about 0.055:1. The mole ratio of hydrogen to ethylene can be in the range from about 0.1:1 to about 2:1, and is preferably in the range from about 0.2:1 to about 1.8:1.

By "zero" above we mean no comonomer is fed in the low molecular weight reactor. In commercial reaction systems, trace quantities of comonomer may be carried over into the low molecular weight reactor, generally as dissolved comonomer in the high molecular weight polymer.

Maximization of Catalysts Productivity while Maximizing Total Monomer Ratio (TMR)

In one embodiment of the invention, an automated control scheme that maximizes the catalyst productivity in multiple reactors can be used by adjusting catalyst feed rate, such that the reactor, limited by its maximum allowable working pressure (MAWP), operates at or near the MAWP, without having to vent monomer from the reactor. Additional constraints on the ethylene partial pressure in the other reactor(s) would be required. This process yields improved resin morphology in an economical manner. The scheme can be used for multiple reactors or a single reactor operation. The process is useful in ventures that have a vessel that is limited by MAWP, and have a reactant that, when maximized, yields better properties, or operates more efficiently.

Production Rate Maximizer (PRM) is currently used in UNIPOL™ reactors. There is no constraint built in for vent flow rate or total pressure limitations in the scheme. Production Rate Control is woven into PRM, but has no limitation on vent flow rate or total pressure limitations. The uniqueness of the above process relates to the maximization of catalyst productivity in a reactor (either stand alone or as in any multi-reactor train), by adjusting catalyst flow rate, such that the reactor operates at or near the MAWP of the vessel, without venting monomer from the reactor. The advantage of this process is that reactor(s) operate at conditions that yield desired resin morphology, while controlling venting of monomer (better economics).

For example, for two reactors are linked in series, a Ziegler-Natta type catalyst is fed only to the first reactor producing a high molecular weight resin. This resin containing residual active catalyst is transferred from the first reactor to the second reactor via an inter-reactor transfer system. The second reactor typically operates at or near the MAWP of the reactor vessel, and produces a low molecular component that is intimately mixed with the high molecular weight component, produced in the first reactor. The most preferable resin morphology is produced when the ethylene partial pressure in the second reactor is maximized. This is accomplished by reducing the catalyst feed to the first reactor, thus reducing the residual catalyst transferred to the second reactor, resulting in an increased ethylene partial pressure. The catalyst feed is reduced, until the ethylene partial pressure in the second reactor is such that the total pressure of the reactor is at or near the MAWP of the reactor vessel thereby maximizing the ethylene partial pressure in the reactor, without venting monomer to the flare, and reducing TMR (Ratio of total monomer feed to polymer produced).

In summary, this relates to an automated control scheme that maximizes the catalyst productivity in multiple reactors by adjusting catalyst feed rate, such that the reactor limited by its MAWP operates at or near the MAWP, without having to vent monomer from the reactor. Additional constraints on the ethylene partial pressure in the other reactor(s) would be required. The process yields improved resin morphology in an economical manner. As discussed above, the scheme could also be used in multiple reactor operations and in a single reactor operation.

Additives

The inventive compositions may contain one or more additional components or additives. Suitable additional components include, for example, other polymers, fillers or additives, with the proviso that these additional components do not adversely interfere with the desired advantageous properties of the compositions of the invention. Rather, the additional components are selected such as to support the advantageous properties of an inventive composition and/or to support, or enhance, the composition's particular suitability for a desired application. "Other polymers," comprised in the composition of the invention, means polymers which do not qualify as a HMW interpolymer or a LMW interpolymer, as defined herein. Advantageously, such polymers are compatible with the inventive composition.

Preferred additional components are non polymeric. Additives include processing aids, acid neutralizers, UV stabilizers, hydro peroxide decomposers, thiosyngerists, alkyl radical scavengers, hindered amine stabilizers, multifunctional stabilizers, phosphites, antioxidants, process stabilizers, metal de-activators, additives to improve oxidative or chlorine resistance, pigments or colorants, nucleating agents, fatty acid stearates, fluoroelastomers, agents to modify impact properties of the polymer and combinations thereof.

One or more impact modifiers, such as ethylene-based copolymers and acrylic polymers, may also be added to an inventive composition.

Fabricated Articles

The compositions of the present invention can be used to manufacture a shaped article, or one or more components of a shaped article. Such articles may be single-layer or multi-layer articles, which are typically obtained by suitable known conversion techniques, applying heat, pressure, or a combination thereof, to obtain the desired article. Suitable conversion techniques include, for example, blow-molding, co-extrusion blow-molding, injection blow molding, injection molding, injection stretch blow molding, compression molding, compression blow forming, rotomolding, extrusion, pultrusion, calendering and thermoforming. Shaped articles provided by the invention include, for example, pipes, drums, bottles, drip tapes and tubing, geomembranes, films, sheets, fibers, profiles and molded articles. Films include, but are not limited to, blown films, cast films and bi-oriented films.

The compositions according to the present invention are particularly suitable for fabrication of hollow containers with an excellent balance of mechanical properties. Furthermore, light weight containers can be produced while still meeting the container performance requirements. A higher percentage of post consumer recycle can also be incorporated in containers fabricated from the inventive compositions without loss of container performance requirements.

The compositions according to the present invention are also particularly suitable for durable applications, especially pipes, without the need for cross-linking. Pipes fabricated from an inventive composition have good sag resistance. Pipes include monolayer pipes, as well as multilayer pipes, including multilayer composite pipes. Typically, the pipes of the invention are formed from inventive compositions, which also contain a suitable combination of additives, such as, an additive package designed for pipe applications, and/or one or more fillers.

In one embodiment, the inventive compositions may be used in powder (granulate) applications, such as those applications which benefit from the narrow particle size distribution in rotomolding applications, and/or the better dispersion of the in-situ blends.

Monolayer pipes according to the present invention consist of one layer made from a composition according to the present invention and suitable additives typically used or suitable for pipe applications. As discussed above, such additives, typically include colorants and materials suitable to protect the bulk polymer from specific adverse environmental effects, for example, oxidation during extrusion, or degradation under service conditions. Suitable additives include process stabilizers, antioxidants, pigments, metal de-activators, additives to improve chlorine resistance and UV protectors.

The resins and compositions provided by the present invention are particularly suitable for use in domestic and industrial pipe applications required to be operable at higher temperatures, for example, above 40° C., and in particular in the range from above 40° C. to about 90° C.

Such pipe applications include, for example, hot water pipes, for example, for drinking and/or sanitary purposes and under floor heating pipes. Such pipes may be monolayer or multilayer pipes. Preferred pipes according to the invention meet the performance requirements, as defined in the norms for hot water pipes, for example, in ISO 10508 (2006). The multimodal polyethylene resin according to the present invention enables pipes combining an excellent high temperature performance, as reflected, for example, in excellent long term hydrostatic strength at higher temperatures (well above 20° C.) with good flexibility. Good flexibility facilitates pipe installation. The pipes can be produced without cross linking, which allows improved processing economics and subsequent welding. For plastic pipe applications, circumferential (hoop) stress performance as set forth in ISO 9080 (2003) and ISO 1167 (1996) is an important requirement. The long term behavior or lifetime of plastic pipes can be predicted based on creep rupture data and curves, which establish the allowable hoop stress (circumferential stress), which a pipe can withstand, without failure.

In another embodiment, an inventive composition may be rheology modified using azide-coupling, oxygen tailoring, and/or other forms of post reactor modification. The rheology modified compositions may be used in the fabrication of transmission or distribution pipes for water, gases and other liquids or slurries, for example, PE 2708, PE4710 and PE-100 (pipe performance, as per ASTM D-3350-05; and especially pipes that equal, or exceed, a PE 80 performance rating. The rheology modified compositions can be used to increase the service life of the pipe. Such pipes may be formed by extruding the compositions described herein by any convenient method. U.S. Pat. No. 6,204,349; U.S. Pat. No. 6,191,227; U.S. Pat. No. 5,908,679; U.S. Pat. No. 5,683,767; U.S. Pat. No. 5,417,561 and U.S. Pat. No. 5,290,498; disclose various pipes and methods of making the pipes which can be used in embodiments of the invention. As such, the disclosures of all of the preceding patents are fully incorporated herein by reference.

Other useful fabricated articles can be made from the compositions or the rheology modified compositions disclosed herein. For example, molding operations can be used to form useful fabricated articles or parts from the compositions disclosed herein, including various injection molding processes (e.g., that described in Modern Plastics Encyclopedia/89, Mid October 1988 Issue, Volume 65, Number 11, pp. 264-268, "Introduction to Injection Molding" by H. Randall Parker and on pp. 270-271, "Injection Molding Thermoplastics" by Michael W. Green, the disclosures of which are incorporated herein by reference) and blow molding processes (e.g., that described in Modern Plastics Encyclopedia/89, Mid October 1988 Issue, Volume 65, Number 11, pp. 217-218, "Extrusion-Blow Molding" by Christopher Irwin, the disclosure of which is incorporated herein by reference), profile extrusion (i.e., for pipes), calandering, pultrusion, and the like. The inventive compositions may also be used to form fibers, monofilaments and monotapes.

Film and film structures particularly benefit from this invention, and can be made using conventional blown film fabrication techniques or other, preferably biaxial, orientation processes, such as tenter frames or double bubble processes.

The films may be monolayer or multilayer films. The film made using this invention can also be coextruded with the other layer(s), or the film can be laminated onto another layer(s) in a secondary operation. If the film is a coextrusion of two or more layers (also described by Osborn and Jenkins), the film may still be laminated to additional layers of packaging materials, depending on the other physical requirements of the final film. Monolayer and coextruded films can also go through other post extrusion techniques, such as radiation induced cross-linking of the polymer and a biaxial orientation process.

Extrusion coating is yet another technique for producing multilayer film structures using the novel compositions described herein.

Generally for a multilayer film structure, the novel compositions described herein comprise at least one layer of the total multilayer film structure. The inventive compositions may also be used to form battery separator films.

The compositions of the invention are well suited for the formation of geomembranes, which are essentially impermeable synthetic sheets used for the containment of liquids, gases and/or solids. Geomembranes are used to convey water, hold water, cover water, and protect water by containing hazardous materials. Geomembranes are also used a hydraulic barrier in purification processes, and as a gas barrier. In particular, geomembranes are used to contain water for agricultural use, and/or to keep pollutants out of a clean water supply. A geomembrane may be prepared by sealing, via heat or other means, films or sheets formed from polyolefin compositions, along one or more overlapping seams, to create a long, wide sheet with fused overlaps. A geomembrane may also be formed from sheets of polymer that are welded together on the site of end use, such as on a piece a farm land. Films and sheets may contain multiple layers of coextruded polymer compositions. Polyolefins may be coextruded with polar polymers, such as polyamides, ethylene vinyl alcohol and polyesters.

DEFINITIONS

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to density, melt index, weight percent of component and other properties.

The term "polymer" is used herein to indicate, a homopolymer, a copolymer, or a terpolymer. The term "polymer" as used herein includes interpolymers such as, for example, those made by the copolymerization of ethylene with C3-C10 alpha olefins or polypropylene with ethylene and/or C4-C10 alpha olefins.

The term "interpolymer," as used herein, refers to polymers prepared by the polymerization of at least two different types of monomers. The generic term interpolymer thus includes copolymers, employed to refer to polymers prepared from two different types of monomers, and polymers prepared from more than two different types of monomers.

The term "ethylene-based polymer," as used herein, refers to a polymer that comprises at least a majority mole percent ethylene (based on total amount of polymerized monomer), and, optionally, one or more additional comonomers. As known in the art, the monomers are present in the polymer in polymerized form.

The term "ethylene-based interpolymer," as used herein, refers to an interpolymer that comprises at least a majority mole percent ethylene (based on total amount of polymerized monomer), and one or more additional comonomers.

The term "ethylene/α-olefin interpolymer," as used herein, refers to an ethylene-based interpolymer that comprises at least a majority mole percent ethylene (based on total amount of polymerized monomer), an α-olefin, and optionally, one or more additional comonomers.

The term "unimodal" as used herein in reference to the overall MWD of comparative examples or in reference to the MWD of a component polymer of the inventive composition means the MWD in a Gel Permeation Chromatography (GPC) curve does not substantially exhibit multiple component polymers, i.e., no humps, shoulders or tails exist or are substantially discernible in the GPC curve.

The term "bimodal" as used herein means that the MWD in a GPC curve exhibits two component polymers wherein one component polymer may even exist as a hump, shoulder or tail relative to the MWD of the other component polymer.

The term "multimodal" as used herein means that the MWD in a GPC curve exhibits more than two component polymers wherein one component polymer may even exist as a hump, shoulder or tail relative to the MWD of the other component polymer.

The term "distinct" as used in reference to the MWD of the LMW component and the HMW component means there is no substantial overlapping of the two corresponding molecular weight distributions in the resulting GPC curve. That is, each molecular weight distribution is sufficiently narrow and their average molecular weights are sufficiently different that the MWD of both components substantially exhibits a baseline on its HMW side as well as on its LMW side.

As used herein, the term "rheology modification" means change in melt viscosity of a polymer as determined by creep measurements and DMS (Dynamic Mechanical Spectroscopy).

The term "inertly substituted" refers to substitution with atoms or groups which do not undesirably interfere with the desired reaction(s) or desired properties of the resulting coupled polymers.

The term "melt processing" is used to mean any process in which the polymer is softened or melted, such as extrusion, pelletizing, film blowing and casting, thermoforming, compounding in polymer melt form, and the like.

The term "extruder" is used for its broadest meaning to include such devices, as a device which extrudes pellets.

The terms "blend" or "polymer blend," as used herein, mean a blend of two or more polymers. Such a blend may or may not be miscible. Such a blend may or may not be phase separated. Such a blend may or may not contain one or more domain configurations, as determined from transmission electron microscopy, light scattering, x-ray scattering, and other methods known in the art.

The term "polyethylene homopolymer," and like terms, as used herein, refer to a polymer polymerized in a reactor in the presence of ethylene, and in which no fresh comonomer is fed into the reactor. Fresh comonomer, as known in the art, refers to a feed source of comonomer located outside a reactor or located outside one or more reactors operated in series or parallel, and which comonomer is fed into a reactor from this outside feed source. Very low levels of comonomer, if any, are present in the reactor in which the homopolymer is polymerized. Typical comonomer to ethylene molar ratio is "less than 0.001" to 1 (as determined by minimum level of comonomer detectable by on-line gas chromatography to the reactor at issue).

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

TEST METHODS

Density

Resin density was measured by the Archimedes displacement method, ASTM D 792-00, Method B, in isopropanol. Specimens were measured within one hour of molding, after conditioning in the isopropanol bath at 23° C. for 8 minutes to achieve thermal equilibrium prior to measurement. The specimens were compression molded according to ASTM D-4703-00, Annex A, with a 5 min initial heating period at about 190° C. and a 15° C./min cooling rate per Procedure C. The specimen was cooled to 45° C. in the press, with continued cooling until "cool to the touch."

Melt Flow Rate by Extrusion Plastomer

Melt flow rate measurements were performed according to ASTM D-1238-04, Condition 190° C./2.16 kg, Condition 190° C./5 kg and Condition 190° C./21.6 kg, which are known as $I_2$, $I_5$ and $I_{21}$, respectively (ethylene-based polymers). Melt flow rate is inversely proportional to the molecular weight of the polymer. Thus, the higher the molecular weight, the lower the melt flow rate, although the relationship is not linear. Melt Flow Ratio (MFR) is the ratio of melt flow rate ($I_{21}$) to melt flow rate ($I_2$), unless otherwise specified.

ATREF

General Overview

The inventive blend is characterized by ATREF (Analytical Temperature Rising Elution Fractionation), as described, for example, in Wild et al., *Journal of Polymer Science*, Poly. Phys. Ed., Vol. 20, p. 441 (1982); in U.S. Pat. No. 4,798,081 (Hazlitt et al.); or in U.S. Pat. No. 5,089,321 (Chum et al.), the disclosures of all of which are fully incorporated herein by reference. See also L. G. Hazlitt, J. Appl. Polym. Sci.: Appl. Poly. Symp., 45, 25-37 (1990), which is fully incorporated herein by reference.

In the technique of Analytical Temperature Rising Elution Fractionation (as described in U.S. Pat. No. 4,798,081), the polymer composition to be analyzed is dissolved in a suitable hot solvent (for example, 1,2,4-trichlorobenzene), and allowed to crystallized in a column containing an inert support (for example, stainless steel shot), by slowly reducing the temperature of the column. The column is equipped with both an (1) infra-red detector (for example, an IR-4 from Polymer ChAR, Valencia, Spain), or a refractive index, and (2) a differential viscometer (DV) detector. An ATREF-DV chromatogram curve is then generated by eluting the crystallized polymer sample from the column by slowly increasing the temperature of the column.

The ATREF curve is also frequently called the short chain branching distribution (SCBD), since it indicates how the comonomer (for example, hexene) is distributed throughout the sample, in that as elution temperature decreases, comonomer content increases. The IR detector provides concentration of polymer as a function of temperature, which can be used to generate the short chain branching distribution. The differential viscometer detector provides an estimate of the viscosity average molecular weight at each elution temperature (see U.S. Pat. No. 4,798,081). The generated curves that show data obtained from both the IR detector and the differential viscometer detector are known as, collectively, an ATREF-DV overlay profile.

In the region (70° C.-90° C.), a regression slope can be calculated from the log(Mv) versus elution temperature, using a linear regression technique, such as available in the EXCEL program LINEST (MicroSoft Corp., Redmond, Wash.). The regression slope is also denoted as the coefficient of the viscosity average molecular weight (CMv).

A more detailed description of the Analytical Temperature Rising Elution Fractionation—Differential Viscometry (ATREF-DV) analysis is described below.

Determination of the Coefficient of Viscosity Average Molecular Weight (CMV) Using ATREF-DV Fractionation by Analytical Temperature Rising Elution Fractionation—Differential Viscometry, ATREF-DV, was performed on the polymer samples, using the methods and apparatus described by Wild[1] and Hazlitt[2,3]. The column was constructed from 1/8"×18" thin-wall stainless-steel tubing, and packed with 0.023"×0.023" stainless-steel shot from Pellets Inc. (Tonawanda, N.Y.). The column had a 1.5 ml interstitial volume.

[1] L. Wild, T. R. Ryle, D. C. Knobeloch, and I. R. Peat, *Journal of Polymer Science: Polymer Physics Edition*, Vol. 20, 441-455 (1982).
[2] L. Hazlitt and D. Moldovan, U.S. Pat. No. 4,798,081, 1989.
[3] L. Hazlitt, *Journal of Applied Polymer Science: Applied Polymer Symposia*, 45, 25-37 (1990).

A controlled GC (Gas Chromatography) oven was used to affect the temperature profiles. Two additional ovens provided high temperature thermal control, respectively, for the sample loading chamber, and a value section, which contained various valves for directing solvent flow. These later two ovens were maintained at 130° C.

As discussed above, the polymer sample was dissolved in a suitable solvent, such as 1,2,4-trichlorobenzene (containing 180 ppm BHT as an antioxidant) to form a polymer solution. The initial polymer concentration was between 50 mg and 200 mg in 50 ml (at room temperature) of the 1,2,4-trichlorobenzene (TCB), and this concentration was adjusted to accommodate the sharpness of the eluting peaks, so that it would not exceed the maximum response for the concentration and viscosity detection in the data collection hardware. Such adjustments can be made by one skilled in the art.

The polymer solution was deposited on the stainless steal column, at a column temperature of 130° C. Once deposited on the column, the temperature of the column was decreased at a maintained rate of −0.1° C./min, to a final column temperature of about 20° C. Next, the elution temperature was increased at a rate of 1.0° C./min, from 20° C. to 122° C. The solvent elution also began at this time, and the solvent (1,2,4-trichlorobenzene containing 180 ppm BHT as an antioxidant) flow rate was 1.0 ml/min. The elution was directed, via heated transfer lines, to, first, an IR-4[4] infrared detector, second, PD2040 low angle laser light scattering (LALLS) detector[5], and finally a Model H502C differential viscometer[6]. Each detector was maintained at a temperature of 140° C. A reservoir for solvent waste was provided after the sequence of detectors. Temperature control, valve sequencing and data collection were achieved using LabView[7] software[8] on a personal computer.

[4] Sold by PolymerChar of Valencia, Spain.
[5] Sold by Precision Detectors of Bellingham Mass.
[6] Sold by Viscotek of Houton, Tex.
[7] Trademark of National Instruments of Austin, Tex.
[8] Written under contract with Quantum Automation of Houston, Tex.

The data collected for each copolymer, during each elution of the ATREF-DV apparatus, consisted of the column elution temperature [RTD, $T_i$(° C.)], the mass or concentration response [infrared detector, $IR_i$(mv)], the differential viscosity response [differential viscometer, $DP_i$(mv)], the Inlet Pressure [differential viscometer, $IP_i$(mv)], and the light scattering response [LALLS detector, $LS_i$(mv)]. These are collected at five second intervals. The detector offsets or lag times are corrected in the data processing step. The various detectors are calibrated by using polymers of known weight average molecular weight and intrinsic viscosity[9]. The baseline subtracted data is used in the following equations, where the subscripted i represents an arbitrary data point.

[9] A. Degroot et al, *Waters International GPC Conference* (1998).

Equation 1 shows the relationship between the intrinsic viscosity, $[\eta]_0$, and the viscosity average molecular weight, $M_v$, for the whole polymer. The values of K and a are $6.3*10^{-4}$ and 0.7, respectively.

$$M_v = \left\{ \frac{1}{K} \cdot [\eta]_0 \right\}^{1/a} \quad \text{(Equation 1)}$$

Equation 2 describes how the differential viscosity, $\eta_i$, and the inlet pressure, Inlet, $P_i$, is used to estimate $[\eta]_{0,i}$ for an arbitrary data point using the concentration, $c_i$.

$$[\eta]_{0,i} = \frac{\frac{4 \cdot \eta_i}{\text{Inlet\_}P_i - 2 \cdot \eta_i}}{c_i} \quad \text{(Equation 2)}$$

Equation 3 describes how to calculate the viscosity average molecular weight, $M_{v,i}$.

$$M_{v,i} = \left[\frac{1}{K} \cdot \frac{\frac{4 \cdot \eta_i}{IP_i - 2 \cdot \eta_i}}{c_i}\right]^{1/a} \quad \text{(Equation 3)}$$

Equations 4 and 5 describe how to use the signals from the viscometer, $DP_i$ and $IP_i$ to estimate the differential viscosity, $\eta_i$, and the inlet pressure, Inlet_$P_i$.

$$\eta_i = k_{DP} \cdot DP_i \quad \text{(Equation 4)}$$

$$\text{Inlet\_}P_i = k_{IP} \cdot IP_i \quad \text{(Equation 5)}$$

Equation 6 describes how to calculate the concentration, $c_i$, for an arbitrary point from the IR response, $IR_i$.

$$c_i = k_{IR} \cdot IR_i \quad \text{(Equation 6)}$$

Equation 7 shows the normalization step needed to calculate the overall moments, $M_v$ and $M_w$.

$$C_{total} = \sum_i c_i \cdot w_i \quad \text{(Equation 7)}$$

Equation 8 shows how to calculate the weight average molecular weight for an arbitrary point.

$$M_{w,i} = \frac{k_{LS} \cdot LS_i}{c_i} \quad \text{(Equation 8)}$$

Equations 9 and 10 are used to estimate the values of the various detector constants, $k_{DP}$, $k_{IP}$, $k_{IR}$, and $k_{LS}$, using at least two different polymers, for which the intrinsic viscosity and the weight average molecular weight are known, and adjusting the detector constants, until the proper moments are obtained.

$$M_v = \left[\frac{\sum_i c_i \cdot M_{v,i}^a}{C_{total}}\right]^{1/a} \quad \text{(Equation 9)}$$

$$M_w = \frac{\sum_i c_i \cdot M_{w,i}}{C_{total}} \quad \text{(Equation 10)}$$

Alternatively, the viscometer can be calibrated using methods described by the manufacturer, and the remaining coefficients, $k_{IR}$, and $k_{LS}$, can be obtained as described above. For the purposes of the current invention, only the viscosity average molecular weight, $M_{v,i}$, is required.

As discussed above, the viscosity average molecular weights, $M_{v,i}$, and the elution temperatures, $T_i$, are used to calculate the coefficient of viscosity average molecular weight, CMv, using simple linear regression. This coefficient is the slope for the regression line (log(Mv) vs. elution temperature) using the points between 70° C. and 90° C. in the ATREF-DV data. The values of the logarithm of the viscosity average molecular weights, Log $M_{v,i}$, are treated as the y values, and the elution temperatures, $T_i$, are treated as the x values. As discussed above, the regression slope can be obtained using commercially available routines, such as the function LINEST in EXCEL[10].

[10] Sold by Microsoft Corp.

Flexural and Secant Modulus Properties

The resin stiffness was characterized by measuring the Flexural Modulus at 5% strain and Secant Modulii at 1% strain, and a test speed of 0.5 inch/min (13 mm/min) per ASTM D 790-99 Method B. The specimens were compression molded according to ASTM D-4703-00 Annex 1, with a 5 min initial heating period at about 190° C. and a 15° C./min cooling rate per Procedure C. The specimen was cooled to 45° C. in the press with continued cooling until "cool to the touch."

Tensile Properties

Tensile strength at yield, elongation at yield, ultimate tensile strength, and elongation at break were measured according to ASTM D-638-03 with a test speed of two inches per minute. All measurements were performed at 23° C. on rigid type IV specimens, which were compression molded per ASTM D 4703-00, Annex A-1, with a 5 minute initial heating period at about 190° C., and a 15° C./min cooling rate per Procedure C. The specimen was cooled to 45° C. in the press, with continued cooling until "cool to the touch."

Environmental Stress Crack Resistance (ESCR)

The resin environmental stress crack resistance (ESCR) was measured per ASTM-D 1693-01, Method B, with either 10% or 100% Igepal CO-630 (vendor Rhone-Poulec, N.J.). Specimens were molded according to ASTM D 4703-00, Annex A, with a 5 min initial heating period at about 190° C. and a 15° C./min cooling rate per Procedure C. The specimen was cooled to 45° C. in the press, with continued cooling until "cool to the touch."

In the ESCR test, the susceptibility of a resin to mechanical failure by cracking is measured under constant strain conditions, and in the presence of a crack accelerating agent such as, soaps, wetting agents, and the like.

Per ASTM-D 1693-01 Method B measurements were carried out on notched specimens, in a 10% by volume Igepal CO-630 aqueous solution, maintained at 50° C. Ten specimens were evaluated per measurement. The ESCR value of the resin was reported as F50, the calculated 50% failure time from the probability graph.

Polymer Fines

The amount of polymer fines in a given sample was determined using the following method: 500 grams of polymer were added to a standard sieve set consisting of the following US mesh sizes: 10, 18, 35, 60, 120, 200 (corresponding to 2000 μm, 1000 μm, 500 μm, 250 μm, 125 μm, and 75 μm respectively) and pan. A Rotap or Gradex 2000 shaker was used to separate the particles. The materials which pass through the 120 mesh screen and remain on the pan are classified as fines. The geometric mean is used to calculate the average particle size (APS).

Bulk Density

Bulk density of the polymer was determined using ASTM D1895-96.

Differential Scanning Calorimetry (DSC)

The peak melting temperature Tm, heat of fusion ΔHm, peak crystallization temperature Tc, and heat of crystallization ΔHc, were generated via a TA Instruments Model Q1000 DSC, equipped with an RCS (refrigerated cooling system) cooling accessory and an auto sampler. A nitrogen purge gas flow of 50 ml/min was used throughout. The sample was pressed into a thin film using a press at 175° C. and 1500 psi (10.3 MPa) maximum pressure for about 15 seconds, then air-cooled to room temperature at atmospheric pressure. About 3 to 10 mg of material was then cut into a 6 mm diameter disk using a paper hole punch, weighed to the nearest 0.001 mg, placed in a light aluminum pan (ca 50 mg) and then crimped shut.

The thermal behavior of the sample was investigated with the following temperature profile. The sample was rapidly heated to 180° C. and held isothermal for 3 minutes in order to remove any previous thermal history. The sample was then cooled to −40° C. at 10° C./min cooling rate, and was held at −40° C. for three minutes. The sample was then heated to 150° C. at 10° C./min heating rate. The cooling and second heating curves were recorded.

Gel Permeation Chromatography (GPC)

Polymer molecular weight was characterized by high temperature triple detector gel permeation chromatography (3D-GPC). The chromatographic system consisted of a Waters (Milford, Mass.) 150° C. high temperature chromatograph, equipped with a Precision Detectors (Amherst, Mass.) 2-angle laser light scattering detector, Model 2040, and a 4-capillary differential viscometer detector, Model 150R, from Viscotek (Houston, Tex.). The 15° angle of the light scattering detector was used for calculation purposes. Concentration was measured via an infra-red detector (IR4) from PolymerChar, Valencia, Spain.

Data collection was performed using Viscotek TriSEC software version 3 and a 4-channel Viscotek Data Manager DM400. The Carrier solvent was 1,2,4-trichlorobenzene (TCB). The system was equipped with an on-line solvent degas device from Polymer Laboratories. The carousel compartment was operated at 150° C., and the column compartment was operated at 150° C. The columns were four Polymer Laboratories Mixed-A 30 cm, 20 micron columns. The reference polymer solutions were prepared in TCB. The inventive and comparative samples were prepared in decalin. The samples were prepared at a concentration of 0.1 grams of polymer in 50 ml of solvent. The chromatographic solvent (TCB) and the sample preparation solvent (TCB or decalin) contained 200 ppm of butylated hydroxytoluene (BHT). Both solvent sources were nitrogen sparged. Polyethylene samples were stirred gently at 160° C. for 4 hours. The injection volume was 200 μl, and the flow rate was 1.0 ml/minute.

The preferred column set is of 20 micron particle size and "mixed" porosity gel to adequately separate the highest molecular weight fractions appropriate to the claims.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights.

The polystyrene standard peak molecular weights were converted to polyethylene molecular weights using the following equation (as described in Williams and Ward, J. Polym. Sci., Polym. Let., 6, 621 (1968)):

$$Mpolyethylene = A \times (Mpolystyrene)^B \quad (1A).$$

Where M is the molecular weight, A has a cited value of 0.4316, and B is equal to 1.0. An alternative value of A, herein referred to as "q" or as a "q factor", was experimentally determined to be 0.39. The best estimate of "q" was determined using the predetermined weight average molecular weight of a broad linear polyethylene homopolymer (Mw~115,000 g/mol, Mw/Mn~3.0). Said weight average molecular weight was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The response factor, $K_{LS}$, of the laser detector was determined using the certificated value for the weight average molecular weight of NIST 1475 (52,000 g/mol). The method for obtaining the alternative "q factor" is described in more detail below.

A fourth order polynomial was used to fit the respective polyethylene-equivalent calibration points obtained from equation 1A to their observed elution volumes. The actual polynomial fit was obtained so as to relate the logarithm of polyethylene equivalent molecular weights to the observed elution volumes (and associated powers) for each polystyrene standard.

The total plate count of the GPC column set was performed with Eicosane (prepared at 0.04 g in 50 milliliters of TCB, and dissolved for 20 minutes with gentle agitation.) The plate count and symmetry were measured on a 200 microliter injection according to the following equations:

$$\text{PlateCount} = 5.54 \times (\text{RV at Peak Maximum}/(\text{Peak width at } \tfrac{1}{2} \text{ height}))^2 \quad (2A),$$

where RV is the retention volume in milliliters, and the peak width is in milliliters.

$$\text{Symmetry} = (\text{Rear peak width at one tenth height} - \text{RV at Peak maximum})/(\text{RV at Peak Maximum} - \text{Front peak width at one tenth height}) \quad (3A),$$

where RV is the retention volume in milliliters, and the peak width is in milliliters.

The plate count for the chromatographic system (based on eicosane as discussed previously) should be greater than 22,000, and symmetry should be between 1.00 and 1.12.

The Systematic Approach for the determination of each detector offset was implemented in a manner consistent with that published by Balke, Mourey, et. Al (Mourey and Balke, Chromatography Polym. Chpt 12, (1992)) (Balke, Thitiratsakul, Lew, Cheung, Mourey, Chromatography Polym. Chpt 13, (1992)), using data obtained from the three detectors while analyzing the broad linear polyethylene homopolymer (115,000 g/mol) and the narrow polystyrene standards. The Systematic Approach was used to optimize each detector offset to give molecular weight results as close as possible to those observed using the conventional GPC method. The overall injected concentration, used for the determinations of the molecular weight and intrinsic viscosity, was obtained from the sample infra-red area, and the infra-red detector calibration (or mass constant) from the linear polyethylene homopolymer of 115,000 g/mol. The chromatographic concentrations were assumed low enough to eliminate addressing 2nd Virial coefficient effects (concentration effects on molecular weight).

The calculations of Mn, Mw, and Mz based on GPC results using the IR4 detector (Conventional GPC) and the narrow standards calibration were determined from the following equations:

$$\overline{Mn} = \frac{\sum_i IR_i}{\sum_i \left(\frac{IR_i}{M_{PE,i}}\right)}, \quad (4A)$$

-continued $$\overline{Mw} = \frac{\sum_i (IR_i * M_{PE,i})}{\sum_i IR_i}, \quad (5A)$$

$$\overline{Mz} = \frac{\sum_i (IR_i * M_{PE,i}^2)}{\sum_i (IR_i * M_{PE,i})} \text{ and} \quad (6A)$$

$$\overline{Mz+1} = \frac{\sum_i (IR_i * M_{PE,i}^3)}{\sum_i (IR_i * M_{PE,i}^2)}. \quad (7A)$$

Where $IR_i$ and $M_{PE,i}$ are the IR baseline corrected response and conventional calibrated polyethylene molecular weight for the $i^{th}$ slice of the IR response, elution volume paired data set. The equations 4A, 5A, 6A, and 7A are calculated from polymers prepared in solutions of decalin.

The "q-factor" described previously was obtained by adjusting "q" or A is equation 1A until Mw, the weight average molecular weight calculated using equation 5A and the corresponding retention volume polynomial, agreed with the independently determined value of Mw obtained in accordance with Zimm for the broad linear polyethylene homopolymer (115,000 g/mol).

The weight percent of polymer fraction with molecular weights>$10^6$ g/mol was calculated by summing the baseline corrected IR responses, $IR_i$, for the elution volume slices whose calibrated molecular weights, $M_{PE,i}$, were greater than $10^6$ g/mole and expressing this partial sum as a fraction of the sum of all the baseline corrected IR responses from all elution volume slices. A similar method was used to calculate the weight percentage of polymer fractions with absolute molecular weights>$10^6$ and $10^7$ g/mol. The absolute molecular weight was calculated use the 15° laser light scattering signal and the IR concentration detector, $M_{PE,i, abs}$=$K_{LS}$*$(LS_i)/(IR_i)$, using the same $K_{LS}$ calibration constant as in equation 8A. The paired data set of the $i^{th}$ slice of the IR response and LS response was adjusted using the determined off-set as discussed in the Systematic Approach.

In addition to the above calculations, a set of alternative Mw, Mz and $M_{Z+1}$ [Mw (abs), Mz (abs), Mz (BB) and $M_{Z+1}$ (BB)] values were also calculated with the method proposed by Yau and Gillespie, (Yau and Gillespie, Polymer, 42, 8947-8958 (2001)), and determined from the following equations:

$$\overline{Mw}(abs) = K_{LS} * \frac{\sum_i (LS_i)}{\sum_i (IR_i)}, \quad (8A)$$

where, $K_{LS}$=LS–MW calibration constant. As explained before, the response factor, $K_{LS}$, of the laser detector was determined using the certificated value for the weight average molecular weight of NIST 1475 (52,000 g/mol).

$$\overline{Mz}(abs) = \frac{\sum_i IR_i * (LS_i/IR_i)^2}{\sum_i IR_i * (LS_i/IR_i)}, \quad (9A)$$

$$\overline{Mz}(BB) = \frac{\sum_i (LS_i * M_{PE,i})}{\sum_i (LS_i)} \text{ and} \quad (10A)$$

$$\overline{M_{Z+1}}(BB) = \frac{\sum_i (LS_i * M_{PE,i}^2)}{\sum_i (LS_i * M_{PE,i})}, \quad (11A)$$

where $LS_i$ is the 15 degree LS signal, and the $M_{PE,i}$ uses equation 1A, and the LS detector alignment is as described previously.

In order to monitor the deviations over time, which may contain an elution component (caused by chromatographic changes) and a flow rate component (caused by pump changes), a late eluting narrow peak is generally used as a "flow rate marker peak". A flow rate marker was therefore established based on a decane flow marker dissolved in the eluting sample prepared in TCB. This flow rate marker was used to linearly correct the flow rate for all samples by alignment of the decane peaks. For samples dissolved in decalin, the decalin solvent gave a huge spike in the elution curve which overflowed the IR-4 detector therefore no decane peak can be used as flow rate marker. In order to minimize the effect caused by flow rate change, the flow characteristics of the linear polyethylene homopolymer (115,000 g/mol) prepared in TCB with decane as the flow rate marker was used as the same flow characteristics for solution samples prepared in decalin run on the same carousal.

Extrudate Swell Method

Extrudate swell testing was used to evaluate the average extrudate swell of a polymer strand leaving the die of an extruder, in a range of time representative of a manufacturing process, such as blow molding process. A strand of polymer was produced by a piston-driven capillary rheometer (Göttfert Rheograph 2003 equipped with a 12 mm diameter barrel and a 1 mm diameter circular die of length 10 mm, with a 90° entrance angle) at shear rates of either 300 s$^{-1}$ or 1000 s$^{-1}$ and at a temperature of 190° C. The volumetric flow rate was kept constant. The strand was cut at a distance of 4 cm from the die exit, and the timer started. When the strand reached a total length of 27 cm (namely an incremental length of 23 cm after the timer started), the timer was stopped. High swell materials produced thicker extrudate whose length grows more slowly than that of lower swell materials. The recorded time for the strand to reach the incremental length of 23 cm relates to the extrudate swell. The measurement was repeated five times, to account for measurement variability, and the average result was reported. The extrudate swell is herein reported as the time, $t_{1000}$ seconds, required for the extrudate to cover the distance of 23 cm when extruded at a shear rate of 1000 s$^{-1}$ and the time $t_{300}$ seconds when the extrusion shear rate is 300 s$^{-1}$.

Bottle Weight Method

Figure 8:
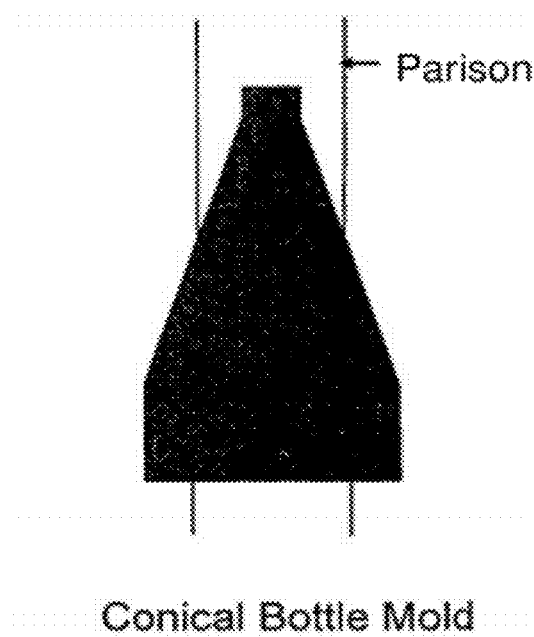
FIG. 8 depicts the conical bottle mold used in the bottle weight swell measurement method.

In this method the resin swell is expressed in terms of bottle weight. Bottles were fabricated on an Improved B-15 intermittent blow molding extrusion machine equipped with a conical bottle mold. The extrusion temperature was maintained at 350° F. and the resin was extruded at a screw speed of 75 rpm. A conical bottle mold, as shown in FIG. 8, was used to fabricate 2.2 liter bottles for swell measurement. The die gap and parison formation time (PFT) were held constant. The bottle weight was equated to the weight swell. With the conical mold it was possible to carry out a single point measurement of the parison diameter at approximately the mid point between the parison top and bottom.

The UNIVAL™ chrome catalyzed blow molding resin, DMDA 6200 (0.953 g/cm$^3$ density, 33 g/10 min $I_{21}$), commercially available from the Dow Chemical Company), was used as the bottle weight standard. At the start of the swell measurement, the extrusion conditions were adjusted such that in a 2.3±0.1 s parison formation time, a 75±0.5 g trimmed bottle, with a lower flash (tail) of acceptable dimension (+0.25 in outside the mold) could be produced from the DMDA 6200 control. The extrusion conditions adjusted were the reciprocating screw shot size to set the tail length, and the die gap to control the weight of the trimmed bottle. The die gap and PFT were held constant, at the settings determined with the DMDA 6200 control resin, during the swell measurement of the test resins. The resin to be tested was extrusion blow molded; the tail size adjusted; the weight of the trimmed bottle reported as the resin bottle weight swell and the bottle diameter at approximately the midpoint reported as the parison diameter.

Rheology

The sample was compression molded into a disk for rheology measurement. The disks were prepared by pressing the samples into 3.0 mm thick plaques, and were subsequently cut into 25 mm diameter disks. The compression molding procedure was as follows: 350° F. (177° C.) for 5 min at 1500 psi (10.3 MPa) under N2 purge protection, then the chase is transferred into an ambient temperature oven with N2 purge until the sample plaque is solidified, then the plaque is removed from the chase.

The resin rheology was measured on the ARES-LS model Rheometer from TA Instruments. The ARES is a strain controlled rheometer. A rotary actuator (servomotor) applies shear deformation in the form of strain to a sample. In response, the sample generates torque, which is measured by the transducer. Strain and torque are used to calculate dynamic mechanical properties such as modulus and viscosity. The viscoelastic properties of the sample were measured in the melt using a 25 mm diameter parallel plate set up at 190° C., and as a function of varying frequency (range 500 s$^{-1}$ to 0.01 s$^{-1}$). A small constant strain (5%) was applied to ensure the measurement was in the linear viscoelastic region. The storage modulus (G'), loss modulus (G"), tan delta (G"/G'), and complex viscosity (eta*) of the resin were determined using Rheometrics Orchestrator software (v. 6.5.8).

13C NMR—Comonomer Content

The comonomer content was determined by 13C NMR. The samples were prepared by adding approximately 3 g of a 50/50 mixture of tetrachloroethane-d2/orthodichlorobenzene, which is 0.025 M in chromium acetylacetonate (relaxation agent), to 0.4 g sample in a 10 mm NMR tube. The samples were dissolved, and homogenized by heating the tube and its contents to 150° C. The data was collected using a Varian Unity Plus 400 MHz spectrometer, or a JEOL Eclipse 400 MHz spectrometer, corresponding to a 13C resonance frequency of 100.4 MHz. Acquisition parameters were selected to ensure quantitative 13C data acquisition in the presence of the relaxation agent. The data was acquired using gated 1H decoupling, 4000 transients per data file, a 6 sec pulse repetition delay, spectral width of 24,200 Hz, and a file size of 65K data points, with the probe head heated to 130° C.

The comonomer incorporation was determined using ASTM D5017-91-Standard Test Method for Determination of Linear Low Density Polyethylene Composition by Carbon-13 Nuclear Magnetic Resonance. Samples that are prepared with a chromium catalyst can be analyzed using Brandolini's assignments for ethylene-hexene [Brandolini, A. J., Hills, D. D., "NMR Spectra of Polymers and Polymer Additives," 64 (2000)].

Volatile Determination

The total volatile level of the pellet samples was determined by the weight loss method, which involved heating a 10 g sample, in a vacuum oven, at 100° C., for one hour. The measurement was carried out on duplicate samples. The average loss in weight was reported as the percent total volatiles present in the sample.

Melt Strength

The melt strength was measured at 190° C. on the Rheotens Model 71.97 Melt Strength Tester in accordance with the operating conditions of this tester.

Structural Characterization

The vinyl/1000 C, and trans vinyl/1000 C content was determined by ASTM D-6248-98; and methyl groups/1000 C was determined by ASTM D2238.

EXPERIMENTAL

The following examples are to illustrate this invention and to not limit it. Ratios, parts, and percentages are by weight, unless otherwise stated.

Representative Polymerization

Polymerizations were carried out in a pilot scale reactor as described in U.S. Pat. No. 6,187,866, incorporated herein by reference. Catalyst was fed only to the high molecular weight reactor. Cocatalyst and Continuity Additive (CA) were also fed separately to the high molecular weight reactor. CA feed occurred at a bed height approximately one foot above the catalyst feed point, however this is not a critical feature of the polymerization process. CA feed rate was maintained at 20 to 50 ppm, based on the polymer production rate, at a level sufficient to control sheet formation.

In the representative polymerizations as shown in the tables below, no comonomer was deliberately added to the low molecular weight reactor; however small amounts (equivalent to that dissolved in the polymer; comonomer to ethylene molar ratio less than 0.001/1 (on-line gas chromatography to reactor)) are carried over into the low molecular weight reactor. There is optional cocatalyst feed to this low molecular weight reactor. Reaction conditions used to produce these samples are given in Table 1A to 1C.

The inventive examples are suitable for various applications, including films, pipes and blow molded articles, and in particular, Examples 1-3 and 7 are especially suitable for films and pipes, and Examples 4-6 and 8-12 are especially suitable for blow molding applications.

TABLE 1A

Process Conditions Used to Produce Inventive Examples 1-5

| | Inventive Example | | | | |
| --- | --- | --- | --- | --- | --- |
| | 1 | 2 | 3 | 4 | 5 |
| Reactor | High MW | High MW | High MW | High MW | High MW |
| Catalyst Type | B | B | B | B | B |
| Reaction Conditions | | | | | |
| Temp. ° C. | 80 | 80 | 80 | 80 | 80 |
| C2 Part. Pressure, psi | 86.9 | 79 | 109.8 | 74.5 | 84.5 |
| H2/C2 Molar Ratio | 0.1 | 0.107 | 0.127 | 0.152 | 0.21 |

TABLE 1A-continued

Process Conditions Used to Produce Inventive Examples 1-5

| | Inventive Example | | | | |
|---|---|---|---|---|---|
| | 1 | 2 | 3 | 4 | 5 |
| C6/C2 Molar Ratio | 0.031 | 0.031 | 0.031 | 0.015 | 0.026 |
| Alkyl Feed | 184.7 | 164 | 163.4 | 163.1 | 152.3 |
| Isopentane Mol % | 9.4 | 10 | 9.3 | 10.5 | 10.4 |
| Cocatalyst Type | TEAL | TEAL | TEAL | TEAL | TEAL |
| Catalyst Feed cc/h | 9 | 9 | 9 | 9 | 9 |
| E.B. Production Rate, lb/h | 20.9 | 21 | 29.7 | 25 | 25 |
| Bed Weight, lb | 77.3 | 77.3 | 78.3 | 78.3 | 77.7 |
| Residence Time, h | 3.7 | 3.7 | 2.6 | 3.1 | 3.1 |
| SGV (ft/sec) | 1.8 | 1.8 | 1.5 | 1.3 | 1.3 |
| High MW Resin Properties | | | | | |
| Flow Index, g/10 min $I_{21}$ | 0.48 | 0.41 | 0.44 | 0.26 | 0.69 |
| Melt Index, g/10 min $I_5$ | Not determined | Not determined | 0.03 | 0.02 | 0.03 |
| Density, g/cm$^3$ | 0.9306 | 0.9296 | 0.9308 | 0.9328 | 0.9337 |
| $I_{21}/I_5$ | Not determined | Not determined | 15 | 13 | 23 |
| Titanium, ppmw | 5.9 | 6.9 | 7.7 | 9.5 | 8.5 |
| Hafnium ppmw | 20.5 | 23.2 | 27 | 33 | 29.8 |
| Aluminum ppmw | 130.3 | 136.1 | 114.6 | 139 | 158.8 |
| Al/Ti | 39.4 | 35.2 | 26.5 | 26 | 33.1 |
| Al/Ti from Alkyl Feed | 24.3 | 20.2 | 11.5 | 10.9 | 18.1 |
| Bulk Density, lb/ft$^3$ | 22.5 | 21.7 | 21.4 | 22.9 | 25.6 |
| APS, in | 0.037 | 0.043 | 0.045 | 0.041 | 0.028 |
| Fines, Wt % LT 120 Mesh | 0.5 | 0.2 | 0.2 | 1.1 | 0.7 |
| Reactor | Low MW | Low MW | Low MW | Low MW | Low MW |
| Reaction Conditions | | | | | |
| Temp. °C. | 109.8 | 109.9 | 109.9 | 109.9 | 109.8 |
| Pressure, psig | 390.7 | 394.1 | 393.1 | 393.4 | 394.9 |
| C2 Part. Pressure, psi | 98.1 | 81.7 | 69.8 | 102.1 | 84.2 |
| H2/C2 Molar Ratio | 1.5 | 1.5 | 1.5 | 1.5 | 1.5 |
| C6/C2 Molar Ratio | 0 | 0 | 0 | 0 | 0 |
| SGV (ft/sec) | 1.8 | 1.8 | 1.8 | 1.9 | 1.8 |
| Overall Mass Balance Prod. Rate Resin Final Properties | 32.1 | 23.6 | 42.9 | 51.3 | 40 |
| Flow Index, g/10 min $I_{21}$ | 10.84 | 8.83 | 9.85 | 31.85 | 31.37 |
| Melt Index, g/10 min $I_5$ | 0.40 | 0.32 | 0.37 | 0.99 | 1.06 |
| Melt Index, g/10 min $I_2$ | 0.07 | 0.06 | 0.07 | 0.16 | 0.20 |
| Density, g/cm$^3$ | 0.9505 | 0.9498 | 0.9502 | 0.957 | 0.9544 |
| $I_{21}/I_5$ | 27 | 27 | 27 | 32 | 30 |
| $I_{21}/I_2$ | 155 | 147 | 141 | 199 | 157 |
| Titanium, ppmw | 3.2 | 3.6 | 3.9 | 4.2 | 3.9 |
| Hafnium ppmw | 10.6 | 11.7 | 13.4 | 14.4 | 14.1 |
| Aluminum ppmw | 116.6 | 119.5 | 88.6 | 85 | 95.8 |
| Al/Ti | 64.2 | 59.8 | 40.6 | 36.1 | 43.9 |
| Bulk Density, lb/ft$^3$ | 27 | 26.2 | 25.2 | 27.5 | 30.3 |
| APS, inches | 0.042 | 0.047 | 0.051 | 0.044 | 0.03 |
| Fines, Wt % LT 120 Mesh | 0.7 | 0.4 | 0.3 | 0.9 | 0.8 |
| Split HMW % by X-ray | 54.8 | 51.6 | 50.5 | 44 | 45.5 |

TABLE 1B

Process Conditions Used to Produce Inventive Examples 6-9

| | Inventive Example | | | |
|---|---|---|---|---|
| | 6 | 7 | 8 | 9 |
| Reactor | High MW | High MW | High MW | High MW |
| Catalyst Type | B | A | A | A |
| Reaction Conditions | | | | |
| Temp. °C. | 80 | 80 | 75 | 80 |
| C2 Part. Pressure, psi | 96.1 | 30.3 | 49.9 | 50.1 |
| H2/C2 Molar Ratio | 0.207 | 0.067 | 0.121 | 0.14 |
| C6/C2 Molar Ratio | 0.027 | 0.039 | 0.04 | 0.04 |
| Alkyl Feed | 159 | 143.6 | 108.4 | 106.9 |
| Isopentane Mol % | 9.8 | 11.45 | 14.02 | 15.83 |
| Cocatalyst Type | TEAL | TEAL | TEAL | TEAL |

TABLE 1B-continued

Process Conditions Used to Produce Inventive Examples 6-9

| | Inventive Example | | | |
|---|---|---|---|---|
| | 6 | 7 | 8 | 9 |
| Catalyst Feed cc/h | 9 | 9 | 9 | 9 |
| E.B. Production Rate, lb/h | 22.5 | 18.8 | 16 | 17.4 |
| Bed Weight, lb | 77.6 | 126.7 | 127.9 | 127.5 |
| Residence Time, h | 3.5 | 4.9 | 5.8 | 5.4 |
| SGV (ft/sec) | 1.3 | 1.9 | 1.8 | 1.7 |
| High MW Resin Properties | | | | |
| Flow Index, g/10 min $I_{21}$ | 0.58 | 0.44 | 0.27 | 0.45 |
| Melt Index, g/10 min $I_5$ | Not determined | Not determined | Not determined | Not determined |
| Density, g/cm$^3$ | 0.9327 | 0.9237 | 0.9266 | 0.9285 |
| $I_{21}/I_5$ | Not determined | Not determined | Not determined | Not determined |
| Titanium, ppmw | 10.5 | 4.3 | 5.6 | 5.7 |
| Hafnium ppmw | 35.2 | Not determined | Not determined | Not determined |
| Aluminum ppmw | 147.7 | 79 | 90.5 | 85 |
| Al/Ti | 25.1 | 32.6 | 28.7 | 26.7 |
| Al/Ti from Alkyl Feed | 10.1 | 19.4 | 15.5 | 13.5 |
| Bulk Density, lb/ft$^3$ | 25.6 | 21.2 | 23.8 | 25.2 |
| APS, in | 0.029 | 0.029 | 0.028 | 0.027 |
| Fines, Wt % LT 120 Mesh | 1 | 1.4 | 1.2 | 1.3 |
| Reactor | Low MW | Low MW | Low MW | Low MW |
| Reaction Conditions | | | | |
| Temp. ° C. | 109.8 | 100 | 100 | 100 |
| Pressure, psig | 394.6 | 394.6 | 394.3 | 393.5 |
| C2 Part. Pressure, psi | 78.9 | 106.6 | 105.2 | 105.1 |
| H2/C2 Molar Ratio | 1.5 | 1.6 | 1.6 | 1.3 |
| C6/C2 Molar Ratio | 0 | 0 | 0 | 0 |
| SGV (ft/sec) | 1.8 | 1.7 | 1.7 | 1.7 |
| Overall Mass Balance Prod. Rate | 32.8 | 46.7 | 65.8 | 75.7 |
| Resin Final Properties | | | | |
| Flow Index, g/10 min $I_{21}$ | 30.28 | 8.90 | 14.70 | 22.80 |
| Melt Index, g/10 min $I_5$ | 1.00 | 0.39 | 0.55 | 0.92 |
| Melt Index, g/10 min $I_2$ | 0.19 | 0.08 | 0.12 | 0.18 |
| Density, g/cm$^3$ | 0.9552 | 0.9444 | 0.9502 | 0.9513 |
| $I_{21}/I_2$ | 159 | 111 | 122 | 127 |
| $I_{21}/I_5$ | 30 | 23 | 27 | 25 |
| Titanium, ppmw | 4.6 | 2.4 | 2.4 | 2.5 |
| Hafnium ppmw | 15.7 | Not determined | Not determined | Not determined |
| Aluminum ppmw | 96.8 | 52.3 | 48 | 40.1 |
| Al/Ti | 37.6 | 39.6 | 36.2 | 28.4 |
| Bulk Density, lb/ft$^3$ | 30.6 | 24.9 | 27.2 | 29.1 |
| APS, inches | 0.029 | 0.031 | 0.033 | 0.031 |
| Fines, Wt % LT 120 Mesh | 1.1 | 1.8 | 0.9 | 0.9 |
| Split HMW % by X-ray | 43.9 | 54.5 | 42 | 44.3 |

TABLE 1C

Process Conditions Used to Produce Inventive Examples 10-12

| | Inventive Example | | |
|---|---|---|---|
| | 10 | 11 | 12 |
| Reactor | High MW | High MW | High MW |
| Catalyst Type | A | A | B |
| Reaction Conditions | | | |
| Temp. ° C. | 80 | 80 | 80 |
| C2 Part. Pressure, psi | 50 | 80 | 70.1 |
| H2/C2 Molar Ratio | 0.145 | 0.149 | 0.141 |
| C6/C2 Molar Ratio | 0.04 | 0.012 | 0.012 |
| Alkyl Feed | 95.1 | 299.1 | 126.7 |
| Isopentane Mol % | 15.54 | 0.72 | 0.69 |
| Cocatalyst Type | TEAL | TnHAL | TEAL |
| Catalyst Feed cc/h | 9 | 13 | 10 |
| E.B. Production Rate, lb/h | 17.4 | 28.2 | 22.5 |
| Bed Weight, lb | 130.5 | 122.3 | 122.1 |
| Residence Time, h | 7.6 | 4.3 | 5.4 |
| SGV (ft/sec) | 1.6 | 2 | 2 |
| High MW Resin Properties | | | |
| Flow Index, g/10 min $I_{21}$ | 0.5 | 1.22 | 0.76 |
| Melt Index, g/10 min $I_5$ | Not determined | Not determined | Not determined |

TABLE 1C-continued

Process Conditions Used to Produce Inventive Examples 10-12

| | Inventive Example | | |
|---|---|---|---|
| | 10 | 11 | 12 |
| Density, g/cm³ | 0.9288 | 0.9359 | 0.938 |
| I$_{21}$/I$_5$ | Not determined | Not determined | Not determined |
| Titanium, ppmw | 5.9 | 3.6 | 3.3 |
| Hafnium ppmw | Not determined | Not determined | Not determined |
| Aluminum ppmw | 76.3 | 174.4 | 177.7 |
| Al/Ti | 22.9 | 86.3 | 96.5 |
| Al/Ti from Alkyl Feed | 7.9 | 73.1 | 83.4 |
| Bulk Density, lb/ft³ | 26.2 | 27.5 | 27.8 |
| APS, in | 0.025 | 0.029 | 0.025 |
| Fines, Wt % LT 120 Mesh | 2.8 | 1.1 | 0.4 |
| Reactor | Low MW | Low MW | Low MW |
| Reaction Conditions | | | |
| Temp. °C. | 100 | 111.9 | 111.9 |
| Pressure, psig | 392.5 | 360.5 | 395.4 |
| C2 Part. Pressure, psi | 90 | 104.1 | 124.8 |
| H2/C2 Molar Ratio | 1.1 | 1.4 | 1.3 |
| C6/C2 Molar Ratio | 0 | 0 | 0 |
| SGV (ft/sec) | 1.7 | 1.8 | 1.8 |
| Overall Mass Balance Prod. Rate | 46.6 | | |
| Resin Final Properties | | | |
| Flow Index, g/10 min I$_{21}$ | 18.10 | 26.40 | 29.40 |
| Melt Index, g/10 min I$_5$ | 0.76 | 1.11 | 1.30 |
| Melt Index, g/10 min I$_2$ | 0.12 | 0.22 | 0.27 |
| Density, g/cm³ | 0.9501 | 0.9581 | 0.9584 |
| I$_{21}$/I$_2$ | 151 | 120 | 109 |
| I$_{21}$/I$_5$ | 24 | 24 | 23 |
| Titanium, ppmw | 2.8 | 1.7 | 1.5 |
| Hafnium ppmw | Not determined | Not determined | Not determined |
| Aluminum ppmw | 57.8 | 67.6 | 71.7 |
| Al/Ti | 37.3 | 70.8 | 87.3 |
| Bulk Density, lb/ft³ | 30.1 | 32.4 | 34.3 |
| APS, inches | 0.028 | 0.028 | 0.028 |
| Fines, Wt % LT 120 Mesh | 1.9 | 0.9 | 0.4 |
| Split HMW % by X-ray (HMW) | 46.5 | 47.2 | 44.6 |

The Energy Balance Production Rate (E.B.) is used for process control. It is a calculation based on standard engineering principles using the known heat of polymerization of ethylene, estimated heat losses to the environment from the polymerization reactor and the specific gas compositions. The "SGV" is the superficial gas velocity through the polymerizing bed of the reactor, measured in feet/second.

The split provides the weight percentage of the high molecular weight component, based on the sum weight of the high molecular weight component and the low molecular weight component. The split is determined by X-ray fluorescence determination of residual metals analysis of resin samples obtained from both reactors. Since catalyst is added only to the first reactor, the decrease in residual Ti, Hf or Zr from first reactor to second reactor allows calculation of the fraction produced in the second reactor, and hence the split. In these examples, residual Hf was not measured for convenience. Since the catalyst compositions were fixed, the residual Hf can be simply calculated, if desired, from the Ti levels and the catalyst compositions given below.

Catalyst Preparation

Catalyst was prepared using equipment and methods described in U.S. Pat. No. 6,982,237 (incorporated herein by reference). Catalysts may be prepared according to the non-limiting formulations listed in Table 2. Other precursor compositions can be prepared using other slightly modified formulations.

TABLE 2

Examples of Catalyst Formulations

| | Catalyst Number | | | | | |
|---|---|---|---|---|---|---|
| | 10 | 13 | 15 | 17 | 21 | 23 |
| Description | 5/1/1/0 | 5/1/0/1 | 5/1/0.5/0 | 5/1/0.5/0.5 | 5/1/1/0 | 5/1/0.5/0 |
| Feedstock Charges, kg | | | | | | |
| Ethanol | 17.65 | 17.6 | 17.6 | 17.6 | 17.6 | 17.3 |
| MgCl2 | 0.875 | 0.87 | 0.886 | 0.895 | 0.882 | 0.895 |
| TiCl3 AA | 0.35 | 0.367 | 0.358 | 0.374 | 0.354 | 0.356 |
| HfCl4 | 0.586 | 0 | 0.298 | 0.299 | 0.572 | 0.297 |
| ZrCl4 | 0 | 0.423 | 0 | 0.221 | 0 | 0 |
| Cabosil TS-610 | 1.3 | 1.3 | 1.3 | 1.31 | 1.3 | 1.3 |
| Spray Drying Conditions | | | | | | |
| Inlet Temp, C. | 164 | 160 | 163 | 163 | 162 | 162 |
| Outlet Temp, C. | 100.7 | 99 | 101 | 101 | 100.5 | 100.4 |
| Atomizer Speed, % | 95 | 95 | 90 | 90 | 90 | 90 |
| Gas Flow, lb/h | 506 | 534 | 524 | 524 | 521 | 521 |
| Slurry Feed, lb, h | 34 | 31 | 32 | 32 | 31.8 | 32.5 |
| Theoretical Yield, kg | 4.2 | 3.9 | 3.8 | 4.1 | 4.1 | 3.8 |
| % Recovery | 94 | 89 | 101 | 90 | 91 | 87 |
| Mass Balance Metal Ratios | | | | | | |
| Mg/Ti | 5.2 | 4.9 | 5.2 | 5 | 5.2 | 5.2 |
| Ti/Hf | 0.96 | -na- | 1.9 | 2 | 1 | 1.9 |
| Ti/Zr | NA | 1 | NA | 2 | NA | NA |

TABLE 2-continued

Examples of Catalyst Formulations

| | Catalyst Number | | | | | |
|---|---|---|---|---|---|---|
| | 10 | 13 | 15 | 17 | 21 | 23 |
| Mass Balance Composition | | | | | | |
| wt % ethanol | 22 to 26 | 22 to 26 | 22 to 26 | 22 to 26 | 22 to 26 | 22 to 26 |
| mmole Mg/g | 2.2 | 2.3 | 2.5 | 2.3 | 2.2 | 2.5 |
| mmole Ti/g | 0.42 | 0.47 | 0.48 | 0.46 | 0.43 | 0.47 |
| mmole Al/g | 0.14 | 0.16 | 0.16 | 0.15 | 0.14 | 0.16 |
| mmole Hf/g | 0.44 | 0 | 0.25 | 0.23 | 0.43 | 0.24 |
| mmole Zr/g | 0 | 0.46 | 0 | 0.23 | 0 | 0 |

NA = Not Applicable

Spray Drying

Catalyst formulations for spray drying are shown in Table 3 below. Feedstock charges, are in kg, as shown in Table 3. Spray Drying Conditions are shown in Table 4.

TABLE 3

Specific Catalysts

| Sample Number | Ethanol | MgCl2 | HfCl4 | TiCl3 | Cab-O-Sil TS-610 |
|---|---|---|---|---|---|
| 6-24 | 17.6 | 0.886 | 0.592 | 0.358 | 1.88 |
| 6-28 | 17.57 | 1.321 | 0.882 | 0.54 | 1.92 |

| Dry Powder Analyses (of the spray dried powder) | Wt % | mm/g | mm/g | mm/g | EASC (added g/g) |
|---|---|---|---|---|---|
| 6-24 (Cat. A) | 22.17 | 2.02 | 0.41 | 0.427 | 0.794 |
| 6-28 (Cat. B) | 22.5 | 2.3 | 0.48 | 0.494 | 0.806 |

TABLE 4

Spray Drying Conditions

| Cycle Gas (lb/hr) | T in (° C.) | T out (° C.) | Feed Rate pph | Atomizer % |
|---|---|---|---|---|
| 616 [6-24 (Cat. A)] | 160 | 103.9 | 35 | 95 |
| 604 [6-28 (Cat. B)] | 160 | 106 | 35 | 95 |

Example Chlorination Procedure

Catalyst precursors were then chlorinated using ethyl aluminum sesquichloride as chlorinating agent, at an aim added Cl/OEth ratio of approximately 2.0 The procedure used to chlorinate the inventive catalysts, used in the specific polymerization experiments described above, is given below. Catalysts A and B above were produced using an identical chlorination procedure as that described below. See Table 5.

TABLE 5

Example Chlorination

| Sample 17 | Aim metal ratio | Al wt % | Hf wt % | Mg wt % | Si wt % | Ti wt % |
|---|---|---|---|---|---|---|
| | Mg/Ti/Hf/Zr 5/1/0.5/0.5 | 0.46 | 4.03 | 5.54 | 17 | 2.13 |

| Al, mmol/g | Hf, mmol/g | Mg, mmol/g | Ti, mmol/g | Zr, mmol/g | % Ethoxide measured as EtOH | Chloride, mm/g |
|---|---|---|---|---|---|---|
| 0.16 | 0.23 | 2.28 | 0.44 | 0.22 | 25.7 | 6.2 |

A six liter glass vessel, equipped with a heating jacket and a helical agitator, is used in the chlorination reaction. Some pressure is generated by gases evolved during the chlorination step due to reaction of residual alcohol with the alkyl groups of the ethyl aluminum sesquichloride.

To the mix tank was charge 2500 ml of dried HB-380 mineral oil. The temperature control was set at 20° C. The agitator was stated at 50% of its maximum speed. The precursor powder (600-700 grams) was then charged to the reactor, and the mixture was stirred for 30 minutes to disperse the precursor. Next, the EASC solution (available as 50% by weight in dry mineral oil) was charged to the alkyl charging system. The pressure controller was set to 2 psig. The EASC solution was charged per recipe, over a roughly a "10 minute" period. The addition was stopped if excessive foaming occurred, or if the temperature increases above 35° C. The addition was resumed after foaming subsided, and the temperature decreased to less then 35° C. The mixture was agitated for another 60 minutes. If the temperature has not reached 35° C., increase the set point to 35° C. during this 60 minute agitation. Results are shown in Table 6 below, and the formulation is shown in Table 7.

TABLE 6

| | Ethanol wt % | Cl/OEth | Neat EASC g/g |
|---|---|---|---|
| Precursor-17 | 26.4 | 2 | 0.92 |

TABLE 7

Formulation

| Ingredient | Aim Amount |
|---|---|
| Mineral Oil (HB380 or Kaydol) | 2500 ml |
| Precursor-15 | 600 g |
| EASC Solution 50% wt in Oil | 1132 g |
| Start Temperature | 20° C. |
| Maximum Temperature during Addition | 35° C. |
| Addition Time | 10 minutes |
| Cookout Time at 35° C. | 60 minutes |
| Net Yield | ~3600 g |

Continuity Additive (CA)

The continuity additive is a mixture of aluminum distearate, and commercially available AS-990 dispersed in mineral oil, at 10 weight percent loading of each component. The HB-380 mineral oil is typically used, but any dry, oxygen free, high viscosity mineral oil may be used as the dispersant.

The effect of the continuity additive is more than just as an agent to control static generation. This is illustrated in FIG. 1.

As seen in FIG. 1, the effect of the continuity additive is not just one of static control, that is, it is not an anti-static agent per se, but an agent that promotes reactor continuity.

Other factors also affect reactor continuity, however, the unique effect of the continuity additive allows for continued production of the inventive resins, despite the presence of a very high molecular weight component. Thus, the continuity additive must be fed, such that a concentration of greater than 0 ppm is maintained in the first reactor. Too much continuity additive also can be deleterious to operation, in that at high levels it will be a catalyst poison. A suitable range for the continuity additive feed is from 5 to 100 ppm, based on polymer production rate, an especially preferred feed rate is from 5 to 70 ppm.

Melt Extrusion

Large size compounded samples of the inventive examples were produced by melt extrusion of the inventive sample powder with antioxidant and catalyst neutralizer. The melt extrusion was carried out on a Kobe LCM 100 extruder equipped with EL-2 rotors. The antioxidants were 0.02 weight percent IRGANOX 1010 and 0.06 weight percent IRGAFOS 168. The acid neutralizer was 0.1 weight percent calcium stearate. Typical extrusion conditions were 180° C. barrel set point temperature. The inventive powders were fed at ambient temperature. The extruder screw speed was typically 220 rpm; resin feed rate 550 lbs/h; the melt pump suction pressure, 7 psig; and the gate position, 10% open.

The properties of the compounded inventive samples are given in Tables 8 to 11, and shown in FIGS. 2-6. The inventive samples properties are compared to commercially available products.

Inventive examples 4 to 6 and 8 to 12 are suitable for fabrication of extrusion blow molded articles. The performance of Inventive example 11 was extensively benchmarked versus the reference samples listed below.

UNIVAL™ DMDA 6200 (0.953 g/cm$^3$ density, 33 g/10 min $I_{21}$): UCAT™ B-375 Cr catalyzed unimodal resin, produced in the gas phase process, and commercially available from the Dow Chemical Company.

CONTINUUM™ DMDA 6601 (0.954 g/cm$^3$ density, 27 g/10 min $I_{21}$) and CONTINUUM™ DMDA 6620 (0.958 g/cm$^3$ density; 27 g/10 min $I_{21}$): UCAT™-J Ziegler-Natta catalyzed, bimodal resins, produced in the gas phase process, and commercially available from the Dow Chemical Company.

ExxonMobil HD 9856B (0.957 g/cm$^3$ density, 0.46 g/10 min $I_2$): bimodal resin produced via the slurry Mitsui process; commercially available from ExxonMobil Equistar ALATHON L5840 (0.958 g/cm$^3$ density; 0.35 g/10 min $I_2$): bimodal resin produced via the Equistar-Nissan-Maruzen process; commercially available from Equistar.

Bimodal resins offer superior stiffness-toughness balance and the ability to fabricate light weight articles without loss of performance. However, bimodal resins are usually low swelling, and difficult to fabricate into extrusion blow molded articles without tooling changes and advanced parison programming. As a result of these processing difficulties, the resulting fabricated articles can have non-uniform thickness distribution especially along the weld lines causing them to fail prematurely in physical property testing such as drop tests.

Due to processing differences bimodal resin regrind cannot be mixed with unimodal Cr catalyzed regrind resulting in additional expense for the fabricated article producer.

Bimodal resins available in the market have either good processability or good stiffness-ESCR balance.

This invention overcomes the above mentioned problems by offering resins with good processability (Table 11) and excellent stiffness-ESCR balance (Table 9).

Figure 5:
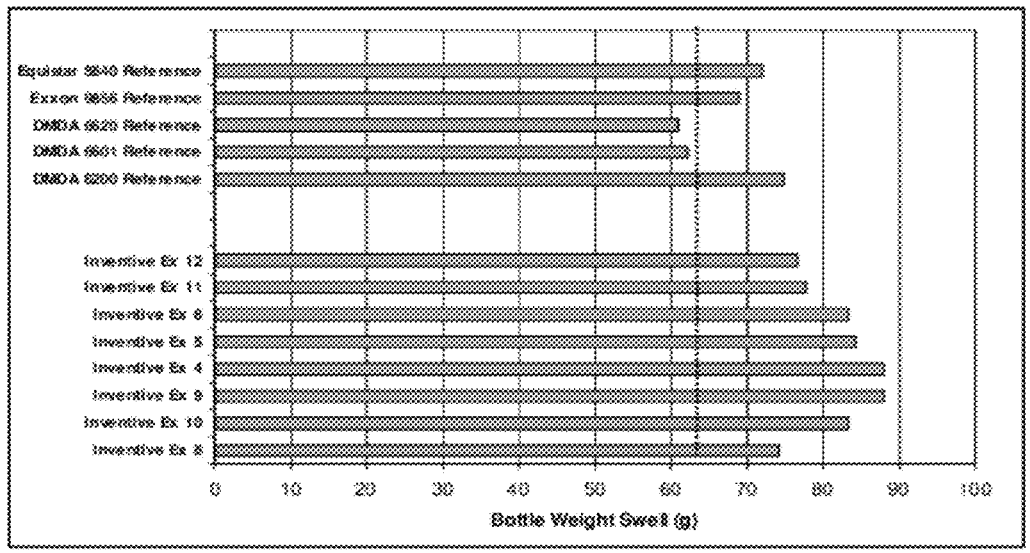
FIG. 5 depicts Bottle Weight Swell for Inventive Examples 4-6 and 8-12, and five Comparative Examples (UNIVAL™ DMDA 6200, CONTINUUM™ DMDA 6601, CONTINUUM™ DMDA 6620, ExxonMobil 9856B, and Equistar 5840).
Figure 6:
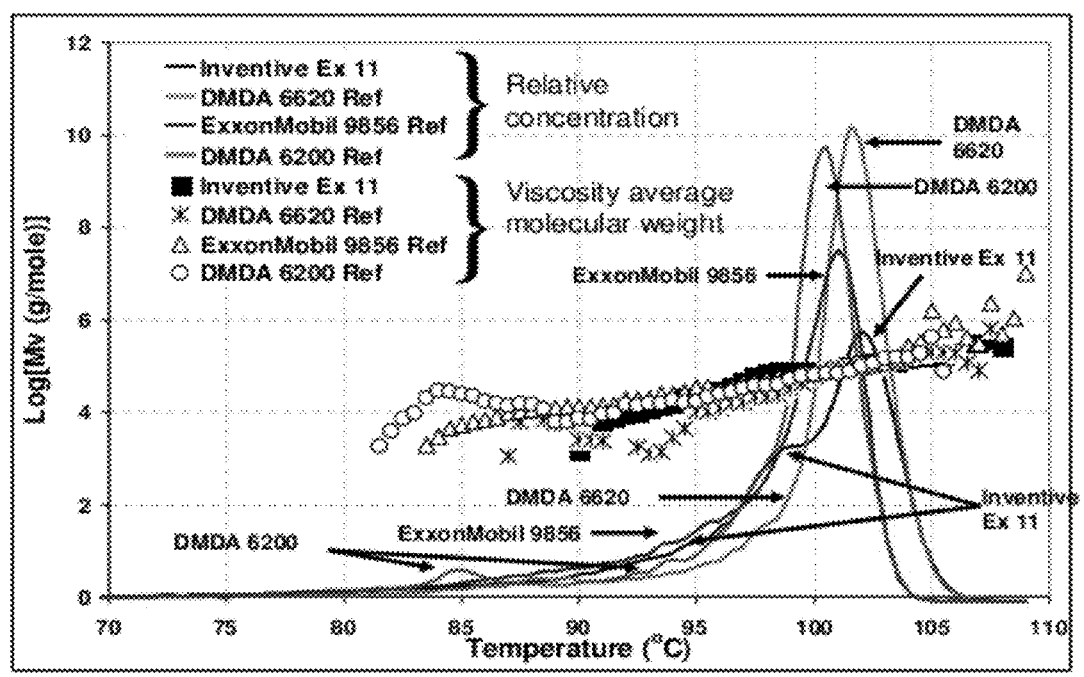
FIG. 6 depicts ATREF (Analytical Temperature Rising Elution Fractionation)-DV (differential viscometry) profile of Inventive Example 11 and several Comparative Examples (UNIVAL™ DMDA 6200, CONTINUUM™ DMDA 6620, and ExxonMobil 9856B).
Figure 7:
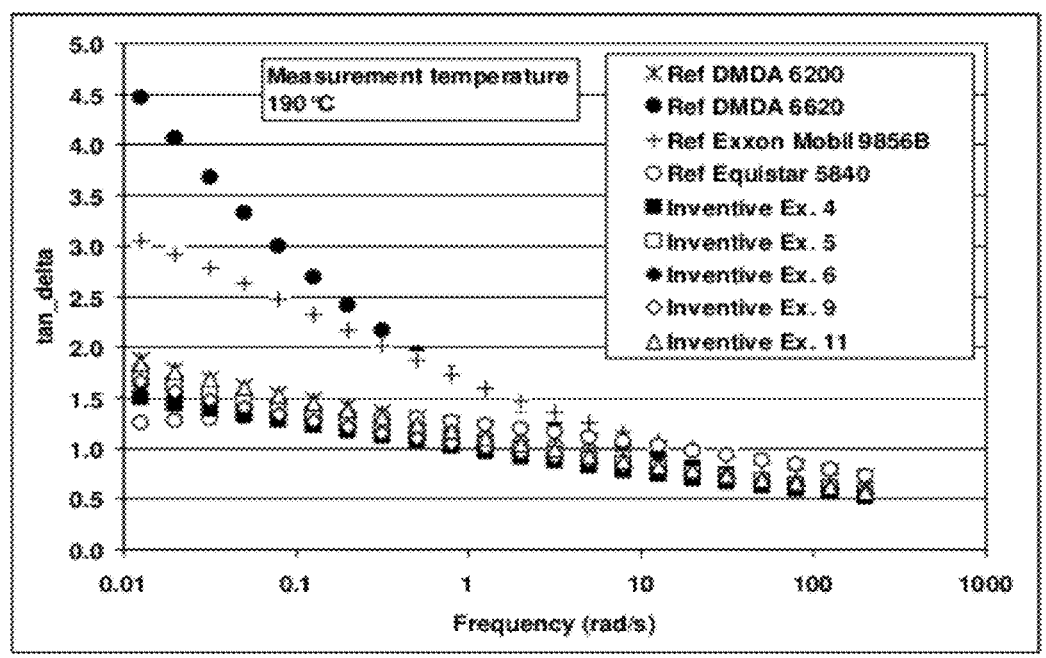
FIG. 7 depicts the variation of Inventive Examples 4-6, 9 and 11, and four Comparative Example (UNIVAL™ DMDA 6200, CONTINUUM™ DMDA 6620, ExxonMobil 9856B and Equistar 5840) resin tan delta as a function of frequency.

The resin processability is characterized in terms of extrudate swell measured by the extrudate swell measurement method described previously, and fabricated part swell characterized by bottle weight. The bottle weight swell data is depicted in FIG. 5 and in Table 11C. The improvement in processability was also measured in terms of the improvement in melt strength (FIG. 4) and additionally characterized by low shear viscosity measurements (Table 11 and FIG. 3) and tan delta determination (FIG. 7).

Figure 2A:
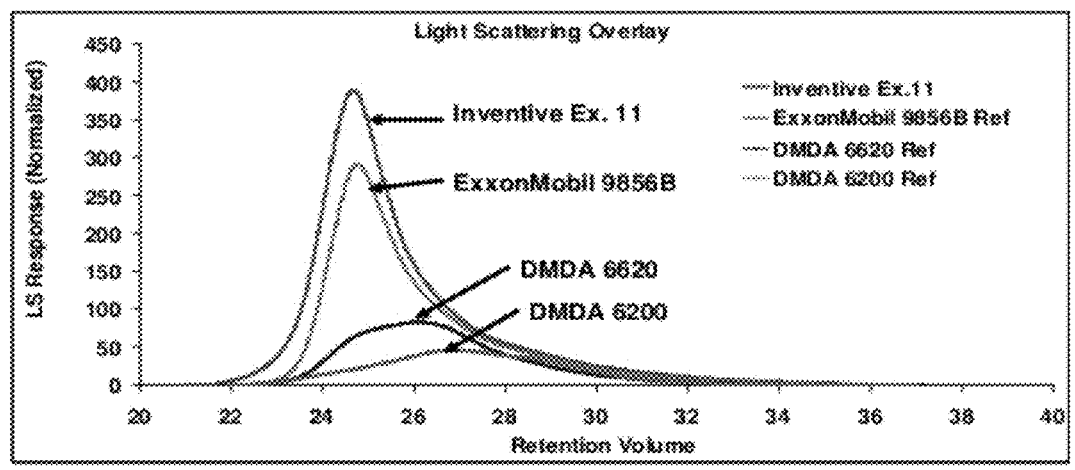
FIG. 2A depicts a plot of normalized Light Scattering (LS) Gel Permeation Chromatography (GPC) response versus retention volume for Inventive Example 11 and several Comparative Examples (UNIVAL™ DMDA 6200, CONTINUUM™ DMDA 6620, and ExxonMobil 9856B).
Figure 2B:
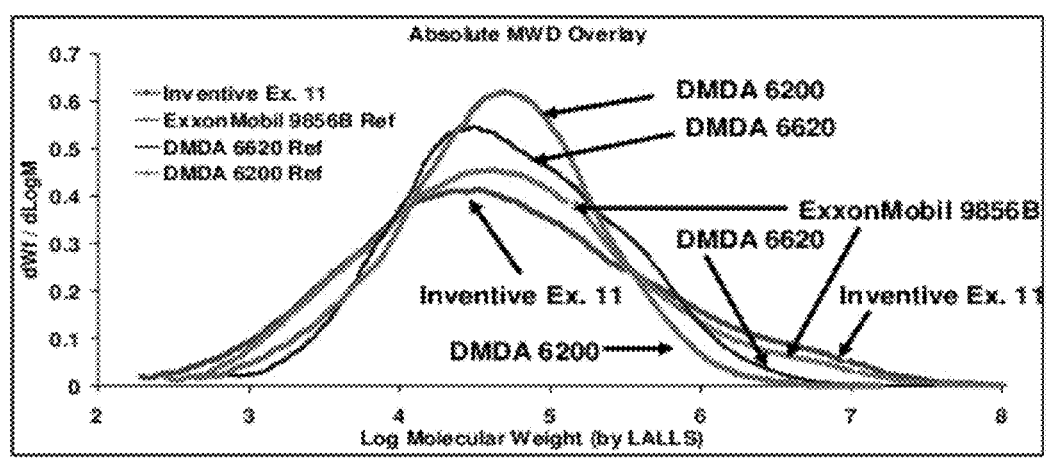
FIGS. 2B and 2C depict molecular weight distribution profiles for Inventive Example 11 and several Comparative Examples (UNIVAL™ DMDA 6200, CONTINUUM™ DMDA 6620, and ExxonMobil 9856B) determined by Low Angle Laser Light Scattering (LALLS) GPC and Conventional GPC, respectively.
Figure 2C:
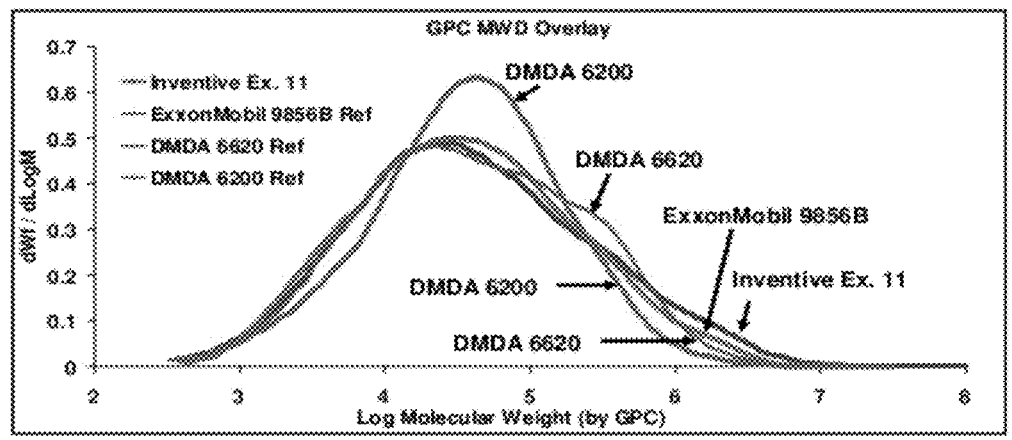
Figure 3:
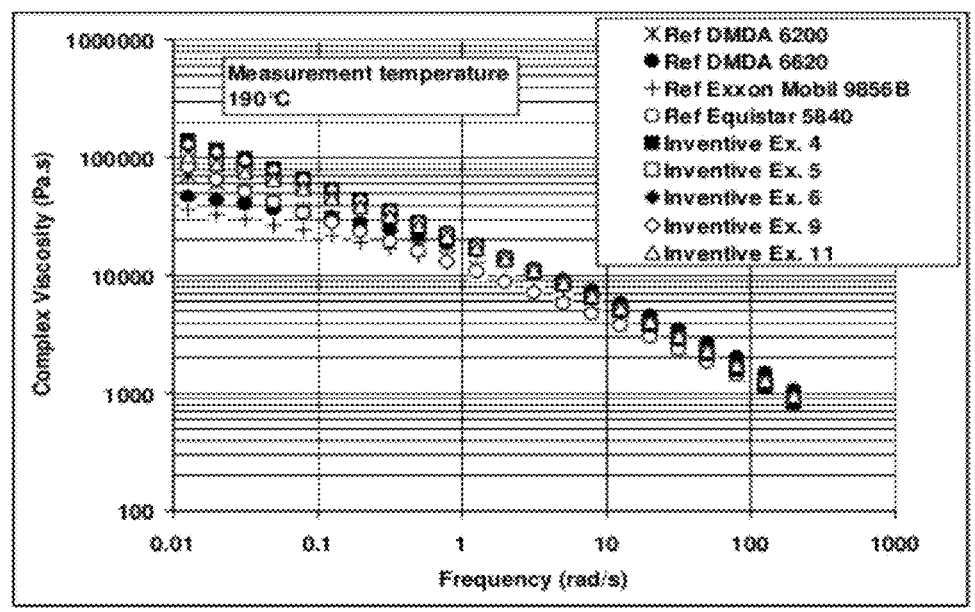
FIG. 3 depicts rheology profiles for Inventive Examples 4-6, 9 and 11, and four Comparative Examples (UNIVAL™ DMDA 6200, CONTINUUM™ DMDA 6620, ExxonMobil 9856B and Equistar 5840).
Figure 4:
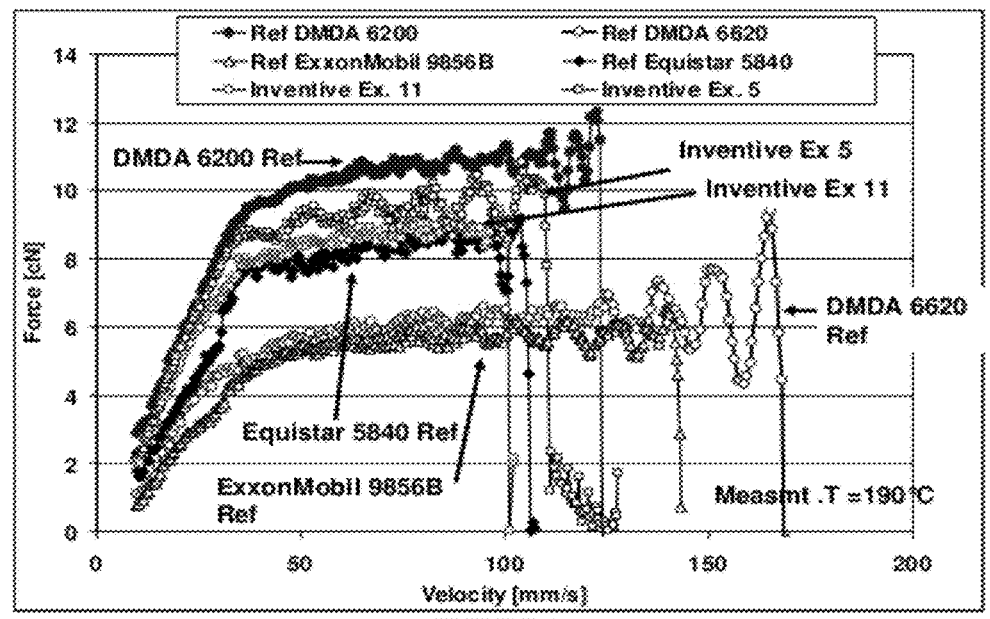
FIG. 4 depicts melt strength profiles for Inventive Examples 5 and 11, and four Comparative Examples (UNIVAL™ DMDA 6200, CONTINUUM™ DMDA 6620, ExxonMobil 9856B and Equistar 5840).

The excellent properties of the inventive resins are achieved by innovative molecular architecture design characterized by molecular weight distribution depicted in FIG. 2 and Table 10; ATREF determined short chain branching distribution (FIG. 6); and incorporation of comonomer primarily in the high molecular weight fraction. The ATREF determined properties of comparative samples are as follows: DMDA 6620 has a high density fraction 87.4%, % purge is 6.7%, $M_v$ is 86,994 g/mole, SCB $M_v$ is 89,623 g/mole, and purge $M_v$ is 50,388 g/mole; ExxonMobil 9856 has a high density fraction 78.8%, % purge is 11.8%, $M_v$ is 73,455 g/mole, SCB $M_v$ is 73,408 g/mole, and purge $M_v$ is 73,803 g/mole; DMDA 6200 has a high density fraction 79.7%, % purge is 9.8%, $M_v$ is 66,699 g/mole, SCB $M_v$ is 66,101 g/mole, and purge $M_v$ is 72,150 g/mole.

TABLE 8A

Properties of Compounded Blends - Examples 1-5

| Properties | Units | Method | Inventive Example 1 | Inventive Example 2 | Inventive Example 3 | Inventive Example 4 | Inventive Example 5 |
|---|---|---|---|---|---|---|---|
| Density | g/cm$^3$ | ASTM D792 | 0.9523 | 0.9496 | 0.9518 | 0.9589 | 0.9568 |
| $I_2$ | g/10 min | ASTM 1238 | 0.06 | 0.04 | 0.05 | 0.14 | 0.16 |
| $I_5$ | g/10 min | ASTM 1238 | 0.29 | 0.23 | 0.28 | 1.16 | 1.00 |
| $I_{21}$ | g/10 min | ASTM 1238 | 11.0 | 6.9 | 8.7 | 30.4 | 34.6 |
| $I_{21}/I_2$ | | | 183 | 154 | 174 | 218 | 217 |
| $I_{21}/I_5$ | | | 38 | 30 | 31 | 26 | 35 |
| Total Volatiles | % | Weight loss method | 0.044 | 0.042 | 0.036 | 0.130 | 0.060 |
| IRGANOX 1010 | ppm | HPLC | 142 | 145 | 135 | 149 | 142 |

TABLE 8A-continued

Properties of Compounded Blends - Examples 1-5

| Properties | Units | Method | Inventive Example 1 | Inventive Example 2 | Inventive Example 3 | Inventive Example 4 | Inventive Example 5 |
|---|---|---|---|---|---|---|---|
| IRGAFOS 168 | ppm | HPLC | 675 | 626 | 675 | 727 | 690 |
| Trans/1000 carbons | | ASTM D6248 | 0.012 | 0.012 | 0 | 0.005 | 0.002 |
| Vinyls/1000 carbons | | ASTM D6248 | 0.160 | 0.133 | 0.147 | 0.165 | 0.138 |
| Methyls/1000 carbons | | ASTM D2238 | Not determined | Not determined | 2.69 | 2.28 | 2.85 |
| T crystallization | °C. | DSC | 118.3 | 117.4 | 117 | 118 | 117.8 |
| ΔH crystallization | J/g | DSC | 203 | 198 | 197 | 212 | 205 |
| T melt | °C. | DSC | 131 | 131.2 | 132.3 | 133 | 132.6 |
| ΔH melt | J/g | DSC | 201 | 199 | 197 | 212 | 207 |
| High Density Fraction | % | ATREF | 61.2 | 49.2 | 48.6 | 73.3 | 61.8 |
| Purge | % | ATREF | 20.4 | 22.9 | 22.2 | 16.1 | 23.6 |
| Mv Average | g/mole | ATREF | 87,433 | 91,475 | 89,156 | 77,661 | 76,170 |
| SCB MV | g.mole | ATREF | 82,255 | 84,749 | 80,604 | 73,223 | 69,690 |
| Purge Mv | g/mole | ATREF | 107,637 | 114,121 | 119,127 | 100,788 | 97,147 |

TABLE 8B

Properties of Compounded Blends - Examples 6-9

| Properties | Units | Method | Inventive Example 6 | Inventive Example 7 | Inventive Example 8 | Inventive Example 9 |
|---|---|---|---|---|---|---|
| Density | g/cm$^3$ | ASTM D792 | 0.9573 | 0.9464 | 0.9526 | 0.9533 |
| $I_2$ | g/10 min | ASTM 1238 | 0.14 | 0.05 | 0.08 | 0.15 |
| $I_5$ | g/10 min | ASTM 1238 | 1.04 | 0.28 | 0.5 | 0.81 |
| $I_{21}$ | g/10 min | ASTM 1238 | 34.8 | 9.5 | 15.2 | 23.7 |
| $I_{21}/I_2$ | | | 255 | 194 | 190 | 159 |
| $I_{21}/I_5$ | | | 33 | 34 | 31 | 29 |
| Total Volatiles | % | Weight loss method | 0.091 | 0.062 | 0.060 | 0.079 |
| IRGANOX 1010 | ppm | HPLC | 154 | 146 | 152 | 148 |
| IRGAFOS 168 | ppm | HPLC | 784 | 662 | 674 | 723 |
| Trans/1000 carbons | | ASTM D6248 | 0.010 | 0.010 | 0.011 | 0.017 |
| Vinyls/1000 carbons | | ASTM D6248 | 0.164 | 0.127 | 0.123 | 0.13 |
| Methyls/1000 carbons | | ASTM D2238 | 3.00 | 4.39 | 3.59 | 3.43 |
| T crystallization | °C. | DSC | 118.4 | 116.8 | 117.5 | 117.4 |
| ΔH crystallization | J/g | DSC | 212 | 191 | 206 | 203 |
| T melt | °C. | DSC | 131.6 | 131.3 | 131.7 | 132.2 |
| ΔH melt | J/g | DSC | 212 | 191 | 210 | 205 |
| Wt % Hexene | % | 13C NMR | Not determined | 2.4 | 1.8 | 1.5 |
| Branches/1000 carbons | | 13C NMR | Not determined | 3.4 | 2.6 | 2.3 |
| High Density Fraction | % | ATREF | 52.0 | 63.8 | 73.8 | 72.4 |
| Purge Fraction | % | ATREF | 29.7 | 10.0 | 12.3 | 12.6 |
| Mv Average | g/mole | ATREF | 84,277 | 89,909 | 90,435 | 75,250 |
| SCB $M_v$ | g/mole | ATREF | 70,051 | 88,750 | 89,827 | 75,243 |
| Purge Mv | g/mole | ATREF | 117,949 | 100,344 | 94,772 | 75,296 |

TABLE 8C

Properties of Compounded Blends - Examples 10-12

| Properties | Units | Method | Inventive Example 10 | Inventive Example 11 | Inventive Example 12 |
|---|---|---|---|---|---|
| Density | g/cm³ | ASTM D792 | 0.9523 | 0.9591 | 0.9590 |
| $I_2$ | g/10 min | ASTM 1238 | 0.11 | 0.16 | 0.21 |
| $I_5$ | g/10 min | ASTM 1238 | 0.63 | Not determined | Not determined |
| $I_{21}$ | g/10 min | ASTM 1238 | 16.5 | 24.9 | 32.5 |
| $I_{21}/I_2$ | | | 149 | 154 | 156 |
| $I_{21}/I_5$ | | | 26 | Not determined | Not determined |
| Total Volatiles | % | Weight loss method | 0.048 | 0.100 | 0.140 |
| IRGANOX 1010 | ppm | HPLC | 145 | 160 | 152 |
| IRGAFOS 168 | ppm | HPLC | 649 | 417 | 553 |
| Trans/1000 carbons | | ASTM D6248 | 0.008 | 0.001 | 0.001 |
| Vinyls/1000 carbons | | ASTM D6248 | 0.124 | 0.101 | 0.104 |
| Methyls/1000 carbons | | ASTM D2238 | 2.58 | 1.67 | 1.64 |
| T crystallization | °C. | DSC | 117.1 | 118.2 | 118.5 |
| ΔH crystallization | J/g | DSC | 199 | 201 | 205 |
| T melt | °C. | DSC | 132.4 | 133.9 | 133.8 |
| ΔH melt | J/g | DSC | 202 | 200 | 204 |
| Wt % Hexene | % | 13C NMR | 1.9 | Not determined | Not determined |
| Branches/1000 carbons | | 13C NMR | 3.2 | Not determined | Not determined |
| High Density Fraction | % | ATREF | 68.9 | 82.3 | 86.1 |
| Purge | % | ATREF | 13.8 | 9.7 | 12.4 |
| Mv Average | g/mole | ATREF | 82,601 | 71,344 | 77,206 |
| SCB $M_v$ | g/mole | ATREF | 80,051 | 71,499 | 75,118 |
| Purge Mv | g/mole | ATREF | 98,527 | 70,090 | 91,954 |

TABLE 9A

Mechanical Properties - Low Flow Index ($I_{21}$) Series - Inventive Examples 1-3, 7

| Properties | Units | Method | Inventive Example 1 | Inventive Example 2 | Inventive Example 3 | Inventive Example 7 |
|---|---|---|---|---|---|---|
| Density | g/cm³ | ASTM D792 | 0.9523 | 0.9496 | 0.9518 | 0.9464 |
| $I_2$ | g/10 min | ASTM 1238 | 0.06 | 0.04 | 0.05 | 0.05 |
| $I_5$ | g/10 min | ASTM 1238 | 0.29 | 0.23 | 0.28 | 0.28 |
| $I_{21}$ | g/10 min | ASTM 1238 | 11.0 | 6.9 | 8.7 | 9.5 |
| $I_{21}/I_2$ | | ASTM 1238 | 183 | 154 | 174 | 194 |
| $I_{21}/I_5$ | | ASTM 1238 | 38 | 30 | 31 | 34 |
| ESCR $F_{50}$ (10% Igepal, notched) | h | ASTM D1693-B | >1000 | >1000 | >1000 | >1000 |
| Tensile Impact | ft * lb/in² | ASTM B1822 | 279 | 318 | 288 | 302 |
| 1% Secant Modulus | psi | ASTM D790-B | 156,590 | 149,309 | 153,980 | 140,839 |
| Flex Modulus | psi | ASTM D790-B | 187,029 | 175,813 | 180,841 | 175,158 |
| Ultimate Tensile Strength | psi | ASTM 638 | 4,793 | 5,022 | 5,150 | 4,929 |
| Elongation at break | % | ASTM 638 | 786 | 778 | 790 | 658 |

TABLE 9A-continued

Mechanical Properties - Low Flow Index ($I_{21}$) Series - Inventive Examples 1-3, 7

| Properties | Units | Method | Inventive Example 1 | Inventive Example 2 | Inventive Example 3 | Inventive Example 7 |
|---|---|---|---|---|---|---|
| Yield Strength | psi | ASTM 638 | 3,242 | 3,002 | 3,514 | 2,931 |
| Yield Strain | % | ASTM 638 | 3.5 | 3.6 | 4.5 | 3.5 |

TABLE 9B

Mechanical Properties - High Flow Index ($I_{21}$) Series - Inventive Examples 4-6, 8-10.

| Properties | Units | Method | Inventive Example 4 | Inventive Example 5 | Inventive Example 6 | Inventive Example 8 | Inventive Example 9 | Inventive Example 10 |
|---|---|---|---|---|---|---|---|---|
| Density | g/cm³ | ASTM D792 | 0.9589 | 0.9568 | 0.9573 | 0.9526 | 0.9533 | 0.9523 |
| $I_2$ | g/10 min | ASTM 1238 | 0.14 | 0.16 | 0.14 | 0.08 | 0.15 | 0.11 |
| $I_5$ | g/10 min | ASTM 1238 | 1.16 | 1 | 1.04 | 0.5 | 0.81 | 0.63 |
| $I_{21}$ | g/10 min | ASTM 1238 | 30.4 | 34.6 | 34.8 | 15.2 | 23.7 | 16.5 |
| $I_{21}/I_2$ | | ASTM 1238 | 218 | 217 | 255 | 190 | 159 | 149 |
| $I_{21}/I_5$ | | ASTM 1238 | 26 | 35 | 33 | 31 | 29 | 26 |
| $t_{300\,av}$ | s | Extrudate swell | 19.5 | 20.2 | 19.8 | 22.3 | 21.6 | 22.0 |
| $t_{1000\,av}$ | s | Extrudate swell | 7.1 | 7.2 | 7.1 | 7.6 | 7.8 | 7.7 |
| ESCR $F_{50}$ (10% Igepal, notched) | h | ASTM D-1693-B | >1000 | >1000 | >1000 | >1000 | >1000 | >1000 |
| Tensile Impact | ft * lb/in² | ASTM B1822 | 78 | 123 | 136 | 272 | 226 | 233 |
| 1% Secant Modulus | psi | ASTM D790-B | 207,535 | 185,909 | 190,616 | 162,246 | 167,221 | 168,614 |
| Flex Modulus | psi | ASTM D790-B | 250,405 | 228,182 | 224,395 | 201,930 | 208,004 | 202,392 |
| Ultimate Tensile Strength | psi | ASTM 638 | 2,994 | 3,626 | 2,847 | 4,653 | 4,444 | 5,030 |
| Elongation at break | % | ASTM 638 | 695 | 779 | 756 | 722 | 773 | 834 |
| Yield Strength | psi | ASTM 638 | 3,854 | 3,601 | 3,510 | 3,257 | 3,267 | 3,493 |
| Yield Strain | % | ASTM 638 | 3.8 | 2.8 | 3.7 | 3.1 | 3.4 | 4.5 |

TABLE 9C

Mechanical Properties - High Flow Index ($I_{21}$) Series - Inventive Examples 11-12 and Comparative Examples.

| Properties | Units | Method | Inventive Example 11 | Inventive Example 12 | Dow DMDA 6200 Reference a | Dow DMDA 6601 Reference b | Dow DMDA 6620 Reference b | Exxon Mobil 9856B Reference c | Equistar 5840 Reference d |
|---|---|---|---|---|---|---|---|---|---|
| Density | g/cm³ | ASTM D792 | 0.9591 | 0.9590 | 0.9541 | 0.955 | 0.9591 | 0.9575 | 0.9598 |
| $I_2$ | g/10 min | ASTM 1238 | 0.16 | 0.21 | 0.38 | 0.29 | 0.33 | 0.47 | 0.33 |
| $I_{21}$ | g/10 min | ASTM 1238 | 24.9 | 32.5 | 33.0 | 28.8 | 27.1 | 43.1 | 40.4 |

TABLE 9C-continued

Mechanical Properties - High Flow Index ($I_{21}$) Series - Inventive Examples 11-12 and Comparative Examples.

| Properties | Units | Method | Inventive Example 11 | Inventive Example 12 | Dow DMDA 6200 Reference a | Dow DMDA 6601 Reference b | Dow DMDA 6620 Reference b | Exxon Mobil 9856B Reference c | Equistar 5840 Reference d |
|---|---|---|---|---|---|---|---|---|---|
| $I_{21}/I_2$ | | ASTM 1238 | 154 | 156 | 87 | 97 | 83 | 92 | 123 |
| ESCR $F_{50}$ (10% Igepal, notched) | h | ASTM D-1693-B | 439 | 507 | 24 | >1000 | 194 | 128 | 50 |
| Tensile Impact | ft * lb/in$^2$ | ASTM B1822 | 127 | 120 | 82 | 217 | 178 | 107 | 85 |
| 1% Secant Modulus | psi | ASTM D790-B | 201,369 | 201,260 | 160,939 | 179,423 | 205,421 | 186,813 | 199,781 |
| Flex Modulus | psi | ASTM D790-B | 244,912 | 244,806 | 190,527 | 216,123 | 238,203 | 221,086 | 232,709 |
| Ultimate Tensile Strength | psi | ASTM 638 | 3,159 | 3,422 | 4,276 | 4,663 | 4,135 | 4,077 | 3,185 |
| Elongation at break | % | ASTM 638 | 878 | 726 | 943 | 764 | 783 | 845 | 847 |
| Yield Strength | psi | ASTM 638 | 3,682 | 3,449 | 3,493 | 3,471 | 3,777 | 3,707 | 3,986 |
| Yield Strain | % | ASTM 638 | 5.1 | 4.5 | 3.7 | 3.7 | 3.7 | 3.2 | 3 | a: UCAT ™ B (Chrome catalyst)/Gas Phase Polymerization
b: UCAT ™ J (Ziegler-Natta Catalyst)/Gas Phase Polymerization
c: Exxon Mobil - Mitsui process and
d: Equistar - Nissan-Maruzen process

TABLE 10 A

Molecular Weight Data - Inventive Examples 1-10

| Property | Inventive Example 1 | Inventive Example 2 | Inventive Example 3 | Inventive Example 4 | Inventive Example 5 |
|---|---|---|---|---|---|
| Conventional-GPC | | | | | |
| Mn | 13,000 | 13,870 | 13,710 | 9,090 | 11,280 |
| Mw | 222,600 | 243,900 | 234,970 | 204,170 | 210,710 |
| Mz | 996,400 | 1,038,300 | 1,041,800 | 1,104,500 | 1,088,600 |
| Mw/Mn | 17.1 | 17.6 | 17.1 | 22.5 | 18.7 |
| % Wt. fraction of polymer with MW > $10^6$ g/mole | 5.1 | 5.9 | 5.7 | 5.3 | 5.4 |
| Light Scattering GPC (LS) | | | | | |
| Mn | 22,806 | 15,443 | 25,482 | 16,548 | 18,195 |
| Mw(Abs) | 470,320 | 512,330 | 636,670 | 739,640 | 722,840 |
| Mz(BB) | 1,905,900 | 1,770,700 | 2,087,000 | 1,963,300 | 1,855,800 |
| Mz (Abs) | 18,168,800 | 9,315,200 | 15,577,700 | 23,146,700 | 12,066,500 |
| Mz + 1(BB) | 5,688,600 | 4,623,100 | 6,509,800 | 4,916,500 | 4,279,800 |
| Mw(Abs)/Mn(Conv) | 36.2 | 36.9 | 46.4 | 81.4 | 64.1 |
| Mz(Abs)/Mw(Abs) | 38.6 | 18.2 | 24.5 | 31.3 | 16.7 |
| Mz + 1(BB)/Mw(Abs) | 12.1 | 9.0 | 10.2 | 6.6 | 5.9 |
| % Wt. fraction of polymer with MW > $10^6$ g/mole | 7.63 | 8.80 | 9.68 | 10.32 | 10.21 |
| % Wt. fraction of polymer with MW > $10^7$ g/mole | 0.41 | 0.27 | 0.36 | 1.06 | 0.67 |

TABLE 10 A-continued

Molecular Weight Data - Inventive Examples 1-10

| Property | Inventive Example 6 | Inventive Example 7 | Inventive Example 8 | Inventive Example 9 | Inventive Example 10 |
|---|---|---|---|---|---|
| Conventional-GPC | | | | | |
| Mn | 10,830 | 13,840 | 11,320 | 12,310 | 13,420 |
| Mw | 203,870 | 225,850 | 208,140 | 198,270 | 212,150 |
| Mz | 1,055,700 | 967,900 | 966,600 | 1,010,000 | 1,051,600 |
| Mw/Mn | 18.8 | 16.3 | 18.4 | 16.1 | 15.8 |
| % Wt. fraction of polymer with MW > $10^6$ g/mole | 5.1 | 5.0 | 4.8 | 4.6 | 5.1 |
| Light Scattering GPC (LS) | | | | | |
| Mn | 35,374 | 19,042 | 10,696 | 14,092 | 18,151 |
| Mw(Abs) | 692,760 | 446,350 | 408,810 | 450,490 | 449,000 |
| Mz(BB) | 2,241,100 | 1,449,400 | 1,442,600 | 1,518,400 | 1,504,200 |
| Mz (Abs) | 28,698,100 | 4,025,800 | 3,688,100 | 4,821,300 | 3,673,600 |
| Mz + 1(BB) | 7,045,200 | 2,264,900 | 2,228,800 | 2,303,100 | 2,292,900 |
| Mw(Abs)/Mn(Conv) | 64.0 | 32.3 | 36.1 | 36.6 | 33.5 |
| Mz(Abs)/Mw(Abs) | 41.4 | 9.0 | 9.0 | 10.7 | 8.2 |
| Mz + 1(BB)/Mw(Abs) | 10.2 | 5.1 | 5.5 | 5.1 | 5.1 |
| % Wt. fraction of polymer with MW > $10^6$ g/mole | 9.72 | 7.66 | 7.42 | 7.31 | 7.71 |
| % Wt. fraction of polymer with MW > $10^7$ g/mole | 0.71 | 0.23 | 0.13 | 0.33 | 0.17 |

TABLE 10B

Molecular Weight Data - Inventive Examples 11 and Comparative Examples

| Property | Inventive Example 11 | Dow DMDA 6620 Reference | Exxon Mobil 9856B Reference | Dow DMDA 6200 Reference |
|---|---|---|---|---|
| Conventional GPC | | | | |
| Mn | 9,770 | 10,010 | 9,930 | 11,010 |
| Mw | 235,680 | 154,060 | 159,790 | 108,530 |
| Mz | 2,329,300 | 946,400 | 1,151,700 | 694,600 |
| Mw/Mn | 24.1 | 15.4 | 16.1 | 9.9 |
| % Wt. fraction of polymer with molecular weight >$10^6$ g/mole | 5.7 | 2.6 | 3.4 | 1.2 |
| Light Scattering-GPC (LS) | | | | |
| Mn | 6,940 | 16,772 | 9,176 | 12,763 |
| Mw(Abs) | 587,020 | 197,860 | 434,920 | 129,790 |
| Mz(BB) | 2,141,500 | 1,060,600 | 1,538,100 | 851,800 |
| Mz (Abs) | 8,784,100 | 1,496,100 | 6,785,500 | 852,200 |
| Mz + 1(BB) | 6,033,300 | 2,910,200 | 2,980,400 | 4,160,900 |
| Mw(Abs)/Mn(Conv) | 60.1 | 19.8 | 43.8 | 11.8 |
| Mz(Abs)/Mw(Abs) | 15.0 | 7.6 | 15.6 | 6.6 |
| Mz + 1(BB)/Mw(Abs) | 10.3 | 14.7 | 6.9 | 32.1 |
| % Wt. fraction of polymer with molecular weight >$10^6$ g/mole | 9.04 | 3.75 | 6.77 | 1.67 |
| % Wt. fraction of polymer with molecular weight >$10^7$ g/mole | 1.54 | 0.01 | 0.65 | 0.00 |

Representative polymerizations of the high molecular weight component as shown in Table 10C below.

Rheological and swell properties of inventive and comparative examples are shown in Tables 11A and 11B. Swell properties by Conical Bottle Weight Method of inventive and comparative examples are shown in Table 11C.

TABLE 10 C

Molecular Weight Data - High Molecular Weight Component of Inventive Blends

| Sample | Inventive HMW Component #13 | Inventive HMW Component #14 | Inventive HMW Component #15 | Inventive HMW Component #16 | Inventive HMW Component #17 |
|---|---|---|---|---|---|
| $I_{21}$ (10 min/g) | 0.8 | 1.23 | 0.39 | 0.55 | 0.50 |
| Density (g/cm$^3$) | 0.9389 | 0.9429 | 0.9391 | 0.9371 | 0.9374 |
| Conventional GPC | | | | | |
| Mn | 37,360 | 45,600 | 57,110 | 54,270 | 46,770 |
| Mw | 496,100 | 337,560 | 444,740 | 433,020 | 413,200 |
| Mz | 6,545,300 | 1,377,000 | 1,613,500 | 1,598,900 | 1,553,400 |
| Mw/Mn | 13.3 | 7.4 | 7.8 | 8.0 | 8.8 |
| Light Scattering-GPC(LS) | | | | | |
| Mn | 47,799 | 54,911 | 73,972 | 69,798 | 57,547 |
| Mw(Abs) | 579,970 | 607,050 | 855,610 | 842,520 | 818,380 |
| Mz(BB) | 2,808,800 | 1,564,400 | 1,718,800 | 1,741,600 | 1,751,200 |
| Mz (Abs) | 4,337,400 | 3,779,200 | 4,822,800 | 4,947,800 | 5,268,200 |
| Mz + 1(BB) | Not determined | 2,583,500 | 2,866,800 | 2,878,900 | 2,885,000 |
| Mw(Abs)/Mn(Conv) | 15.5 | 13.3 | 15.0 | 15.5 | 17.5 |
| Mz(Abs)/Mw(Abs) | 7.5 | 6.2 | 5.6 | 5.9 | 6.4 |
| Mz + 1(BB)/Mw(Abs) | Not determined | 4.26 | 3.35 | 3.42 | 3.53 |

TABLE 11A

Rheological and Swell Properties - Inventive Examples 1-3 and 7

| | Sample # | | | |
|---|---|---|---|---|
| | Inventive Ex. 1 | Inventive Ex. 2 | Inventive Ex. 3 | Inventive Ex. 7 |
| $I_2$ (g/10 min) | 0.06 | 0.04 | 0.05 | 0.05 |
| $I_5$ (g/10 min) | 0.29 | 0.23 | 0.28 | 0.28 |
| $I_{21}$ (g/10 min) | 11 | 6.9 | 8.7 | 9.5 |
| Extrudate swell $t_{300}$ (s) | 20.6 | 20.1 | 20.5 | 20.8 |
| Extrudate swell $t_{1000}$ (s) | 6.6 | 6.7 | 6.9 | 6.7 |
| Eta*@0.02 s$^{-1}$ (Pa·s) | 191,971 | 199,473 | 196,221 | 176,721 |
| Eta*@0.02 s$^{-1}$/Eta*@200 s$^{-1}$ | 151 | 140 | 152 | 126 |
| tan delta@0.02 s$^{-1}$ | 1.37 | 1.41 | 1.33 | 1.45 |
| tan delta@0.02 s$^{-1}$/tan delta@200 s$^{-1}$ | 2.87 | 3.00 | 2.73 | 3.02 |

TABLE 11B

Rheological and Swell Properties - Inventive Examples 4-6, 8-12 and Comparative Examples

| Sample # | $I_2$ (g/10 min) | $I_{21}$ (g/10 min) | Extrudate swell t300 (s) | Extrudate swell t1000 (s) | Eta* @ 0.02 s$^{-1}$ (Pa·s) | Eta* @ 0.02 s$^{-1}$/Eta*@200 s$^{-1}$ | tan delta @0.02 s$^{-1}$ | tan delta @0.02 s$^{-1}$/tan delta @200 s$^{-1}$ |
|---|---|---|---|---|---|---|---|---|
| Inventive Example 8 | 0.08 | 15.2 | 22.3 | 7.6 | 173867 | 158 | 1.34 | 2.69 |
| Inventive Example 10 | 0.11 | 16.5 | 22.0 | 7.7 | 130172 | 121 | 1.52 | 2.72 |

TABLE 11B-continued

Rheological and Swell Properties - Inventive Examples 4-6, 8-12 and Comparative Examples

| Sample # | $I_2$ (g/10 min) | $I_{21}$ (g/10 min) | Extrudate swell t300 (s) | Extrudate swell t1000 (s) | Eta* @ 0.02 s$^{-1}$ (Pa·s) | Eta* @ 0.02 s$^{-1}$/ Eta*@200 s$^{-1}$ | tan delta @0.02 s$^{-1}$ | tan delta @0.02 s$^{-1}$/ tan delta @200 s$^{-1}$ |
|---|---|---|---|---|---|---|---|---|
| Inventive Example 9 | 0.15 | 23.7 | 21.6 | 7.8 | 111324 | 118 | 1.56 | 2.80 |
| Inventive Example 4 | 0.14 | 30.4 | 19.5 | 7.1 | 117212 | 141 | 1.44 | 2.75 |
| Inventive Example 5 | 0.16 | 34.6 | 20.2 | 7.2 | 94981 | 107 | 1.63 | 2.88 |
| Inventive Example 6 | 0.14 | 34.8 | 19.8 | 7.1 | 105547 | 121 | 1.54 | 2.79 |
| Inventive Example 11 | 0.16 | 24.9 | 20.6 | 7.2 | 88413 | 94 | 1.76 | 3.09 |
| Inventive Example 12 | 0.21 | 32.5 | 20.5 | 7.2 | 70468 | 77 | 1.96 | 3.33 |
| DMDA 6200 Reference | 0.38 | 33.0 | 21.7 | 7.0 | 58357 | 72 | 1.78 | 2.48 |
| DMDA 6601 Reference | 0.29 | 28.8 | 16.1 | 5.6 | 46118 | 46 | 3.55 | 6.23 |
| DMDA 6620 Reference | 0.33 | 27.1 | 17.1 | 5.8 | 42636 | 41 | 4.06 | 7.17 |
| Exxon Mobil 9856B Reference | 0.47 | 43.1 | 17.8 | 6.2 | 32606 | 38 | 2.92 | 4.34 |
| Equistar 5840 Reference | 0.33 | 40.4 | 21.6 | 6.9 | 64702 | 80 | 1.27 | 1.74 |

TABLE 11C

Swell Properties by Conical Bottle Weight Method - Inventive Examples 4-6, 8-12 and Comparative Examples

| Sample # | Bottle Weight (g) | Parison Diameter (in) | Parison Diameter (cm) |
|---|---|---|---|
| Inventive Example 8 | 74.2 | 2.51 | 6.37 |
| Inventive Example 10 | 83.3 | 2.56 | 6.50 |
| Inventive Example 9 | 88.0 | 2.64 | 6.69 |
| Inventive Example 4 | 88.0 | 2.64 | 6.71 |
| Inventive Example 5 | 84.2 | 2.47 | 6.29 |
| Inventive Example 6 | 83.4 | 2.55 | 6.47 |
| Inventive Example 11 | 77.8 | 2.58 | 6.55 |
| Inventive Example 12 | 76.7 | 2.58 | 6.55 |
| Dow DMDA 6200 Reference | 74.8 | 2.45 | 6.22 |
| Dow DMDA 6601 Reference | 62.3 | 2.31 | 5.87 |
| Dow DMDA 6620 Reference | 61.0 | 2.40 | 6.10 |
| Exxon Mobil 9856B Reference | 69.0 | 2.40 | 6.10 |
| Equistar 5840 Reference | 72.0 | 2.40 | 6.10 |

The inventive resins' processability was also evaluated on large scale continuous Graham Machinery wheel and shuttle Uniloy 350-R2 extrusion blow molding equipment.

The resin extrusion blow molding performance was evaluated on the Uniloy blow molding line in a standard 3.8 liter (1 gallon) milk bottle with a handle, and on the Graham Machinery wheel blow molding line in a 1.9 liter (64 oz) handle bottle. The inventive resins were very easy to process, and bottles with excellent pinch off were readily fabricated. The process operation window was narrower for the reference bimodal DMDA 6620, DMDA 6601 and Exxon Mobil 9856B resins. Bottles fabricated from these reference resins had holes in the handle area. It was also demonstrated that the inventive resins have potential to produce light weight bottles. The superior stiffness-ESCR balance enables a higher percentage of post consumer recycle to be incorporated in the blow molded articles while meeting the finished article performance requirements.

In summary, the inventive resin extrusion and blow molding performance was equivalent or better than that of the comparative reference, DMDA 6200 and Equistar 5840. The inventive resin extrusion and blow molding performance was superior to that of the bimodal DMDA 6601, DMDA 6620 and ExxonMobil 9856B references. The surfaces of bottles made from the inventive resins were superior to both DMDA 6200 and DMDA 6620, and the bottles had very uniform knit lines in the handle areas. The inventive resins have "drop-in" processability on existing extrusion equipment. The mechanical properties of the inventive resins were vastly superior to those of the comparative DMDA 6200 and Equistar 5840. The mechanical properties of the inventive resins were equivalent or superior to those of the comparative bimodal DMDA 6601, DMDA 6620 and ExxonMobil 9856B references.

Thus, the inventive resins have swell similar to Cr catalyzed resins, an environmental stress crack resistance (ESCR)-stiffness balance equivalent to, or better than, current bimodal Ziegler-Natta catalyzed resins; and better sag resistance, melt strength, and bubble stability than current bimodal Ziegler-Natta catalyzed resins.

These resins bridge the poor processing (low swell, melt strength, etc.) gap encountered with currently available multimodal resins.

Although the invention has been described in certain detail through the preceding specific embodiments, this detail is for the primary purpose of illustration. Many variations and modifications can be made by one skilled in the art, without departing from the spirit and scope of the invention, as described in the following claims.

What is claimed is:

1. A composition comprising a blend, which blend comprises a high molecular weight ethylene-based polymer, and a low molecular weight ethylene-based polymer, and wherein the high molecular weight ethylene-based polymer has a density less than, or equal to, 0.955 g/cm³, and a molecular weight distribution greater than six, and
wherein the blend has a high load melt index ($I_{21}$) greater than, or equal to, 20 g/10 min, and
wherein the blend has a molecular weight distribution ($M_w/M_n$) greater than, or equal to, 15, and
wherein the high molecular weight ethylene-based polymer has a z-average molecular weight, $M_z$, greater than, or equal to, 10⁶ g/mole, as determined by GPC, and
wherein high molecular weight ethylene-based polymer is a heterogeneously branched ethylene-based interpolymer, and
wherein the blend has a weight fraction greater than, or equal to, 4.5 weight percent of the blend, which comprises polymer molecules that have a molecular weight greater than, or equal to, 10⁶ g/mole, as determined by conventional GPC.

2. The composition of claim 1, wherein the high molecular weight ethylene-based polymer is an ethylene-based interpolymer.

3. The composition of claim 1, wherein the high molecular weight ethylene-based polymer has a weight average molecular weight $M_w$ greater than, or equal to, 10⁵ g/mole, as determined by GPC.

4. The composition of claim 1, wherein the high molecular weight ethylene-based polymer has a melt index, $I_{21}$, greater than, or equal to, 0.05 g/10 min.

5. The composition of claim 1, wherein the blend has a density less than, or equal to, 0.970 g/cm³.

6. The composition of claim 1, wherein blend has a molecular weight distribution, $M_w/M_n$, greater than, or equal to, 20.

7. The composition of claim 1, wherein the high molecular weight ethylene-based polymer is present in an amount from 40 to 70 weight percent, based on the sum weight of the high molecular weight ethylene-based polymer and the low molecular weight ethylene-based polymer.

8. A composition comprising a blend, which blend comprises a high molecular weight ethylene-based polymer and a low molecular weight ethylene-based polymer, and wherein
the high molecular weight ethylene-based polymer component has a density less than, or equal to, 0.945 g/cm³, a melt index ($I_2$) less than, or equal to, 0.1 g/10 min, and a molecular weight distribution greater than 6, and
wherein the blend has a high load melt index ($I_{21}$) less than, or equal to, 15 g/10 min, and a melt index ($I_5$) less than, or equal to 1 g/10 min, and a molecular weight distribution ($M_w/M_n$) greater than, or equal to, 15, and
wherein the high molecular weight ethylene-based polymer has a z-average molecular weight, $M_z$, greater than, or equal to, 10⁶ g/mole, as determined by GPC, and
wherein high molecular weight ethylene-based polymer is a heterogeneously branched ethylene-based interpolymer; and
wherein the low molecular weight ethylene-based polymer is a heterogeneously branched ethylene-based interpolymer;
wherein the blend has a weight fraction greater than, or equal to, 4.5 weight percent of the blend, which comprises polymer molecules that have a molecular weight greater than, or equal to, 10⁶ g/mole, as determined by conventional GPC.

9. The composition of claim 8, wherein high molecular weight ethylene-based polymer has a molecular weight distribution greater than 7.

10. The composition of claim 8, wherein blend has a melt index, $I_{21}$, less than, or equal to, 10 g/10 min.

11. A composition comprising a blend, which blend comprises a high molecular weight ethylene-based polymer, and a low molecular weight ethylene-based polymer, and wherein
the high molecular weight ethylene-based polymer has a density less than, or equal to, 0.945 g/cm³, and a melt index ($I_2$) less than, or equal to, 0.1 g/10 min, and
wherein the blend has a high load melt index ($I_{21}$) greater than, or equal to, 1 g/10 min, and a molecular weight distribution (Mw/Mn) greater than, or equal to, 15, and
wherein the high molecular weight ethylene-based polymer has a z-average molecular weight, K, greater than, or equal to, 10⁶ g/mole, as determined by GPC, and
wherein high molecular weight ethylene-based polymer is a heterogeneously branched ethylene-based interpolymer, and
wherein the high molecular weight ethylene-based polymer has a molecular weight distribution greater than 6, as determined by conventional GPC; and
wherein the blend has a weight fraction greater than, or equal to, 4.5 weight percent of the blend, which comprises polymer molecules that have a molecular weight greater than, or equal to, 10⁶ g/mole, as determined by conventional GPC.

12. A composition comprising a blend, which blend comprises a high molecular weight ethylene-based polymer, and a low molecular weight ethylene-based polymer, and
wherein the high molecular weight ethylene-based polymer has the following properties: (i) a density less than, or equal to, 0.955 g/cm³, (ii) a high load melt index ($I_{21}$) greater than, or equal to, 0.05 g/10 min, and
wherein the blend has a weight fraction greater than, or equal to, 4 weight percent, based on the weight of the blend, which comprises polymer molecules that have a molecular weight greater than 10⁶ g/mole, and wherein the blend has a density greater than, or equal to, 0.93 g/cm³, and
wherein the high molecular weight ethylene-based polymer has a z-average molecular weight, K, greater than, or equal to, 10⁶ g/mole, as determined by GPC, and
wherein high molecular weight ethylene-based polymer is a heterogeneously branched ethylene-based interpolymer, and
wherein the blend has a melt index, $I_{21}$, greater than, or equal to, 20 g/10 min; and
and wherein the blend has a melt flow ratio (121/12) greater than, or equal to, 130.

13. An article comprising at least one component formed from the composition of claim 1.

14. The article of claim 13, wherein the article is a blow molded article.

15. An article comprising at least one component formed from the composition of claim 8.

16. An article comprising at least one component formed from the composition of claim 11.

17. An article comprising at least one component formed from the composition of claim 12.

18. The composition of claim 1, wherein the high molecular weight ethylene-based polymer has a molecular weight distribution greater than seven.

19. The composition of claim 1, wherein the composition has a weight fraction greater than, or equal to, 1 weight percent of the blend, which comprises polymer molecules that have a molecular weight greater than 10⁷ g/mole, as determined by conventional GPC.

20. The article of claim 13, wherein the article is a pipe, a blow molded article, a geomembrane, a drip tape, an agricultural tape, a sheet, a heavy duty shipping sack, a stretch tape, a film, or a bi-oriented film.

* * * * *